(12) United States Patent
Volkerink et al.

(10) Patent No.: US 11,822,989 B2
(45) Date of Patent: Nov. 21, 2023

(54) RE-USE MODE OF TRACKING DEVICE FOR MULTIPLE-PHASE TRANSPORT

(71) Applicant: TRACKONOMY SYSTEMS, INC., San Jose, CA (US)

(72) Inventors: Hendrik J. Volkerink, Palo Alto, CA (US); Ajay Khoche, West San Jose, CA (US)

(*) Notice: Subject to any disclaimer, the term of this patent is extended or adjusted under 35 U.S.C. 154(b) by 139 days.

(21) Appl. No.: 17/643,108

(22) Filed: Dec. 7, 2021

(65) Prior Publication Data

US 2022/0092376 A1    Mar. 24, 2022

Related U.S. Application Data

(63) Continuation-in-part of application No. 17/086,696, filed on Nov. 2, 2020.

(60) Provisional application No. 63/248,680, filed on Sep. 27, 2021, provisional application No. 63/122,224, filed on Dec. 7, 2020, provisional application No. 62/929,102, filed on Nov. 1, 2019.

(51) Int. Cl.
| | |
|---|---|
| *G06K 19/07* | (2006.01) |
| *G06Q 10/0833* | (2023.01) |
| *H04W 4/029* | (2018.01) |
| *G06K 19/06* | (2006.01) |

(52) U.S. Cl.
CPC ..... *G06K 19/0723* (2013.01); *G06Q 10/0833* (2013.01); *H04W 4/029* (2018.02); *G06K 19/06037* (2013.01)

(58) Field of Classification Search
CPC ........ G06K 19/0723; G06K 19/06037; H04W 4/029; G06Q 10/0833

USPC ......................................................... 235/384
See application file for complete search history.

(56) References Cited

U.S. PATENT DOCUMENTS

| | | |
|---|---|---|
| 7,783,380 B2 | 8/2010 | York et al. |
| 2004/0039424 A1 | 2/2004 | Merritt et al. |
| 2006/0236761 A1 | 10/2006 | Inoue et al. |
| 2007/0118549 A1 | 5/2007 | Bornhoevd et al. |
| 2007/0262861 A1 | 11/2007 | Anderson et al. |
| 2009/0014528 A1 | 1/2009 | Gelbman |
| 2012/0150754 A1 | 6/2012 | Belady et al. |
| 2012/0210325 A1 | 8/2012 | De Lind Van Wijngaarden et al. |
| 2012/0303498 A1 | 11/2012 | Cova |
| 2013/0314233 A1 | 11/2013 | Stevens |
| 2016/0261122 A1 | 9/2016 | Childress et al. |
| 2016/0277884 A1 | 9/2016 | Ehrman et al. |
| 2016/0333226 A1 | 11/2016 | Jo |

(Continued)

OTHER PUBLICATIONS

International Patent Application No. PCT/US2022/032024 International Search Report and Written Opinion dated Aug. 19, 2022, 15 pages.

(Continued)

*Primary Examiner* — Daniel A Hess

(57) ABSTRACT

A method for multi-phase monitoring, comprising: receiving a first set of data associated with a monitoring agent during a first phase of an itinerary for monitoring an asset; determining the first phase of the itinerary is complete; receiving a second set of data relating to a second phase of the itinerary, the second set of data defining a phase requirement for implementing the second phase; determining an agent capability of the monitoring agent; comparing the agent capability to the phase requirement; and performing an action based on whether the phase requirement is capable of being met by the monitoring agent.

21 Claims, 29 Drawing Sheets

(56) References Cited

U.S. PATENT DOCUMENTS

| | | |
|---|---|---|
| 2018/0052462 A1 | 2/2018 | Arena |
| 2018/0113500 A1 | 4/2018 | Loeffler et al. |
| 2019/0115630 A1 | 4/2019 | Roohparvar et al. |
| 2019/0362215 A1 | 11/2019 | Khoche |
| 2020/0092681 A1 | 3/2020 | Shapiro et al. |
| 2020/0143322 A1 | 5/2020 | Dearing |
| 2020/0265288 A1 | 8/2020 | Volkerink et al. |
| 2021/0133696 A1 | 5/2021 | Volkerink et al. |

OTHER PUBLICATIONS

Envio, https://web.archive.org/web/20200922114250/https:/www.envio.io/digital-shipping-label, accessed Dec. 7, 2022, 5 pages.
PCT Application No. PCT/US2021/053434, International Search Report dated Feb. 7, 2022, 3 pages.
PCT Application No. PCT/US2021,062239, International Search Report and Written Opinion, dated Mar. 29, 2022, 16 pages.

| Tape ID #2200095 Charging History ||||| 
|---|---|---|---|---|
| Charge Cycle | Date of Receipt | Recharge / Refurbish | Successful? | Date Deployed |
| 1 | 1/20/2021 | Recharge | Y | 1/22/2021 |
| 2 | 2/25/2021 | Recharge | Y | 2/26/2021 |
| 3 | 3/12/2021 | Recharge | Y | 3/13/2021 |
| 4 | 5/01/2021 | Recharge | Y | 5/05/2021 |
| 5 | 5/29/2021 | Recharge | Y | 5/29/2021 |
| 6 | 7/14/2021 | Recharge | Y | 7/16/2021 |
| 7 | 8/27/2021 | Recharge | Y | 8/28/2021 |
| 8 | 9/15/2021 | Recharge | Y | 9/18/2021 |
| 9 | 9/29/2021 | Recharge | Y | 9/29/2021 |
| 10 | 10/10/2021 | Recharge | Y | 10/15/2021 |
| 11 | 10/24/2021 | Refurbish | Y | 10/29/2021 |
FIG. 16
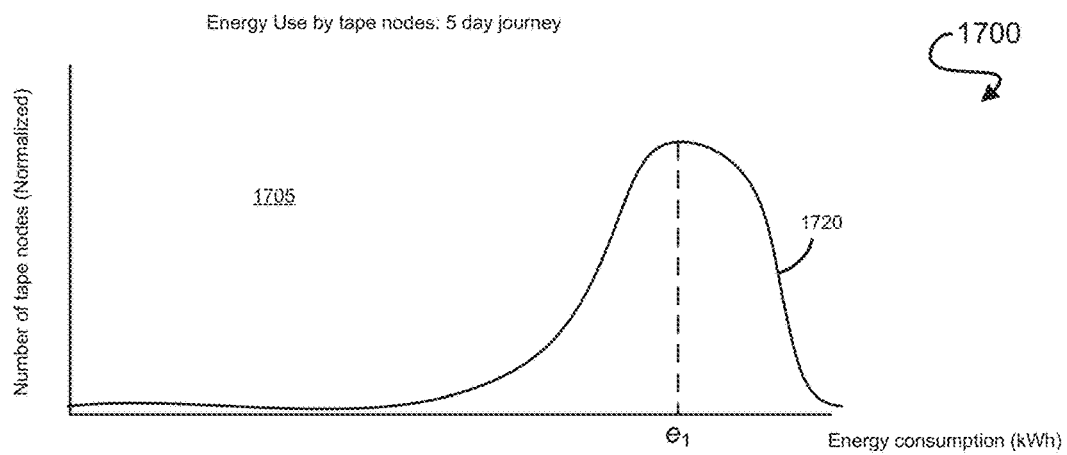
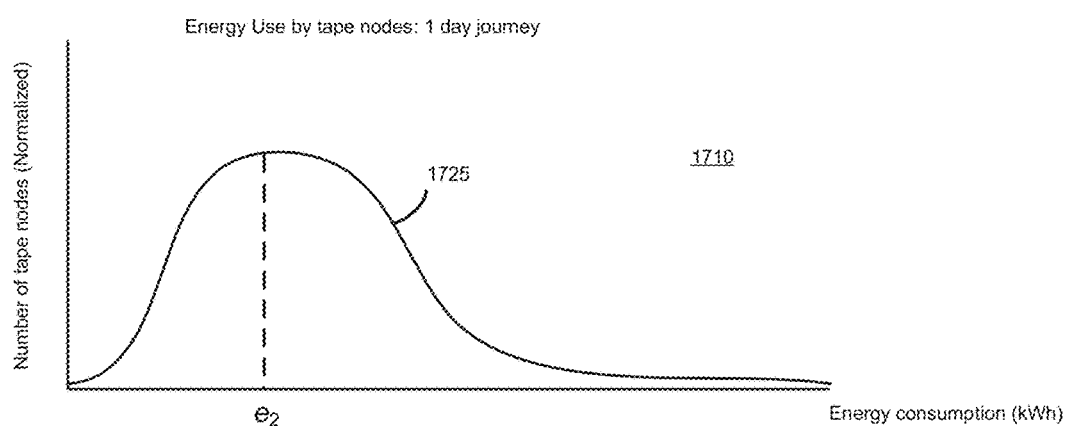
FIG. 17

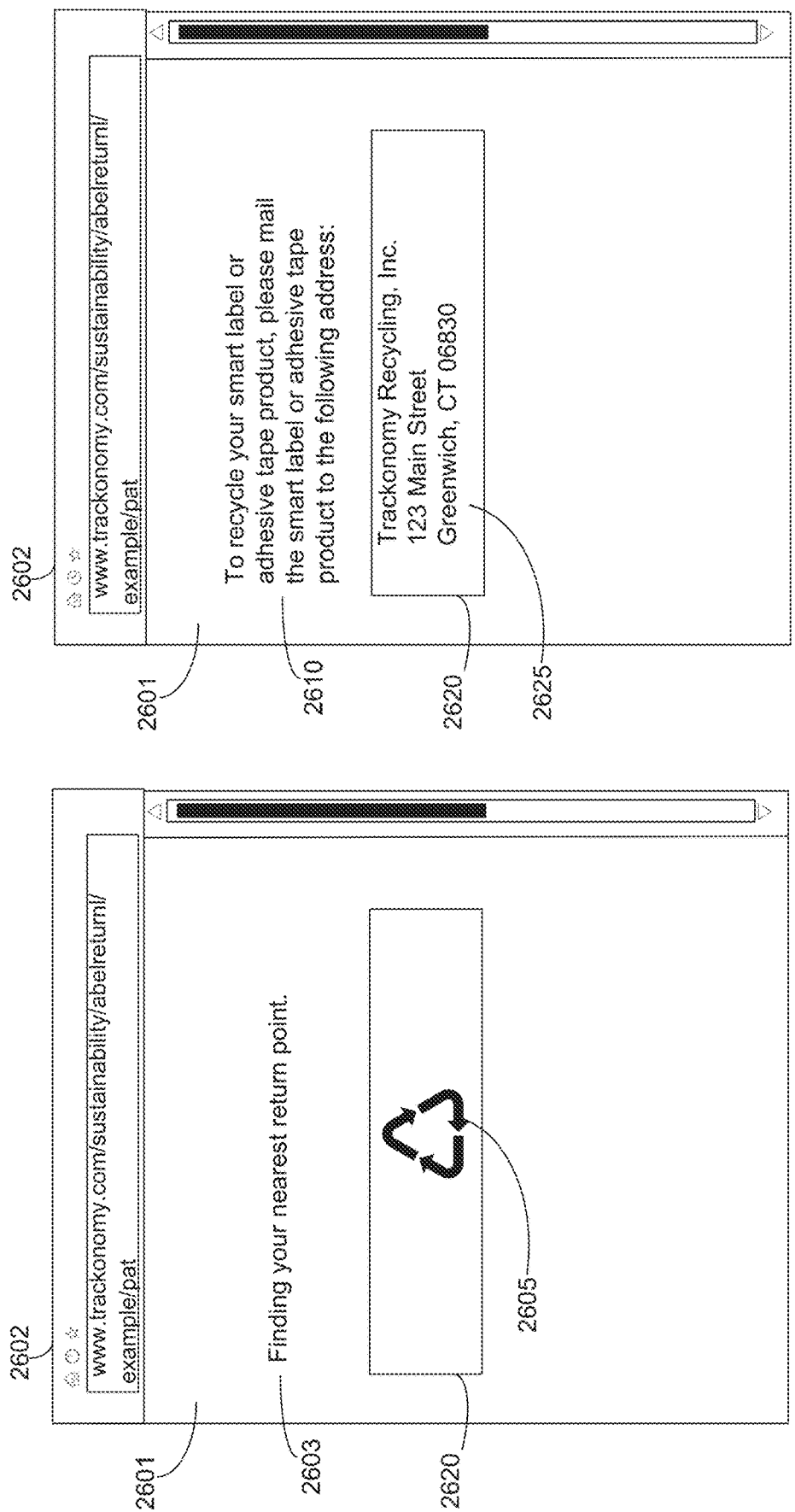

RE-USE MODE OF TRACKING DEVICE FOR MULTIPLE-PHASE TRANSPORT

RELATED APPLICATIONS

This application claims priority to U.S. Patent Application Ser. No. 63/122,224, titled "REUSE MODE FOR MULTIPLE-PHASE TRANSPORT", filed Dec. 7, 2020. This application also claims priority to U.S. Patent Application Ser. No. 63/248,680, titled "RECYCLING WIRELESS DEVICES THROUGH DYNAMIC MAIL DELIVERY", filed Sep. 27, 2021. This application is a continuation-in-part of U.S. patent application Ser. No. 17/086,696, titled "RECYCLING ASSETS INCORPORATING WIRELESS TAGS," filed Nov. 2, 2020, which claims priority to U.S. Patent Application Ser. No. 62/929,102, titled "RECYCLING ASSETS INCORPORATING WIRELESS TAGS," filed Nov. 1, 2019. Each of the aforementioned applications are incorporated by reference in their entireties as if fully set forth herein.

BACKGROUND

Electronic tracking devices with sufficient battery life may be used and reused in multiple phases of asset management. For example, assets may undergo multi-phase transport between a plurality of locations, or electronic tracking devices may be removed from an asset and reused for another. The duration of a multi-phase transport journey for an asset may be very long. For example, the multi-phase transport may take between a few hours to a few months. Due to variable distances, durations, and energy consumption during multi-phase transport, electronic tracking devices may run out of battery life during the multi-phase transport, resulting in loss of data and ability to track or otherwise manage assets during transport. Operations of the devices, such as collecting and storing sensor data, communicating with other devices, and the like, are frequently reliant on batteries to function. As such, loss of battery life in the devices may result in damages to the tracking, handling, or delivery of assets.

SUMMARY

In an embodiment, a method for multi-phase monitoring, comprising: receiving a first set of data associated with a monitoring agent during a first phase of an itinerary for monitoring an asset; determining the first phase of the itinerary is complete; receiving a second set of data relating to a second phase of the itinerary, the second set of data defining a phase requirement for implementing the second phase; determining an agent capability of the monitoring agent; comparing the agent capability to the phase requirement; and performing an action based on whether the phase requirement is capable of being met by the monitoring agent.

In another embodiment, a wireless tracking system, comprising at least one monitoring agent, each monitoring agent adhered to a respective asset and comprising at least one sensor, the at least one monitoring agent having a processor, a memory communicatively coupled with the processor, the memory storing machine-readable instructions that, when executed by the processor, cause the processor to: receive a first set of data associated with a monitoring agent during a first phase of an itinerary for monitoring an asset; determine the first phase of the itinerary is complete; receive a second set of data relating to a second phase of the itinerary, the second set of data defining a phase requirement for implementing the second phase; determine an agent capability of the monitoring agent; compare the agent capability to the phase requirement; and perform an action based on whether the phase requirement is capable of being met by the monitoring agent.

In yet another embodiment, a wireless tracking system, comprising: at least one monitoring agent adhered to an asset, comprising a battery, processor, memory, communication system, and at least one sensor, the at least one monitoring agent including an identifier on a surface of the monitoring agent that includes instructions for shipping the at least one monitoring agent to a facility when the at least one monitoring agent has a particular status of an energy level associated with the battery.

In yet another embodiment, a monitoring agent distribution device, comprising: receiving a plurality of battery-level indications, each battery-level indication defining battery life of a respective monitoring agent of a plurality of monitoring agents; receiving an application itinerary for monitoring an asset; and identifying a subset of the plurality of monitoring agents, based on the battery-level indications, capable of performing the application itinerary; and generating the subset of the plurality of monitoring agents.

BRIEF DESCRIPTION OF THE FIGURES

FIG. 16 is an example illustration of a spreadsheet of a charging cycle for a tape node of a wireless tracking system, according to an embodiment.

FIG. 17 are example illustrations of diagrams representing historic energy consumption during multi-phase transport, according to an embodiment.

FIGS. 26A-B are an example diagram of a website for instructions on how to recycle a wireless device, according to some embodiments.

DETAILED DESCRIPTION OF THE EMBODIMENTS

Figure 1:
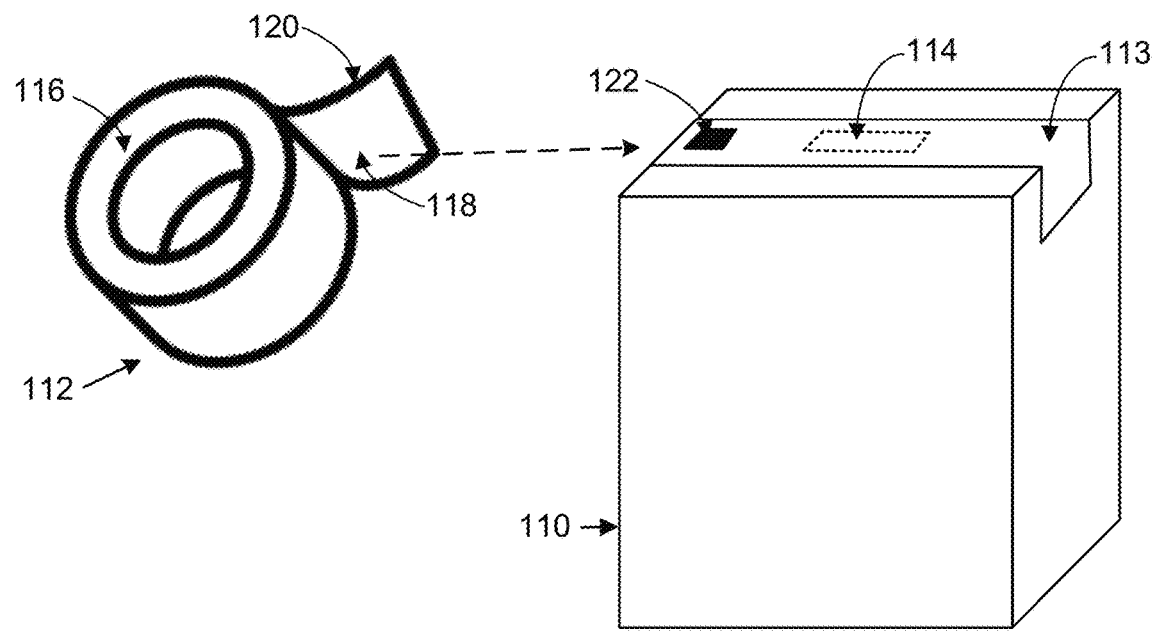
FIG. 1 is a diagrammatic view of a segment of an example adhesive tape platform dispensed from a roll used to detect tampering of an asset, according to an embodiment.

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

The present invention is not limited in any way to the illustrated embodiments. Instead, the illustrated embodiments described below are merely examples of the invention. Therefore, the structural and functional details disclosed herein are not to be construed as limiting the claims. The disclosure merely provides bases for the claims and representative examples that enable one skilled in the art to make and use the claimed inventions. Furthermore, the terms and phrases used herein are intended to provide a comprehensible description of the invention without being limiting.

In some contexts, the term "agent" may refer to a "node", and an "agent" or "node" may be adhesively applied to a surface and denoted as a "tape node" or "tape agent" or "monitoring agent". These terms may be used interchangeably, depending on the context. Further, the "agent" or "node" may have two forms of hierarchy: one depending on the functionality of the "agent" or "node", such as the range of a wireless communication interface, and another depending on which "agent" or "node" may control another "agent" or "node". For example, an agent with a low-power wireless-communication interface may be referred to a "master agent". Further the "agent" or "node", unless otherwise specified, may have any form factor, such as a flexible form factor or a rigid form factor without departing from the scope hereof.

In some embodiments, a low-power wireless communication interface may have a first wireless range and be operable to implement one or more protocols including Zigbee, near-field communication (NFC), Bluetooth Low Energy, Bluetooth Classic, Wi-Fi, and ultra-wideband. For example, the low-power wireless-communication interface may have a range of between 0 and 300 meters or farther, depending on the implemented protocol. The communication interface implementation, e.g., Zigbee or Bluetooth Low Energy, may be selected based upon the distance of communication between the low-power wireless-communication interface and the recipient, and/or a remaining battery level of the low-power wireless-communication interface.

An agent with a medium-power wireless communication-interface may be referred to as a "secondary agent". The medium-power wireless communication interface may have a second wireless range and be operable to implement one or more protocols including Zigbee, Bluetooth Low Energy interface, LoRa. For example, the medium-power wireless-communication interface may have a range of between 0 and 20 kilometers. The communication interface implementation, e.g., Zigbee, Bluetooth Low Energy, or LoRa, may be selected based upon the distance of communication between the medium-power wireless-communication interface and the recipient, and/or a remaining battery level of the medium-power wireless-communication interface.

An agent with a high-power wireless communication-interface may be referred to as a "tertiary agent". The high-power wireless communication interface may have a third wireless range and be operable to implement one or more protocols including Zigbee, Bluetooth Low Energy, LoRa, Global System for Mobile Communication, General Packet Radio Service, cellular (2G, 3G, 4G, 5G, LTE, etc.), near-field communication, and radio-frequency identification. For example, the high-power wireless-communication interface may have a global range, where the high-power wireless-communication interface may communicate with any electronic device implementing a similar communication protocol. The communication interface protocol selected may depend on the distance of communication between the high-power wireless-communication interface and a recipient, and/or a remaining battery level of the high-power wireless-communication interface.

In some examples, a secondary agent may also include a low-power wireless-communication interface and a tertiary agent may also include low and medium-power wireless-communication interfaces, as discussed below with reference to FIGS. 7A-C and/or 8A-C. Further continuing the example, a "master agent", a "secondary agent", or a "tertiary agent" may refer to a "master tape node", a "secondary tape node", or a "tertiary tape node".

With regard to the second form of hierarchy, the "agent", "node", "tape agent", and "tape node", may be qualified as a parent, child, or master, depending on whether a specific "agent" or "node" controls another "agent" or "node". For example, a master-parent agent controls the master-child agent and a secondary or tertiary-parent agent controls a master-child agent. The default, without the qualifier of "parent" or "child" is that the master agent controls the secondary or tertiary agent. Further, the "master tape node" may control a "secondary tape node" and a "tertiary tape node", regardless of whether the master tape node is a parent node.

Further, each of the "agents", "nodes", "tape nodes", and "tape agents" may be referred to as "intelligent nodes", "intelligent tape nodes", "intelligent tape agents", and/or "intelligent tape agents" or any variant thereof, depending on the context and, for ease, may be used interchangeably.

In some embodiments, a wireless IOT device is an adhesive tape platform or a segment thereof. The adhesive tape platform includes wireless transducing components and circuitry that perform communication and/or sensing. The adhesive tape platform has a flexible adhesive tape form-factor that allows it to function as both an adhesive tape for adhering to and/or sealing objects and a wireless sensing device.

As used herein, the term "or" refers an inclusive "or" rather than an exclusive "or." In addition, the articles "a" and "an" as used in the specification and claims mean "one or more" unless specified otherwise or clear from the context to refer the singular form.

The terms "module," "manager," "component", and "unit" refer to hardware, software, or firmware, or a combination thereof. The term "processor" or "computer" or the like includes one or more of: a microprocessor with one or more central processing unit (CPU) cores, a graphics processing unit (GPU), a digital signal processor (DSP), a field-programmable gate array (FPGA), a system-on-chip (SoC), a microcontroller unit (MCU), and an application-specific integrated circuit (ASIC), a memory controller, bus controller, and other components that manage data flow between said processor associated memory, and other components communicably coupled to the system bus. Thus the terms "module," "manager," "component", and "unit" may include computer readable instructions that, when executed by a processor, implement the functionality discussed herein with respect to said "module," "manager," "component", and "unit".

The term "tape node" refers to an adhesive tape platform or a segment thereof that is equipped with sensor, processor, memory, energy source and/or harvesting mechanism, and wireless communications functionality, where the adhesive tape platform (also referred to herein as an "adhesive product" or an "adhesive tape product") has a variety of different form factors, including a multilayer roll or a sheet that includes a plurality of divisible adhesive segments. Once deployed, each tape node can function, for example, as an adhesive tape, label, sticker, decal, or the like, and as a wireless communications device.

The terms "adhesive tape node," "wireless node," or "tape node" may be used interchangeably in certain contexts, and refer to an adhesive tape platform or a segment thereof that is equipped with sensor, processor, memory, energy source/harvesting mechanism, and wireless communications functionality, where the adhesive product has a variety of different form factors, including a multilayer roll or a sheet that includes a plurality of divisible adhesive segments. Once deployed, each tape node or wireless node can function, for example, as an adhesive tape, label, sticker, decal, or the like, and as a wireless communications device. A "peripheral" tape node or wireless node, also referred to as an outer node, leaf node, or terminal node, refers to a node that does not have any child nodes.

In certain contexts, the terms "parcel," "envelope," "box," "package," "container," "pallet," "carton," "wrapping," and the like are used interchangeably herein to refer to a packaged item or items.

In certain contexts, the terms "wireless tracking system," "hierarchical communications network," "distributed agent operating system," and the like are used interchangeably herein to refer to a system or network of wireless nodes.

This specification describes a low-cost, multi-function tracking platform with a form factor that unobtrusively integrates the components useful for implementing a combination of different asset tracking and management functions and also is able to perform a useful ancillary function that otherwise would have to be performed with the attendant need for additional materials, labor, and expense. In an aspect, the tracking platform is implemented as a collection of adhesive products that integrate wireless communications and sensing components within a flexible adhesive structure in a way that not only provides a cost-effective platform for interconnecting, optimizing, and protecting the components of the tracking system but also maintains the flexibility needed to function as an adhesive product that can be deployed seamlessly and unobtrusively into various asset management and tracking applications and workflows, including person and object tracking applications, and asset management workflows such as manufacturing, storage, shipping, delivery, and other logistics associated with moving products and other physical objects, including logistics, sensing, tracking, positioning, warehousing, parking, safety, construction, event detection, road management and infrastructure, security, and healthcare. In some examples, the adhesive tracking platforms are used in various aspects of asset management, including sealing assets, transporting assets, tracking assets, monitoring the conditions of assets, inventorying assets, and verifying asset security. In these examples, the assets typically are transported from one location to another by truck, train, ship, or aircraft or within premises, e.g., warehouses by forklift, trolleys etc.

In disclosed examples of certain embodiments herein, an adhesive tape platform includes a plurality of segments that can be separated from the adhesive product (e.g., by cutting, tearing, peeling, or the like) and adhesively attached to a variety of different surfaces to inconspicuously implement any of a wide variety of different wireless communications-based network communications and transducing (e.g., sensing, actuating, etc.) applications. Examples of such applications include event detection applications, monitoring applications, security applications, notification applications, and tracking applications, including inventory tracking, asset tracking, person tracking, animal (e.g., pet) tracking, manufactured parts tracking, and vehicle tracking. In example embodiments, each segment of an adhesive tape platform is equipped with an energy source, wireless communication functionality, transducing functionality, and processing functionality that enable the segment to perform one or more transducing functions and report the results to a remote server or other computer system directly or through a network of tapes. The components of the adhesive tape platform are encapsulated within a flexible adhesive structure that protects the components from damage while maintaining the flexibility needed to function as an adhesive tape (e.g., duct tape or a label) for use in various applications and workflows. In addition to single function applications, example embodiments also include multiple transducers (e.g., sensing and/or actuating transducers) that extend the utility of the platform by, for example, providing supplemental information and functionality relating characteristics of the state and or environment of, for example, an article, object, vehicle, or person, over time.

Systems and processes for fabricating flexible multifunction adhesive tape platforms in efficient and low-cost ways also are described. In addition to using roll-to-roll and/or sheet-to-sheet manufacturing techniques, the fabrication systems and processes are configured to optimize the placement and integration of components within the flexible adhesive structure to achieve high flexibility and ruggedness. These fabrication systems and processes are able to create useful and reliable adhesive tape platforms that can provide local sensing, wireless transmitting, and positioning functionalities. Such functionality together with the low cost of production is expected to encourage the ubiquitous deployment of adhesive tape platform segments and thereby alleviate at least some of the problems arising from gaps in conventional infrastructure coverage that prevent continuous monitoring, event detection, security, tracking, and other asset tracking and management applications across heterogeneous environments.

A technical problem of the adhesive tape platforms arise with battery management during transport of the platforms adhered to assets. For example, a battery of an adhesive tape platform may drain faster than expected, leading to a loss of tracking information, sensor data collection, communication capabilities, etc. This problem exacerbates for expensive assets, such as jewelry, or assets that are sensitive to environmental conditions, such as medicine, perishable items, etc. Embodiments herein further incorporate a monitoring module (e.g., the monitoring module 872, 1200, etc., FIGS. 8, 12, etc.) that may be a physical hardware device located within a facility or software integrated within any of the devices of the wireless tracking system discussed herein. The monitoring module may determine when an adhesive tape platform has the requisite battery life to complete a phase of a multi-phase application. Further, the monitoring module may identify a replacement adhesive tape platform that has the requisite battery life to complete the phase.

In addition to an adhesive tape platform having the requisite battery life, each phase of a multi-phase application may require a different set of sensors, wireless tracking capabilities, or communication systems. Embodiments herein solve this technical problem of replacing an adhesive tape platform, between phases (e.g., at a shipping facility, after a first phase, and before a second phase) of a multi-phase application, by identifying when an adhesive tape platform has the requisite components to collect sensor data, transmit/receive wireless communications, and/or perform certain tasks, etc. Further, embodiments herein, identify at least one adhesive tape platform that includes the requisite components to complete the next phase.

FIG. 1 shows an example adhesive tape-agent platform 112, including wireless transducing circuit 114, used to seal a package 110 for shipment. In this example, a segment 113 of the adhesive tape-agent platform 112 is dispensed from a roll 116 and affixed to the package 110. The adhesive tape-agent platform 112 includes an adhesive side 118 and a non-adhesive surface 120. The adhesive tape-agent platform 112 may be dispensed from the roll 116 in the same way as any conventional packing tape, shipping tape, or duct tape. For example, the adhesive tape-agent platform 112 may be dispensed from the roll 116 by hand, laid across the seam where the two top flaps of the package 110 meet, and cut to a suitable length either by hand or using a cutting instrument (e.g., scissors or an automated or manual tape dispenser). Examples of such tape agents include tape agents having non-adhesive surface 120 that carry one or more coatings or layers (e.g., colored, light reflective, light absorbing, and/or light emitting coatings or layers). Further, the segment 113 may include an identifier 122 (e.g., a QR code, RFID chip, etc.) that may be used to associate the segment 113 with the package 110, as discussed below.

Figure 2:
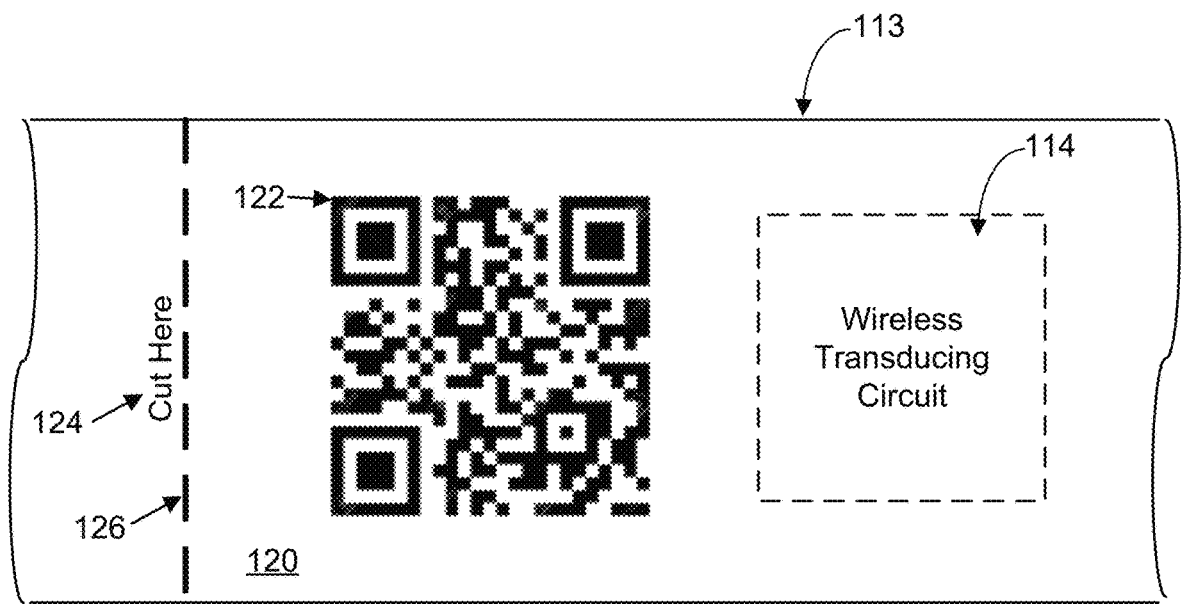
FIG. 2 is a diagrammatic top view of a portion of the segment of the example adhesive tape platform shown in FIG. 1, according to an embodiment.

FIG. 2 shows the non-adhesive surface 120 of the segment 113 of the adhesive tape agent platform 112 of FIG. 1 including writing or other markings that convey instructions, warnings, or other information to a person or machine (e.g., a bar code reader), or may simply be decorative and/or entertaining. For example, different types of adhesive tape-agent platforms may be marked with distinctive colorations to distinguish one type of adhesive tape agent platform from another. In the illustrated example in FIG. 2, the segment 113 of the adhesive tape agent platform 112 includes an identifier 122 (e.g., a two-dimensional bar code, such as a QR Code), written instructions 124 (e.g., "Cut Here"), and an associated cut line 126 that indicates where the user should cut the adhesive tape agent platform 112. The written instructions 124 and the cut line 126 typically are printed or otherwise marked on the top non-adhesive surface 120 of the adhesive tape agent platform 112 during manufacture. The identifier 122 (e.g., a two-dimensional bar code), on the other hand, may be marked on the non-adhesive surface 120 of the adhesive tape agent platform 112 during the manufacture of the adhesive tape agent platform 112 or, alternatively, may be marked on the non-adhesive surface 120 of the adhesive tape agent platform 112 as needed using, for example, a printer or other marking device.

To avoid damaging the functionality of the segments of the adhesive tape agent platform 112, the cut lines 126 may demarcate the boundaries between adjacent segments at locations that are free of any active components of the wireless transducing circuit 114. The spacing between the wireless transducing circuit 114 and the cut lines 126 may vary depending on the intended communication, transducing and/or adhesive taping application. In the example illustrated in FIG. 1, the length of the adhesive tape-agent platform 112 that is dispensed to seal the package 110 corresponds to a single segment of the adhesive tape-agent platform 112. In other examples, the length of the adhesive tape-agent platform 112 needed to seal a package or otherwise serve the adhesive function for which the adhesive tape-agent platform 112 is being applied may include multiple segments 113 of the adhesive tape-agent platform 112, one or more of which segments 113 may be activated upon cutting the length of the adhesive tape-agent platform 112 from the roll 116 and/or applying the segment 113 of the adhesive tape agent platform to the package 110.

In some examples, the wireless transducing circuits 114 embedded in one or more segments 113 of the adhesive tape-agent platform 112 are activated when the adhesive tape agent platform 112 is cut along the cut line 126. In these examples, the adhesive tape-agent platform 112 includes one or more embedded energy sources (e.g., thin film batteries, which may be printed, or conventional cell batteries, such as conventional watch style batteries, rechargeable batteries, or other energy storage device, such as a super capacitor or charge pump) that supply power to the wireless transducing circuit 114 in one or more segments of the adhesive tape-agent platform 112 in response to being separated from the adhesive tape-agent platform 112 (e.g., along the cut line 126).

In some examples, each segment 113 of the adhesive tape agent platform 112 includes its own respective energy source. In some embodiments, the energy source is a battery of a type described above, an energy harvesting component or system that harvests energy from the environment, or both. In some of these examples, each energy source is configured to only supply power to the components in its respective adhesive tape platform segment regardless of the number of contiguous segments that are in a given length of the adhesive tape-agent platform 112. In other examples, when a given length of the adhesive tape agent platform 112 includes multiple segments 113, the energy sources in the respective segments 113 are configured to supply power to the wireless transducing circuit 114 in all of the segments 113 in the given length of the adhesive tape agent platform 112. In some of these examples, the energy sources are connected in parallel and concurrently activated to power the wireless transducing circuit 114 in all of the segments 113 at the same time. In other examples, the energy sources are connected in parallel and alternately activated to power the wireless transducing circuit 114 in respective ones of the segments 113 at different time periods, which may or may not overlap.

Figure 3:
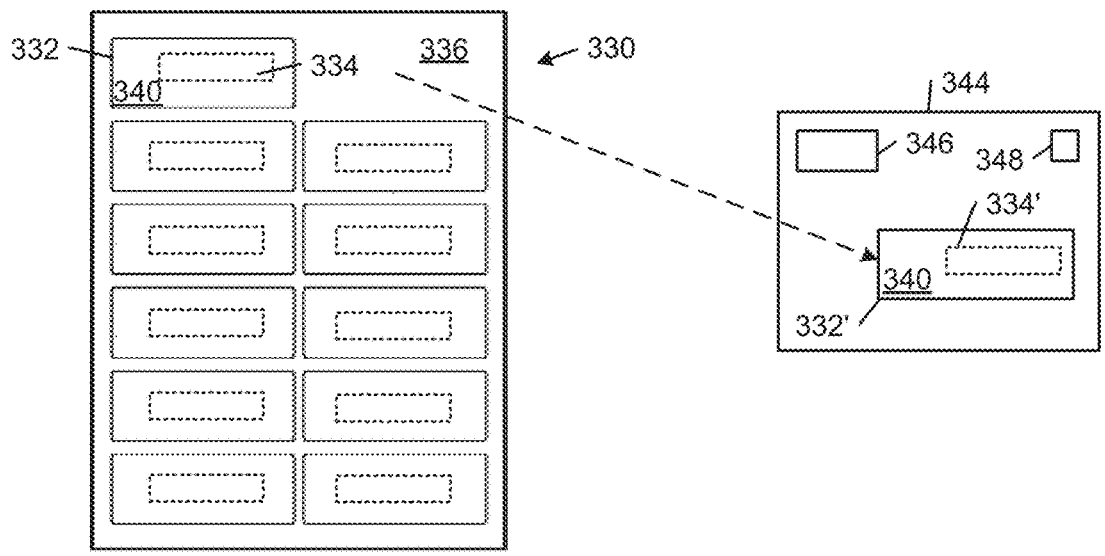
FIG. 3 is a diagrammatic view of an example of an envelope carrying a segment of an example adhesive tape platform dispensed from a backing sheet, according to an embodiment.

FIG. 3 shows an example adhesive tape platform 330 that includes a set of adhesive tape platform segments 332 each of which includes a respective set of embedded wireless transducing circuit components 334, and a backing sheet 336 with a release coating that prevents the adhesive segments 332 from adhering strongly to the backing sheet 336. Each adhesive tape platform segment 332 includes an adhesive side (not shown) facing the backing sheet 336, and an opposing non-adhesive side 340. In this example, a particular segment 332 of the adhesive tape platform 330 has been removed from the backing sheet 336 and affixed to an envelope 344. Each segment 332 of the adhesive tape platform 330 can be removed from the backing sheet 336 in the same way that adhesive labels can be removed from a conventional sheet of adhesive labels (e.g., by manually peeling a segment 332 from the backing sheet 336). In general, the non-adhesive side 340 of the segment 332 may include any type of writing, markings, decorative designs, or other ornamentation including those discussed above with respect to FIG. 2. In the illustrated example, the non-adhesive side 340 of the segment 332 includes writing or other markings that correspond to a destination address for the envelope 344. The envelope 344 also includes a return address 346 and, optionally, a postage stamp or mark 348.

In some examples, segments of the adhesive tape platform 112, 330 are deployed by a human operator. The human operator may be equipped with a mobile phone or other device that allows the operator to authenticate and initialize the adhesive tape platform 112. In addition, the operator can take a picture of a parcel including the adhesive tape platform and any barcodes associated with the parcel and, thereby, create a persistent record that links the adhesive tape platform 12 to the parcel. In addition, the human operator typically will send the picture to a network service and/or transmit the picture to the adhesive tape platform 112 for storage in a memory component of the adhesive tape platform 112.

In some examples, the wireless transducing circuit components 34 that are embedded in a segment 332 of the adhesive tape platform 112 are activated when the segment 332 is removed from the backing sheet 336. In some of these examples, each segment 332 includes an embedded capacitive sensing system that can sense a change in capacitance when the segment 332 is removed from the backing sheet 336. As explained in detail below, a segment 332 of the adhesive tape platform 330 includes one or more embedded energy sources (e.g., thin film batteries, common disk-shaped cell batteries, or rechargeable batteries or other energy storage devices, such as a super capacitor or charge pump) that can be configured to supply power to the wireless transducing circuit components 334 in the segment 332 in response to the detection of a change in capacitance between the segment 332 and the backing sheet 336 as a result of removing the segment 332 from the backing sheet 336.

Figure 4:
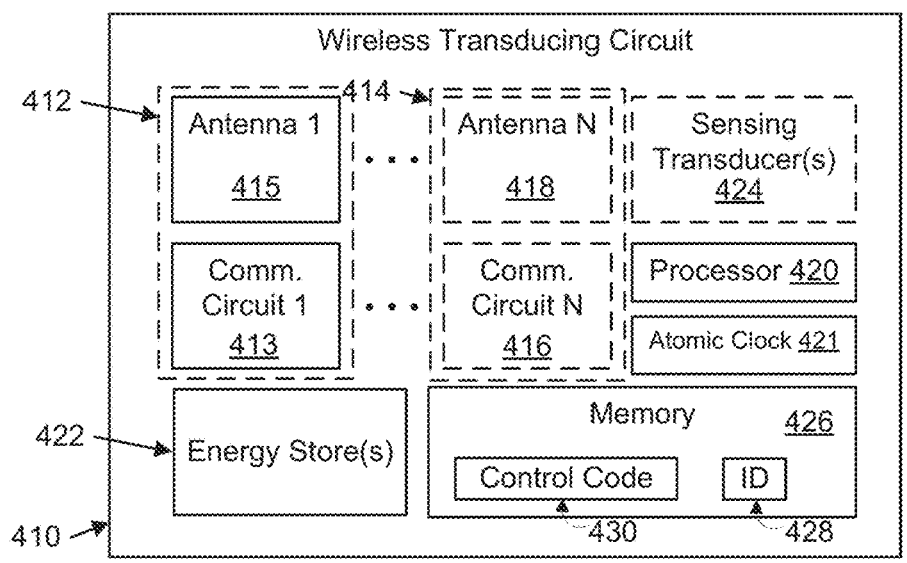
FIG. 4 is a schematic view of an example segment of an adhesive tape platform, according to an embodiment.

FIG. 4 shows a block diagram of the components of an example wireless transducing circuit 410 (e.g., an agent or an example of the wireless transducing circuits included in segments 113 or 332 discussed above) that includes one or more wireless communication modules 412, 414. Each wireless communication module 412, 414 includes a wireless communication circuit 413, 416, and an antenna 415, 418, respectively. Each wireless communication circuit 413, 416 may represent a receiver or transceiver integrated circuit that implements one or more of GSM/GPRS, Wi-Fi, LoRa, Bluetooth, Bluetooth Low Energy, Z-wave, and ZigBee. The wireless transducing circuit 410 also includes a processor 420 (e.g., a microcontroller or microprocessor), a solid-state atomic clock 421, at least one energy store 422 (e.g., non-rechargeable or rechargeable printed flexible battery, conventional single or multiple cell battery, and/or a super capacitor or charge pump), one or more sensing transducers 424 (e.g., sensors and/or actuators, and, optionally, one or more energy harvesting transducers). In some examples, the conventional single or multiple cell battery may be a watch style disk or button cell battery that is in an associated electrical connection apparatus (e.g., a metal clip) that electrically connects the electrodes of the battery to contact pads on the wireless transducing circuit 410.

Sensing transducers 424 may represent one or more of a capacitive sensor, an altimeter, a gyroscope, an accelerometer, a temperature sensor, a strain sensor, a pressure sensor, a piezoelectric sensor, a weight sensor, an optical or light sensor (e.g., a photodiode or a camera), an acoustic or sound sensor (e.g., a microphone), a smoke detector, a radioactivity sensor, a chemical sensor (e.g., an explosives detector), a biosensor (e.g., a blood glucose biosensor, odor detectors, antibody based pathogen, food, and water contaminant and toxin detectors, DNA detectors, microbial detectors, pregnancy detectors, and ozone detectors), a magnetic sensor, an electromagnetic field sensor, a humidity sensor, a light emitting units (e.g., light emitting diodes and displays), electro-acoustic transducers (e.g., audio speakers), electric motors, and thermal radiators (e.g., an electrical resistor or a thermoelectric cooler).

Figure 6A:
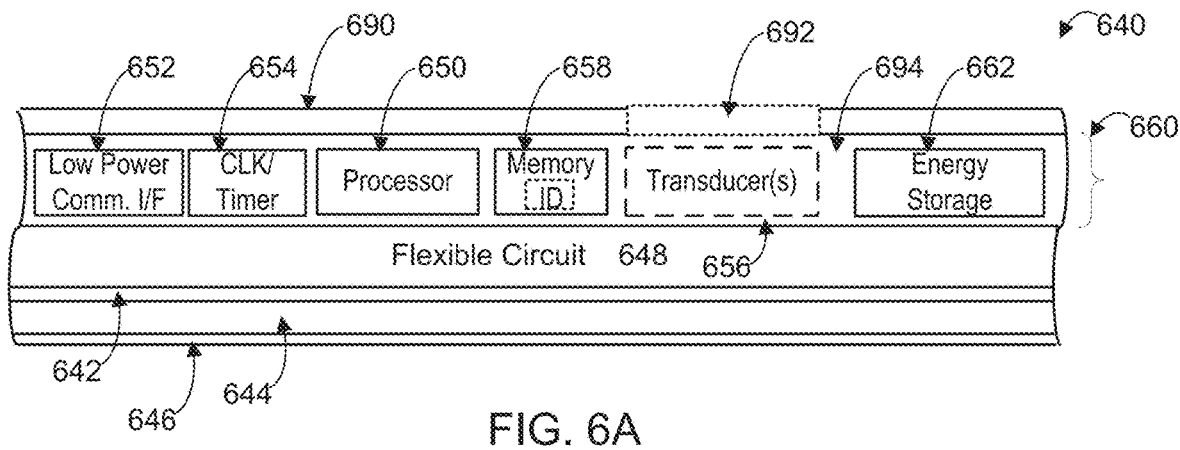
FIGS. 6A-C show diagrammatic cross-sectional side views of portions of different respective adhesive tape platforms, according to an embodiment.
Figure 6B:
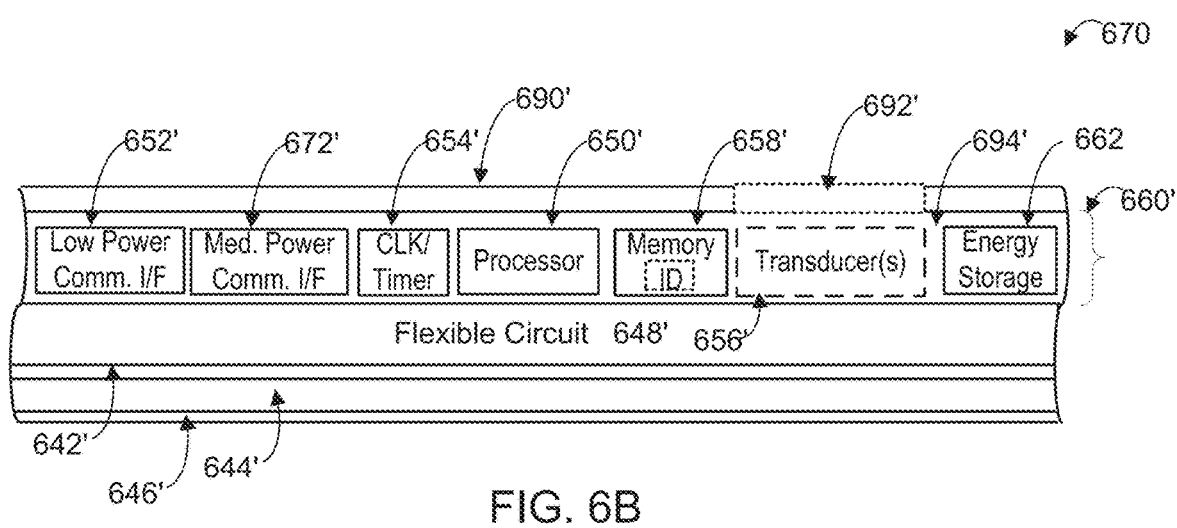
Figure 6C:
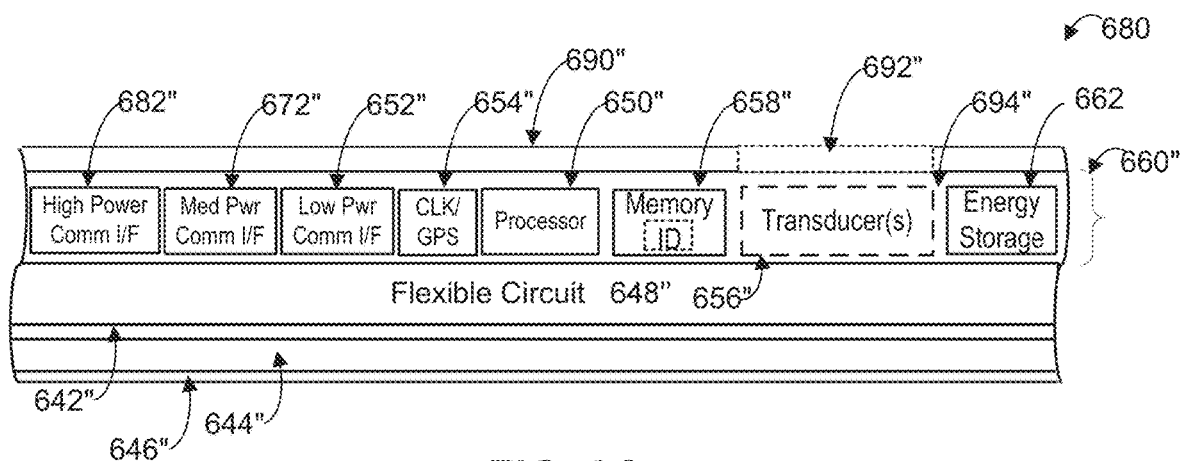

Wireless transducing circuit 410 includes a memory 426 for storing data, such as profile data, state data, event data, sensor data, localization data, security data, and/or at least one unique identifier (ID) 428 associated with the wireless transducing circuit 410, such as one or more of a product ID, a type ID, and a media access control (MAC) ID. Memory 426 may also store control code 430 that includes machine-readable instructions that, when executed by the processor 420, cause processor 420 to perform one or more autonomous agent tasks. In certain embodiments, the memory 426 is incorporated into one or more of the processor 420 or sensing transducers 424. In other embodiments, memory 426 is integrated in the wireless transducing circuit 410 as shown in FIG. 6A-C. The control code 430 may implement programmatic functions or program modules that control operation of the wireless transducing circuit 410, including implementation of an agent communication manager that manages the manner and timing of tape agent communications, a node-power manager that manages power consumption, and a tape agent connection manager that controls whether connections with other nodes are secure connections (e.g., connections secured by public key cryptography) or unsecure connections, and an agent storage manager that securely manages the local data storage on the wireless transducing circuit 410. In certain embodiments, a node connection manager ensures the level of security required by the end application and supports various encryption mechanisms. In some examples, a tape agent power manager and communication manager work together to optimize the battery consumption for data communication. In some examples, execution of the control code by the different types of nodes described herein may result in the performance of similar or different functions.

Figure 5:
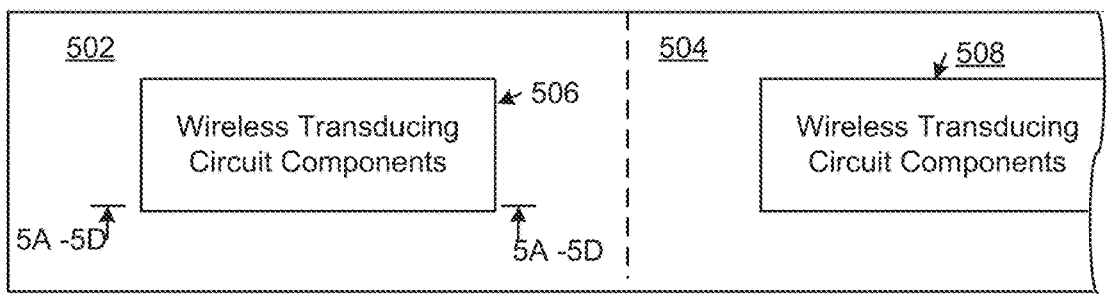
FIG. 5 is a diagrammatic top view of a length of an example adhesive tape platform, according to an embodiment.

FIG. 5 is a top view of a portion of an example flexible adhesive tape platform 500 that shows a first segment 502 and a portion of a second segment 504. Each segment 502, 504 of the flexible adhesive tape platform 500 includes a respective set 506, 508 of the components of the wireless transducing circuit 410 of FIG. 4. The segments 502, 504 and their respective sets of components 506, 508 typically are identical and configured in the same way. In some other embodiments, however, the segments 502, 504 and/or their respective sets of components 506, 508 are different and/or configured in different ways. For example, in some examples, different sets of the segments of the flexible adhesive tape platform 500 have different sets or configurations of tracking and/or transducing components that are designed and/or optimized for different applications, or different sets of segments of the flexible adhesive tape platform may have different ornamentations (e.g., markings on the exterior surface of the platform) and/or different (e.g., alternating) lengths.

Figure 7A:
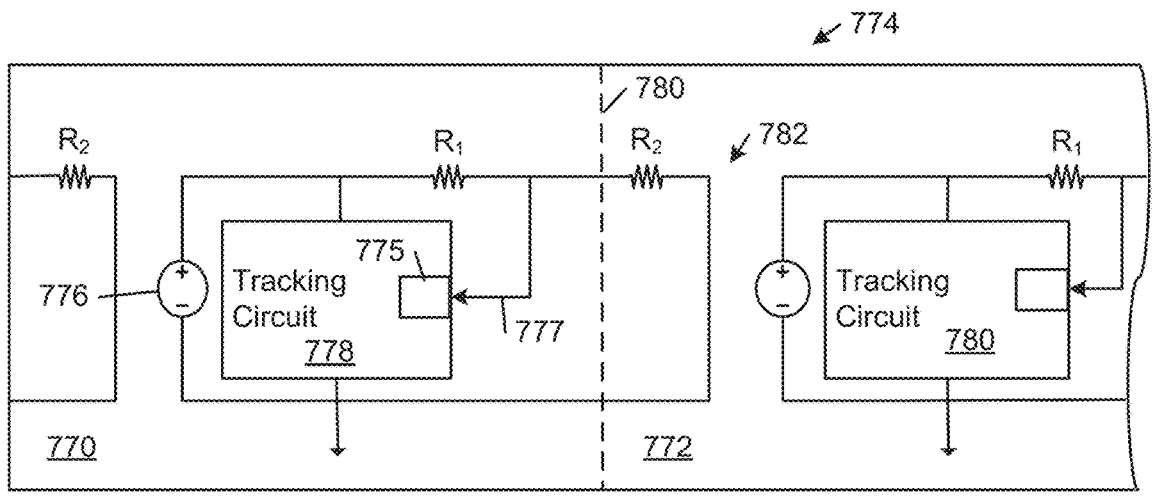
FIGS. 7A-C are diagrammatic top views of a length of an example tracking adhesive tape product, according to an embodiment.
Figure 7B:
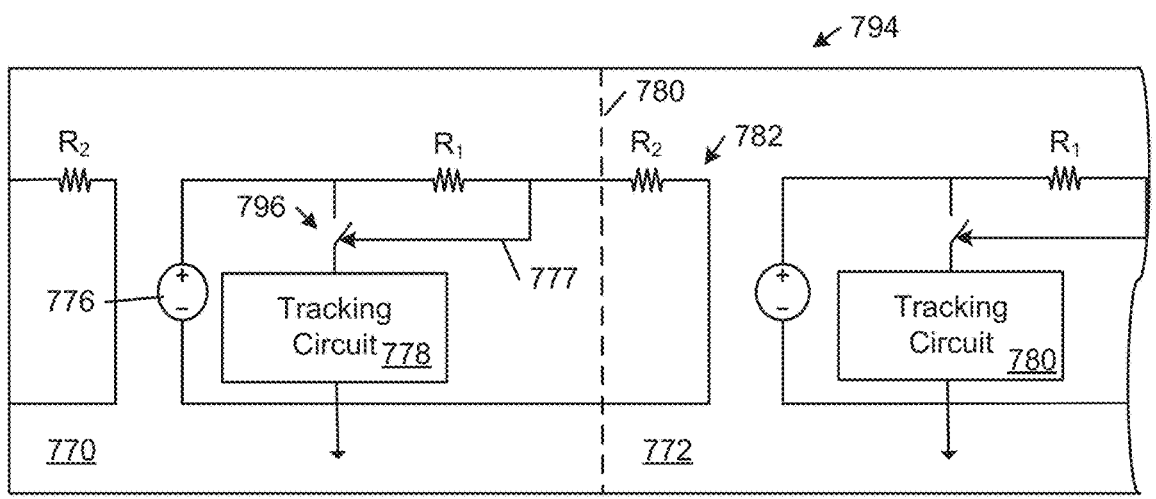
Figure 7C:
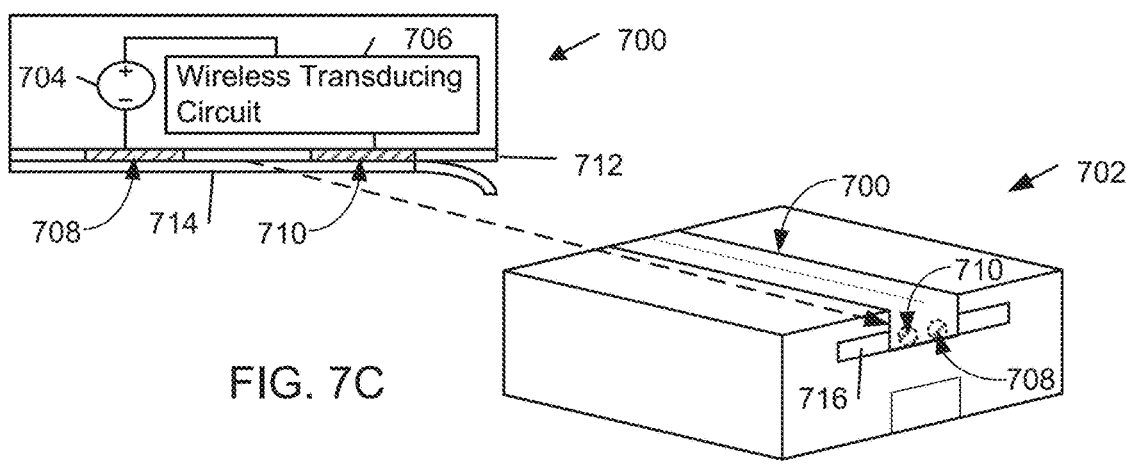

An example method of fabricating the adhesive tape platform 500 according to a roll-to-roll fabrication process is described in connection with FIGS. 5A-5C and as shown in FIGS. 7A and 7C of U.S. Pub. No. US 2018/0165568 A1, filed Dec. 14, 2017, the entirety of which is incorporated herein by reference.

The instant specification describes an example system of adhesive tape platforms (also referred to herein as "tape nodes") that can be used to implement a low-cost wireless network infrastructure for performing monitoring, tracking, and other asset management functions relating to, for example, parcels, persons, tools, equipment and other physical assets and objects. The example system includes a set of three different types of tape nodes that have different respective functionalities and different respective cover markings that visually distinguish the different tape node types from one another. In one non-limiting example, the covers of the different tape node types are marked with different colors (e.g., white, green, and black). In the illustrated examples, the different tape node types are distinguishable from one another by their respective wireless communications capabilities and their respective sensing capabilities.

FIG. 6A shows a cross-sectional side view of a portion of an example segment 640 of a flexible adhesive tape agent platform (e.g., platform 502 of FIG. 5) that includes a respective set of the components of the wireless transducing circuit 410 corresponding to the first tape-agent type (e.g., white). The segment 640 includes an adhesive layer 642, an optional flexible substrate 644, and an optional adhesive layer 646 on the bottom surface of the flexible substrate 644. When the bottom adhesive layer 646 is present, a release liner (not shown) may be (weakly) adhered to the bottom surface of the adhesive layer 646. In certain embodiments where adhesive layer 646 is included, the adhesive layer 646 is an adhesive (e.g., an acrylic foam adhesive) with a high-bond strength that is sufficient to prevent removal of the segment 640 from a surface on which the adhesive layer 646 is adhered to without destroying the physical or mechanical integrity of the segment 640 and/or one or more of its constituent components.

In certain embodiments including the optional flexible substrate 644, the optional flexible substrate 644 is a pre-fabricated adhesive tape that includes the adhesive layers 642 and 646 and the optional release liner. In other embodiments including the optional flexible substrate 644, the adhesive layers 642, 646 are applied to the top and bottom surfaces of the flexible substrate 644 during the fabrication of the adhesive tape platform. The adhesive layer 642 may bond the flexible substrate 644 to a bottom surface of a flexible circuit 648, that includes one or more wiring layers (not shown) that connect the processor 650, a low-power wireless-communication interface 652 (e.g., a Zigbee, Bluetooth® Low Energy (BLE) interface, or other low power communication interface), a clock and/or a timer circuit 654, transducing and/or transducer(s) 656 (if present), the memory 658, and other components in a device layer 660 to each other and to the energy storage device 662 and, thereby, enable the transducing, tracking and other functionalities of the segment 640. The low-power wireless-communication interface 652 typically includes one or more of the antennas 415, 418 and one or more of the wireless communication circuits 413, 416 of FIG. 4. The segment 640 may further include a flexible cover 690, an interfacial region 692, and a flexible polymer layer 694.

FIG. 6B shows a cross-sectional side-view of a portion of an example segment 670 of a flexible adhesive tape agent platform (e.g., platform 502 of FIG. 5) that includes a respective set of the components of the wireless transducing circuit 410 corresponding to a second tape-agent type (e.g., green). The segment 670 is similar to the segment 640 shown in FIG. 6A but further includes a medium-power communication-interface 672' (e.g., a LoRa interface) in addition to the low-power communications-interface 652. The medium-power communication-interface 672' has a longer communication range than the low-power communication-interface 652'. In certain embodiments, one or more other components of the segment 670 differ from the segment 640 in functionality or capacity (e.g., larger energy source). The segment 670 may include further components, as discussed above and below with reference to FIGS. 6A, and 6C.

FIG. 6C shows a cross-sectional side view of a portion of an example segment 680 of the flexible adhesive tape-agent platform that includes a respective set of the components of the wireless transducing circuit 410 corresponding to the third tape-node type (e.g., black). The segment 680 is similar to the segment 670 of FIG. 6B, but further includes a high-power communications-interface 682" (e.g., a cellular interface; e.g., GSM/GPRS) in addition to a low-power communications-interface 652", and may include a medium-power communications-interface 672". The high-power communications-interface 682" has a range that provides global coverage to available infrastructure (e.g. the cellular network). In certain embodiments, one or more other components of the segment 680 differ from the segment 670 in functionality or capacity (e.g., larger energy source).

FIGS. 6A-6C show embodiments in which the flexible covers 690, 690', 690" of the respective segments 640, 670, and 680 include one or more interfacial regions 692, 692', 692" positioned over one or more of the transducers 656, 656', 656". In certain embodiments, one or more of the interfacial regions 692, 692', 692" have features, properties, compositions, dimensions, and/or characteristics that are designed to improve the operating performance of the platform for specific applications. In certain embodiments, the flexible adhesive tape platform includes multiple interfacial regions 692, 692', 692" over respective transducers 656, 656', 656", which may be the same or different depending on the target applications. Interfacial regions may represent one or more of an opening, an optically transparent window, and/or a membrane located in the interfacial regions 692, 692', 692" of the flexible covers 690, 690', 690" that is positioned over the one or more transducers and/or transducers 656, 656', 656". Additional details regarding the structure and operation of example interfacial regions 692, 692', 692" are described in U.S. Provisional Patent Application No. 62/680,716, filed Jun. 5, 2018, and U.S. Provisional Patent Application No. 62/670,712, filed May 11, 2018.

In certain embodiments, a planarizing polymer 694, 694', 694" encapsulates the respective device layers 660, 660', 660" and thereby reduces the risk of damage that may result from the intrusion of contaminants and/or liquids (e.g., water) into the device layer 660, 660', 660". The flexible polymer layers 694, 694', 694" may also planarize the device layers 660, 660', 660". This facilitates optional stacking of additional layers on the device layers 660, 660', 660" and also distributes forces generated in, on, or across the segments 640, 670, 680 so as to reduce potentially damaging asymmetric stresses that might be caused by the application of bending, torquing, pressing, or other forces that may be applied to the segments 640, 670, 680 during use. In the illustrated example, a flexible cover 690, 690', 690" is bonded to the planarizing polymer 694, 694', 694" by an adhesive layer (not shown).

The flexible cover 690, 690', 690" and the flexible substrate 644, 644', 644" may have the same or different compositions depending on the intended application. In some examples, one or both of the flexible cover 690, 690', 690" and the flexible substrate 644, 644', 644" include flexible film layers and/or paper substrates, where the film layers may have reflective surfaces or reflective surface coatings. Compositions for the flexible film layers may represent one or more of polymer films, such as polyester, polyimide, polyethylene terephthalate (PET), and other plastics. The optional adhesive layer on the bottom surface of the flexible cover 690, 690', 690" and the adhesive layers 642, 642', 642", 646, 646', 646" on the top and bottom surfaces of the flexible substrate 644, 644', 644" typically include a pressure-sensitive adhesive (e.g., a silicon-based adhesive). In some examples, the adhesive layers are applied to the flexible cover 690, 690', 690" and the flexible substrate 644, 644', 644" during manufacture of the adhesive tape-agent platform (e.g., during a roll-to-roll or sheet-to-sheet fabrication process). In other examples, the flexible cover 690, 690', 690" may be implemented by a prefabricated single-sided pressure-sensitive adhesive tape and the flexible substrate 644, 644', 644" may be implemented by a prefabricated double-sided pressure-sensitive adhesive tape; both kinds of tape may be readily incorporated into a roll-to-roll or sheet-to-sheet fabrication process. In some examples, the flexible substrate 644, 644', 644" is composed of a flexible epoxy (e.g., silicone).

In certain embodiments, the energy storage device 662, 662', 662" is a flexible battery that includes a printed electrochemical cell, which includes a planar arrangement of an anode and a cathode and battery contact pads. In some examples, the flexible battery may include lithium-ion cells or nickel-cadmium electro-chemical cells. The flexible battery typically is formed by a process that includes printing or laminating the electro-chemical cells on a flexible substrate (e.g., a polymer film layer). In some examples, other components may be integrated on the same substrate as the flexible battery. For example, the low-power wireless-communication interface 652, 652', 652" and/or the processor(s) 650, 650', 650" may be integrated on the flexible battery substrate. In some examples, one or more of such components also (e.g., the flexible antennas and the flexible interconnect circuits) may be printed on the flexible battery substrate.

In examples of manufacture, the flexible circuit 648, 648', 648" is formed on a flexible substrate by one or more of printing, etching, or laminating circuit patterns on the flexible substrate. In certain embodiments, the flexible circuit 648, 648', 648" is implemented by one or more of a single-sided flex circuit, a double access or back-bared flex circuit, a sculpted flex circuit, a double-sided flex circuit, a multi-layer flex circuit, a rigid flex circuit, and a polymer-thick film flex circuit. A single-sided flexible circuit has a single conductor layer made of, for example, a metal or conductive (e.g., metal filled) polymer on a flexible dielectric film. A double access or back bared flexible circuit has a single conductor layer but is processed so as to allow access to selected features of the conductor pattern from both sides. A sculpted flex circuit is formed using a multi-step etching process that produces a flex circuit that has finished copper conductors that vary in thickness along their respective lengths. A multilayer flex circuit has three of more layers of conductors, where the layers typically are interconnected using plated through holes. Rigid flex circuits are a hybrid construction of flex circuit consisting of rigid and flexible substrates that are laminated together into a single structure, where the layers typically are electrically interconnected via plated through holes. In polymer thick film (PTF) flex circuits, the circuit conductors are printed onto a polymer base film, where there may be a single conductor layer or multiple conductor layers that are insulated from one another by respective printed insulating layers.

In the example segments 640, 670, 680 shown in FIGS. 6A-6C, the flexible circuit 648, 648', 648" represents a single-access flex-circuit that interconnects the components of the adhesive tape platform on a single side of the flexible circuit 648, 648', 648". However, in other embodiments, the flexible circuit 648, 648', 648" represents a double access flex circuit that includes a front-side conductive pattern that interconnects the low-power communications interface 652, 652', 652", the timer circuit 654, 654', 654", the processor 650, 650', 650", the one or more sensor transducers 656, 656', 656" (if present), and the memory 658, 658', 658", and allows through-hole access (not shown) to a back-side conductive pattern that is connected to the flexible battery (not shown). In these embodiments, the front-side conductive pattern of the flexible circuit 648, 648', 648" connects the communications circuits 652, 652', 652", 672', 672", 682" (e.g., receivers, transmitters, and transceivers) to their respective antennas and to the processor 650, 650', 650" and also connects the processor 650, 650', 650" to the one or more sensors and the memory 658, 658', and 658". The backside conductive pattern connects the active electronics (e.g., the processor 650, 650', 650", the communications circuits 652, 652', 652", 672', 672", 682" and the transducers) on the front-side of the flexible circuit 648, 648', 648" to the electrodes of the energy storage device 662, 662', 662" via one or more through holes in the substrate of the flexible circuit 648, 648', 648". The various units of the segments 640, 670, 680 shown in FIGS. 6A-6C may be arranged to accommodate different objects or structures (e.g., trash bins, fire extinguishers, etc.) and sensors may be added to, or subtracted from, the segments 640, 670, and 680, according to a particular task.

Depending on the target application, the wireless transducing circuits 410 are distributed across the flexible adhesive tape platform 500 according to a specified sampling density, which is the number of wireless transducing circuits 410 for a given unit size (e.g., length or area) of the flexible adhesive tape platform 500. In some examples, a set of multiple flexible adhesive tape platforms 500 are provided that include different respective sampling densities in order to seal different asset sizes with a desired number of wireless transducing circuits 410. In particular, the number of wireless transducing circuits per asset size is given by the product of the sampling density specified for the adhesive tape platform and the respective size of the adhesive tape platform 100 needed to seal the asset. This allows an automated packaging system to select the appropriate type of flexible adhesive tape platform 100 to use for sealing a given asset with the desired redundancy (if any) in the number of wireless transducer circuits 410. In some example applications (e.g., shipping low value goods), only one wireless transducing circuit 410 is used per asset, whereas in other applications (e.g., shipping high value goods) multiple wireless transducing circuits 410 are used per asset. Thus, a flexible adhesive tape platform 500 with a lower sampling density of wireless transducing circuits 410 can be used for the former application, and a flexible adhesive tape platform 100 with a higher sampling density of wireless transducing circuits 410 can be used for the latter application. In some examples, the flexible adhesive tape platforms 500 are color-coded or otherwise marked to indicate the respective sampling densities with which the wireless transducing circuits 410 are distributed across the different types of adhesive tape platforms 500.

Referring to FIG. 7A, in some examples, each of one or more of the segments 770, 772 of a tracking adhesive product 774 includes a respective circuit 775 that delivers power from the respective energy source 776 to the respective tracking circuit 778 (e.g., a processor and one or more wireless communications circuits) in response to an event. In some of these examples, the wake circuit 775 is configured to transition from an off-state to an on-state when the voltage on the wake node 777 exceeds a threshold level, at which point the wake circuit transitions to an on-state to power-on the segment 770. In the illustrated example, this occurs when the user separates the segment from the tracking adhesive product 774, for example, by cutting across the tracking adhesive product 774 at a designated location (e.g., along a designated cut-line 780). In particular, in its initial, un-cut state, a minimal amount of current flows through the resistors R1 and R2. As a result, the voltage on the wake node 777 remains below the threshold turn-on level. After the user cuts across the tracking adhesive product 774 along the designated cut-line 780, the user creates an open circuit in the loop 782, which pulls the voltage of the wake node above the threshold level and turns on the wake circuit 775. As a result, the voltage across the energy source 776 will appear across the tracking circuit 778 and, thereby, turn on the segment 770. In particular embodiments, the resistance value of resistor R1 is greater than the resistance value of R2. In some examples, the resistance values of resistors R1 and R2 are selected based on the overall design of the adhesive product system (e.g., the target wake voltage level and a target leakage current).

In some examples, each of one or more of the segments of a tracking adhesive product includes a respective sensor and a respective wake circuit that delivers power from the respective energy source to the respective one or more components of the respective tracking circuit 778 in response to an output of the sensor. In some examples, the respective sensor is a strain sensor that produces a wake signal based on a change in strain in the respective segment. In some of these examples, the strain sensor is affixed to a tracking adhesive product and configured to detect the stretching of the tracking adhesive product segment as the segment is being peeled off a roll or a sheet of the tracking adhesive product. In some examples, the respective sensor is a capacitive sensor that produces a wake signal based on a change in capacitance in the respective segment. In some of these examples, the capacitive sensor is affixed to a tracking adhesive product and configured to detect the separation of the tracking adhesive product segment from a roll or a sheet of the tracking adhesive product. In some examples, the respective sensor is a flex sensor that produces a wake signal based on a change in curvature in the respective segment. In some of these examples, the flex sensor is affixed to a tracking adhesive product and configured to detect bending of the tracking adhesive product segment as the segment is being peeled off a roll or a sheet of the tracking adhesive product. In some examples, the respective sensor is a near field communications sensor that produces a wake signal based on a change in inductance in the respective segment.

FIG. 7B shows another example of a tracking adhesive product 794 that delivers power from the respective energy source 776 to the respective tracking circuit 778 (e.g., a processor and one or more wireless communications circuits) in response to an event. This example is similar in structure and operation as the tracking adhesive product 794 shown in FIG. 7A, except that the wake circuit 775 is replaced by a switch 796 that is configured to transition from an open state to a closed state when the voltage on the switch node 777 exceeds a threshold level. In the initial state of the tracking adhesive product 794, the voltage on the switch node is below the threshold level as a result of the low current level flowing through the resistors R1 and R2. After the user cuts across the tracking adhesive product 794 along the designated cut-line 780, the user creates an open circuit in the loop 782, which pulls up the voltage on the switch node above the threshold level to close the switch 796 and turn on the tracking circuit 778.

FIG. 7C shows a diagrammatic cross-sectional front view of an example adhesive tape platform 700 and a perspective view of an example asset 702. Instead of activating the adhesive tape platform 700 in response to separating a segment of the adhesive tape platform 700 from a roll or a sheet of the adhesive tape platform, this example is configured to supply power from the energy source 702 to turn on the wireless transducing circuit 706 in response to establishing an electrical connection between two power terminals 708, 710 that are integrated into the adhesive tape platform. In particular, each segment of the adhesive tape platform 700 includes a respective set of embedded tracking components, an adhesive layer 712, and an optional backing sheet 714 with a release coating that prevents the segments from adhering strongly to the backing sheet 714. In some examples, the power terminals 708, 710 are composed of an electrically conductive material (e.g., a metal, such as copper) that may be printed or otherwise patterned and/or deposited on the backside of the adhesive tape platform 700. In operation, the adhesive tape platform can be activated by removing the backing sheet 714 and applying the exposed adhesive layer 712 to a surface that includes an electrically conductive region 716. In the illustrated embodiment, the electrically conductive region 716 is disposed on a portion of the asset 702. When the adhesive backside of the adhesive tape platform 700 is adhered to the asset with the exposed terminals 708, 710 aligned and in contact with the electrically conductive region 716 on the asset 702, an electrical connection is created through the electrically conductive region 716 between the exposed terminals 708, 710 that completes the circuit and turns on the wireless transducing circuit 706. In particular embodiments, the power terminals 708, 710 are electrically connected to any respective nodes of the wireless transducing circuit 706 that would result in the activation of the tracking circuit 706 in response to the creation of an electrical connection between the power terminals 708, 710.

In some examples, after a tape node is turned on, it will communicate with the network service to confirm that the user/operator who is associated with the tape node is an authorized user who has authenticated himself or herself to the network service. In these examples, if the tape node cannot confirm that the user/operator is an authorized user, the tape node will turn itself off.

Figure 8:
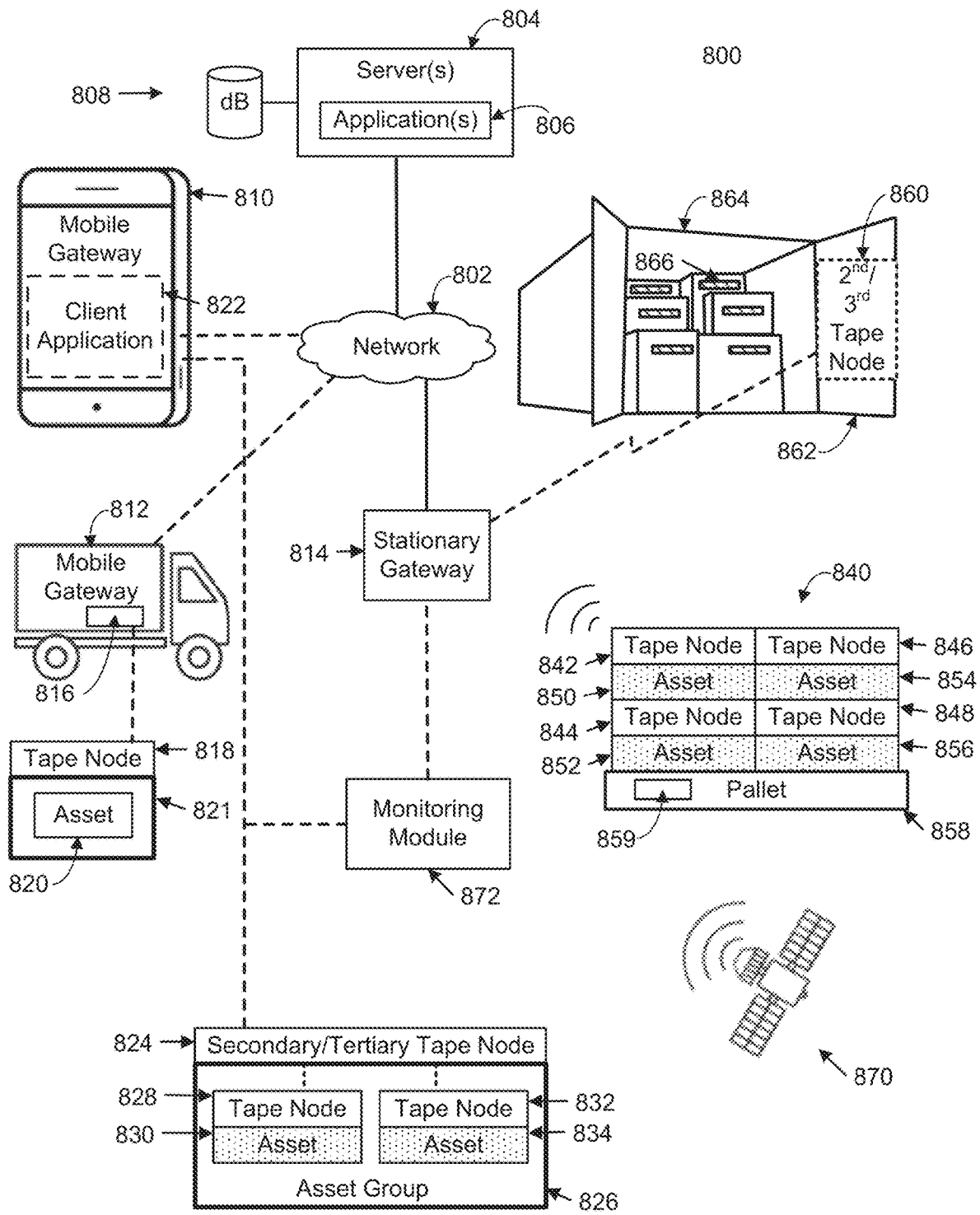
FIG. 8 is a diagrammatic view of an example of a wireless sensing system supporting communications with segments of an adhesive tape platform, according to an embodiment.

FIG. 8 shows an example network communications environment 800 (herein used interchangeably with "wireless sensing system 800" and with "wireless tracking system 800") that includes a network 802 that supports communications between one or more servers 804 executing one or more applications of a network service 808, mobile gateways 810 (a smart device mobile gateway), 812 (a vehicle mobile gateway), a stationary gateway 814, and various types of tape nodes that are associated with various assets (e.g., parcels, equipment, tools, persons, and other things). Hereinafter "tape nodes" may be used interchangeably with the "agents", as described above, with reference to FIGS. 1-7; the "agents" are in the form of a "tape node" attached to different objects, e.g., an asset, storage container, vehicle, equipment, etc.; the master agent may be referred to as a master tape node, a secondary agent may be referred to as a secondary tape node; and a tertiary agent may be referred to as a tertiary tape node.

In some examples, the network 802 (e.g., a wireless network) includes one or more network communication systems and technologies, including any one or more of wide area networks, local area networks, public networks (e.g., the internet), private networks (e.g., intranets and extranets), wired networks, and wireless networks. For example, the network 802 includes communications infrastructure equipment, such as a geolocation satellite system 870 (e.g., GPS, GLONASS, and NAVSTAR), cellular communication systems (e.g., GSM/GPRS), Wi-Fi communication systems, RF communication systems (e.g., LoRa), Bluetooth communication systems (e.g., a Bluetooth Low Energy system), Z-wave communication systems, and ZigBee communication systems.

In some examples, the one or more network service applications leverage the above-mentioned communications technologies to create a hierarchical wireless network of tape nodes improves asset management operations by reducing costs and improving efficiency in a wide range of processes, from asset packaging, asset transporting, asset tracking, asset condition monitoring, asset inventorying, and asset security verification. Communication across the network is secured by a variety of different security mechanisms. In the case of existing infrastructure, a communication link uses the infrastructure security mechanisms. In the case of communications among tapes nodes, the communication is secured through a custom security mechanism. In certain cases, tape nodes may also be configured to support block chain to protect the transmitted and stored data.

The network communications environment 800 (herein used interchangeably with "network 800") includes a plurality of wireless nodes configured to detect tampering in assets (or other forms of events, such as temperature differentials, humidity differentials, acceleration differentials, etc.). Tampering may include, but is not limited to, opening assets such as boxes, containers, storage, or doors (e.g., of an asset container 864), moving the asset without authorization, moving the asset to an unintended location, moving the asset in an unintended way, damaging the asset, shaking the asset in an unintended way, orienting an asset in a way that it is not meant to be oriented. In many cases, these actions may compromise the integrity or safety of assets. Wireless nodes associated with the asset are configured to detect a tampering event. In an embodiment, a tampering event is associated with an action, a time, and a location. In an embodiment, the wireless nodes communicate the tampering event to the network 800. The network 800 is configured to provide a notification or alert to a user (e.g., authenticated user) of the network 800. In some embodiments, a wireless node may directly transmit the notification or alert to the user (e.g., to a client device, such as the mobile gateway 810, operated by an authorized user). In other embodiments, a wireless node may include a display that indicates whether or not a tampering event has occurred (e.g., the display may be an indicator light or LED).

Alerts may be transmitted to the server/cloud, other wireless nodes, a client device, or some combination thereof, as discussed below. For example, in an embodiment, a wireless node of the network 800 captures sensor data, detects a tampering event, and transmits an alarm to a user of the wireless sensing system (e.g., without communicating with a server or cloud of the wireless sensing system). In another embodiment, a wireless node of the network 800 captures sensor data and transmits the sensor data to a gateway, parent node (e.g., black tape), or client device. The gateway, parent node, or client device detects a tampering event based on the received sensor data and transmits an alarm to a user of the network 800. In another embodiment, the wireless node of the network 800 captures sensor data, detects a tampering event, and transmits information describing the tampering event to a server or cloud of the network 800, in the form of a list with tampering events at specific times, along with which tape node or containers were tampered with. The server or cloud of the wireless sensing system transmits an alarm to a user of the wireless sensing system.

A network of tape nodes may be configured by the network service to create hierarchical communications network. The hierarchy may be defined in terms of one or more factors, including functionality (e.g., wireless transmission range or power), role (e.g., master-tape node vs. peripheral-tape node), or cost (e.g., a tape node equipped with a cellular transceiver vs. a peripheral tape node equipped with a Bluetooth LE transceiver). As described above with reference to the agents, tape nodes may be assigned to different levels of a hierarchical network according to one or more of the above-mentioned factors. For example, the hierarchy may be defined in terms of communication range or power, where tape nodes with higher-power or longer-communication range transceivers are arranged at a higher level of the hierarchy than tape nodes with lower-power or lower-range power or lower range transceivers. In another example, the hierarchy is defined in terms of role, where, e.g., a master tape node is programmed to bridge communications between a designated group of peripheral tape nodes and a gateway node or server node. The problem of finding an optimal hierarchical structure may be formulated as an optimization problem with battery capacity of nodes, power consumption in various modes of operation, desired latency, external environment, etc. and may be solved using modern optimization methods e.g. neural networks, artificial intelligence, and other machine learning computing systems that take expected and historical data to create an optimal solution and may create algorithms for modifying the system's behavior adaptively in the field.

The tape nodes may be deployed by automated equipment or manually. In this process, a tape node typically is separated from a roll or sheet and adhered to a parcel (e.g., asset 820) or other stationary (e.g., stationary gateway 814) or mobile object (e.g., a, such as a delivery truck, such as mobile gateway 812) or stationary object (e.g., a structural element of a building). This process activates the tape node (e.g., the tape node 818) and causes the tape node 818 to communicate with the one or more servers 804 of the network service 808. In this process, the tape node 418 may communicate through one or more other tape nodes (e.g., the tape nodes 842, 844, 846, 848) in the communication hierarchy. In this process, the one or more servers 804 executes the network service application 806 to programmatically configure tape nodes 818, 824, 828, 832, 842, 844, 846, 848, that are deployed in the network communications environment 800. In some examples, there are multiple classes or types of tape nodes (e.g., the master agent 842-848, 859, secondary agent 824, 860, or tertiary agent 824, 860 shown in FIG. 8), where each tape node class has a different respective set of functionalities and/or capacities, as described above with respect to the "agents" in FIGS. 1-7. For example, the master agents 842-848, 859 (with reference to FIG. 6A have a lower-power wireless communication interface (e.g., the low-power wireless-communication interface 652, with reference to FIG. 6A), in comparison to the secondary and tertiary agents 824, 860 (with reference to FIG. 6B,C).

In some examples, the one or more servers 804 communicate over the network 802 with one or more gateways 810, 812, 814 that are configured to send, transmit, forward, or relay messages to the network 802 in response to transmissions from the tape nodes 818, 824, 828, 832, 842, 844, 846, 848 that are associated with respective assets and within communication range. Example gateways include mobile gateways 810, 812 and a stationary gateway 814. In some examples, the mobile gateways 810, 812, and the stationary gateway 814 are able to communicate with the network 802 and with designated sets or groups of tape nodes.

In some examples, the mobile gateway 812 is a vehicle (e.g., a delivery truck or other mobile hub) that includes a wireless communications unit 816 that is configured by the network service 808 to communicate with a designated network of tape nodes, including tape node 818 (e.g., a master tape node) in the form of a label that is adhered to a parcel 821 (e.g., an envelope) that contains an asset 820, and is further configured to communicate with the network service 808 over the network 802. In some examples, the tape node 818 includes a lower-power wireless-communications interface of the type used in, e.g., segment 640 (shown in FIG. 6A), and the wireless communications unit 816 may implemented by a secondary or tertiary tape node (e.g., one of segment 670 or segment 680, respectively shown in FIGS. 6B and 6C) that includes a lower-power communications interfaces for communicating with tape nodes within range of the mobile gateway 812 and a higher-power communications-interface for communicating with the network 802. In this way, the tape node 818 and wireless communications unit 816 create a hierarchical wireless network of tape nodes for transmitting, forwarding, bridging, relaying, or otherwise communicating wireless messages to, between, or on behalf of the tape node 818 in a power-efficient and cost-effective way.

In some examples, a mobile gateway 810 is a mobile phone (or other mobile device, such as a handheld computing device, laptop, tablet, etc.) that is operated by a human operator and executes a client application 822 that is configured by a network service to communicate with a designated set of tape nodes, including a secondary or tertiary tape node 824 that is adhered to a parcel 826 (e.g., a box), and is further configured to communicate with a server 804 over the network 802. In some embodiments, the client application 822 is accessible to authorized users and the authorize users may have varying levels of access to data stored in the network 800. For example, an employee (e.g., border patrol agent) at a checkpoint may have more access than a non-employee user, who may be granted a temporary access for a limited purpose of tracking a particular asset during the voyage, with a final destination to the non-employee user. This limited access for the non-employee user may be to ensure a safe chain-of-custody from end-to-end, without tampering, and it may be applicable to any type of asset.

In some embodiments, the client application 822 is installed on a mobile device (e.g., smartphone) that may also operate as mobile gateway 810. The client application 822 may cause the mobile device to function as a mobile gateway 810. For example, the client application 822 runs in the background to allow the mobile device to bridge communications between tape nodes that are communicating on one protocol to other tape nodes that are communicating on another protocol. For example, a tape node transmits data to the mobile device through Bluetooth, and the mobile device (running the client application 822) relays that data to the server 804 via cellular (2G, 3G, 4G, 5G or other cellular-based wireless communication protocol) or Wi-Fi. Further, the client application 822 may cause the mobile device to establish a connection with, and receive pings (e.g., alerts to nearby assets that an environmental profile threshold has been exceeded), from the tape nodes or from the server 804. The tape nodes or server may request services (e.g., to display alert messages within a graphical user interface of the mobile device, relay messages to nearby tape nodes or mobile or stationary gateways, delegate tasks to the mobile device, such as determining the location of the tape node, etc.) from the mobile device. For example, the mobile device running the client application 822 may share location data with the tape node, allowing the tape node to pinpoint its location.

In the illustrated example, the parcel 826 contains a first parcel labeled or sealed by a master tape node 828 and containing a first asset 830, and a second parcel labeled or sealed by a master tape node 832 and containing a second asset 834. The secondary or tertiary tape node 824 communicates with each of the master tape nodes 828, 832 and also communicates with the mobile gateway 810. In some examples, each of the master tape nodes 828, 832 includes a lower-power wireless-communications interface of the type used in, e.g., segment 640 (shown in FIG. 6A), and the secondary/tertiary tape node 824 is implemented by a tape node (e.g., segment 670 or segment 680, shown in FIGS. 6B and 6C) that includes a low-power communications interface for communicating with the master tape nodes 828, 832 contained within the parcel 826, and a higher-power communications interface for communicating with the mobile gateway 810. The secondary or tertiary tape node 824 is operable to relay wireless communications between the master tape nodes 828, 832 contained within the parcel 826 and the mobile gateway 810, and the mobile gateway 810 is operable to relay wireless communications between the secondary or tertiary tape node 824 and the server 804 over the network 802. In this way, the master tape nodes 828 and 832 and the secondary or tertiary tape node 824 create a wireless network of nodes for transmitting, forwarding, relaying, or otherwise communicating wireless messages to, between, or on behalf of the master tape nodes 828, 832, the secondary or tertiary tape node 824, and the network service (not shown) in a power-efficient and cost-effective way.

In some examples, the stationary gateway 814 is implemented by a server 804 executing a network service application 806 that is configured by the network service 808 to communicate with a designated set 840 of master tape nodes 842, 844, 846, 848 that are adhered to respective parcels containing respective assets 850, 852, 854, 856 on a pallet 858. In other examples, the stationary gateway 814 is implemented by a secondary or tertiary tape node 860 (e.g., segments 670 or 680, respectively shown in FIGS. 6B and 6C) that is adhered to, for example, a wall, column or other infrastructure component of the physical premise's environment 800, and includes a low-power communications interface for communicating with nodes within range of the stationary gateway 814 and a higher-power communications interface for communicating with the network 802.

Figure 12:
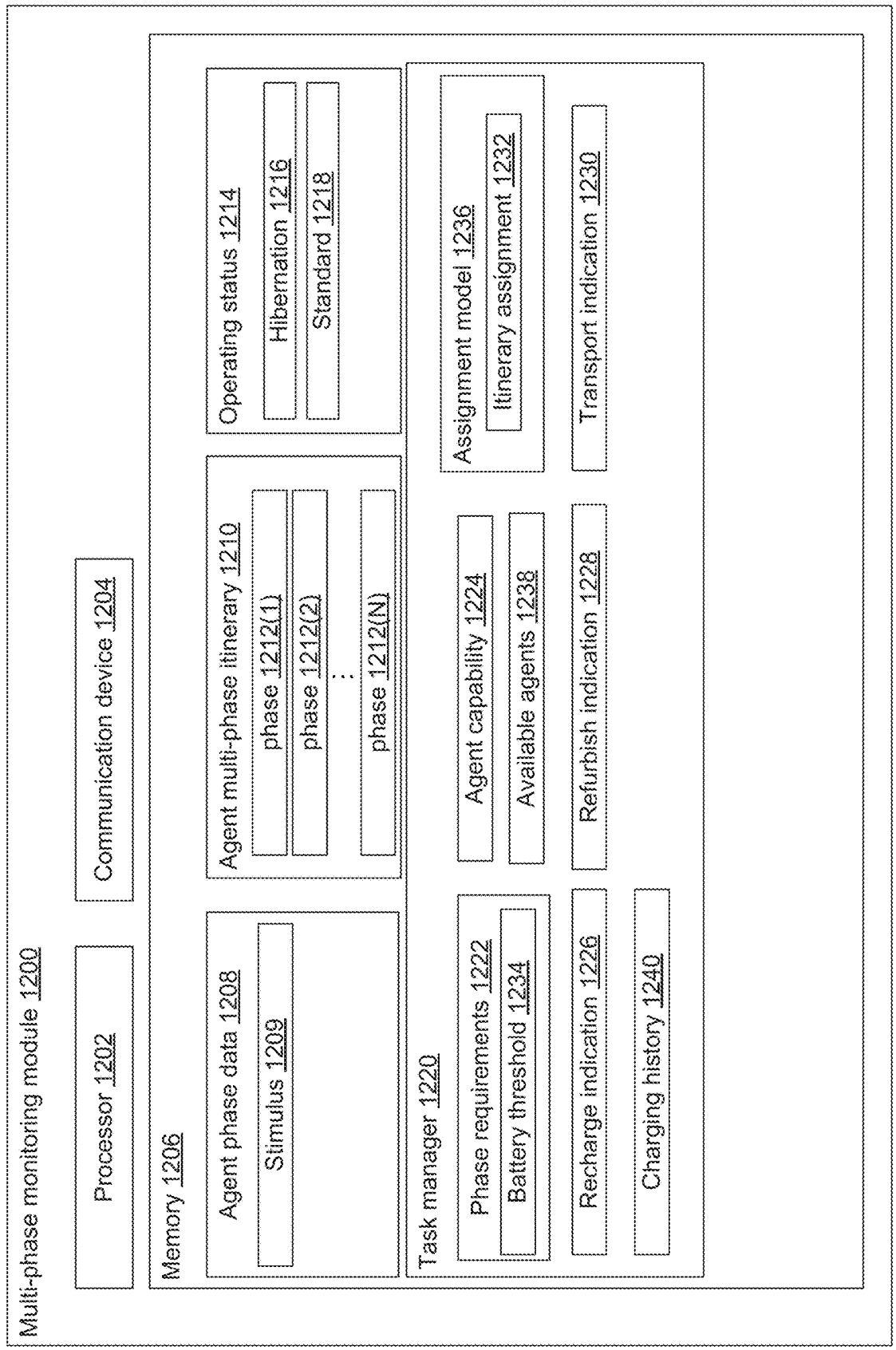
FIG. 12 is an example multi-phase monitoring module, according to an embodiment.

In embodiments, the wireless networking system 800 further includes a monitoring module 872 (which may include any one or more of the features and functionalities discussed below with respect to the monitoring module of FIG. 12, and which may be incorporated within the smart vending machine 3000, with reference to FIGS. 29 and 30). Monitoring module 872 is shown as a stand-alone device, but it should be appreciated that it may be incorporated as a component of one or more of any of the tape nodes, gateways, server, or other devices of the wireless tracking system 800. Monitoring module 872 is communicatively coupled to the stationary gateway 804, mobile gateway 810, the server 804, etc. The monitoring module 872 may be located within a facility (e.g., a distribution center, manufacturing facility, shipping facility, etc.) and receive, organize, monitor, and/or dispense tape nodes based on an agent (e.g., tape node) multi-phase itinerary (e.g., as discussed below with reference to FIGS. 12, 29, and 30), located within memory. The monitoring module 872 may be operated or receive instructions, from the client device, mobile gateway 810, 812, and/or stationary gateway 814 for identifying a subset of a plurality of tape nodes. The monitoring module 872 may organize the received tape nodes according to the functionality of the tape nodes, and may dispense tape nodes in preparation of multi-phase transport (e.g., an incoming shipment to the facility) that requires a new tape node adhered to an asset. In embodiments, the tape distribution device 872 may further accept tape nodes that require recycling or refurbishment and prepare the tape nodes for shipment. The monitoring module 872 may further identify tape nodes requiring recharging. In embodiments, the monitoring module 872 may scan an identifier 122 of the tape node and relay information regarding the tape node to the server 804 or the database 808, via the stationary gateway 814.

In one embodiment, each of the master tape nodes 842-848 is a master tape node and is configured by the network service 808 to communicate individually with the stationary gateway 814, which relays communications from the master tape nodes 842-848 to the network service 808 through the stationary gateway 814 and over the network 802. In another embodiment, one of the master tape nodes 842-848 at a time is configured to transmit, forward, relay, or otherwise communicate wireless messages to, between, or on behalf of the other master nodes on the pallet 858. In this embodiment, the master tape node may be determined by the master tape nodes 842-848 or designated by the network service 808. In some examples, the master tape nodes 842-848 with the longest range or highest remaining power level is determined to be the master tape node. In some examples, when the power level of the current master tape node drops below a certain level (e.g., a fixed power threshold level or a threshold level relative to the power levels of one or more of the other master tape nodes), another one of the master tape nodes assumes the role of the master tape node. In some examples, a master tape node 859 is adhered to the pallet 858 and is configured to perform the role of a master node for the other master tape nodes 842-848. In these ways, the master tape nodes 842-848, 859 are configurable to create different wireless networks of nodes for transmitting, forwarding, relaying, bridging, or otherwise communicating wireless messages with the network service 408 through the stationary gateway 814 and over the network 802 in a power-efficient and cost-effective way.

In the illustrated example, the stationary gateway 814 also is configured by the network service 808 to communicate with a designated network of tape nodes, including the secondary or tertiary tape node 860 that is adhered to the inside of a door 862 of an asset container 864, and is further configured to communicate with the network service 808 over the network 802. In the illustrated example, the asset container 864 contains a number of parcels labeled or sealed by respective master tape nodes 866 and containing respective assets. The secondary or tertiary tape node 860 communicates with each of the master tape nodes 866 within the asset container 864 and communicates with the stationary gateway 814. In some examples, each of the master tape nodes 866 includes a low-power wireless communications-interface (e.g., the low-power wireless-communication interface 652, with reference to FIG. 6A), and the secondary or tertiary tape node 860 includes a low-power wireless-communications interface (low-power wireless-communication interfaces 652', 652", with reference to FIGS. 6B-6C) for communicating with the master tape nodes 866 contained within the asset container 864, and a higher-power wireless-communications interface (e.g., medium-power wireless-communication interface 672', medium-power wireless-communication interface 672", high-power wireless-communication interface 682", with reference to FIGS. 6B-6C) for communicating with the stationary gateway 814. In some examples, either a secondary or tertiary tape node, or both, may be used, depending on whether a high-power wireless-communication interface is necessary for sufficient communication.

In some examples, when the doors of the asset container 864 are closed, the secondary or tertiary tape node 860 is operable to communicate wirelessly with the master tape nodes 866 contained within the asset container 864. In some embodiments, both a secondary and a tertiary node are attached to the asset container 864. Whether a secondary and a tertiary node are used may depend on the range requirements of the wireless-communications interface. For example, if out at sea a node will be required to transmit and receive signals from a server located outside the range of a medium-power wireless-communications interface, a tertiary node will be used because the tertiary node includes a high-power wireless-communications interface.

In an example, the secondary or tertiary tape node 860 is configured to collect sensor data from master tape nodes 866 and, in some embodiments, process the collected data to generate, for example, statistics from the collected data. When the doors of the asset container 864 are open, the secondary or tertiary tape node 860 is programmed to detect the door opening (e.g., using a photodetector or an accelerometer component of the secondary or tertiary tape node 860) and, in addition to reporting the door opening event to the network service 808, the secondary or tertiary tape node 860 is further programmed to transmit the collected data and/or the processed data in one or more wireless messages to the stationary gateway 814. The stationary gateway 814, in turn, is operable to transmit the wireless messages received from the secondary or tertiary tape node 860 to the network service 808 over the network 802. Alternatively, in some examples, the stationary gateway 814 also is operable to perform operations on the data received from the secondary or tertiary tape node 860 with the same type of data produced by the secondary or tertiary tape node 860 based on sensor data collected from the master tape nodes 842-848. In this way, the secondary or tertiary tape node 860 and master tape node 866 create a wireless network of nodes for transmitting, forwarding, relaying, or otherwise communicating wireless messages to, between, or on behalf of the master tape node 866, the secondary or tertiary tape nodes 860, and the network service 808 in a power-efficient and cost-effective way.

In an example of the embodiment shown in FIG. 8, there are three types of backward compatible tape nodes: a short-range master tape node (e.g., segment 640), a medium-range secondary tape node (e.g., segment 670), and a long-range tertiary tape node (e.g. segment 680), as respectively shown in FIGS. 6A-6C (here, "tape node" is used interchangeably with "agent", as described with reference to FIGS. 1-6). The short-range master tape nodes typically are adhered directly to parcels containing assets. In the illustrated example, the master tape nodes 818, 828, 832, 842-848, 866 are short-range tape nodes. The short-range tape nodes typically communicate with a low-power wireless-communication protocol (e.g., Bluetooth LE, Zigbee, or Z-wave). The segment 670 typically adheres to objects (e.g., a parcel 826 and an asset container 864) that are associated with multiple parcels that are separated from the medium-range tape nodes by a barrier or a long distance. In the illustrated example, the secondary and/or tertiary tape nodes 824 and 860 are medium-range tape nodes. The medium-range tape nodes typically communicate with low and medium-power wireless-communication protocols (e.g., Bluetooth, LoRa, or Wi-Fi). The segments 680 typically are adhered to mobile or stationary infrastructure of the network communications environment 800.

In the illustrated example, the mobile gateway 812 and the stationary gateway 814 are implemented by, e.g., segment 680. The segments 680 typically communicate with other nodes using a high-power wireless-communication protocol (e.g., a cellular data communication protocol). In some examples, the wireless communications unit 416 (a secondary or tertiary tape node) is adhered to a mobile gateway 812 (e.g., a truck). In these examples, the wireless communications unit 816 may be moved to different locations in the network communications environment 800 to assist in connecting other tape nodes to the wireless communications unit 816. In some examples, the stationary gateway 814 is a tape node that may be attached to a stationary structure (e.g., a wall) in the network communications environment 800 with a known geographic location (e.g., GPS coordinates). In these examples, other tape nodes in the environment may determine their geographic location by querying the stationary gateway 814.

In some examples, in order to conserve power, the tape nodes typically communicate according to a schedule promulgated by the network service 808. The schedule usually dictates all aspects of the communication, including the times when particular tape nodes should communicate, the mode of communication, and the contents of the communication. In one example, the server (not shown) transmits programmatic Global Scheduling Description Language (GSDL) code to the master tape node and each of the secondary and tertiary tape nodes in the designated set. In this example, execution of the GSDL code causes each of the tape nodes in the designated set to connect to the master tape node at a different respective time that is specified in the GSDL code, and to communicate a respective set of one or more data packets of one or more specified types of information over the respective connection. In some examples, the master tape node simply forwards the data packets to the server 804, either directly or indirectly through a gateway tape node (e.g., the long-range tape node, such as wireless communication unit 816, adhered to the mobile gateway 812, or a long-range tape node, such as stationary gateway 814, that is adhered to an infrastructure component of the network communications environment 800). In other examples, the master tape node processes the information contained in the received data packets and transmits the processed information to the server 804.

Figure 9:
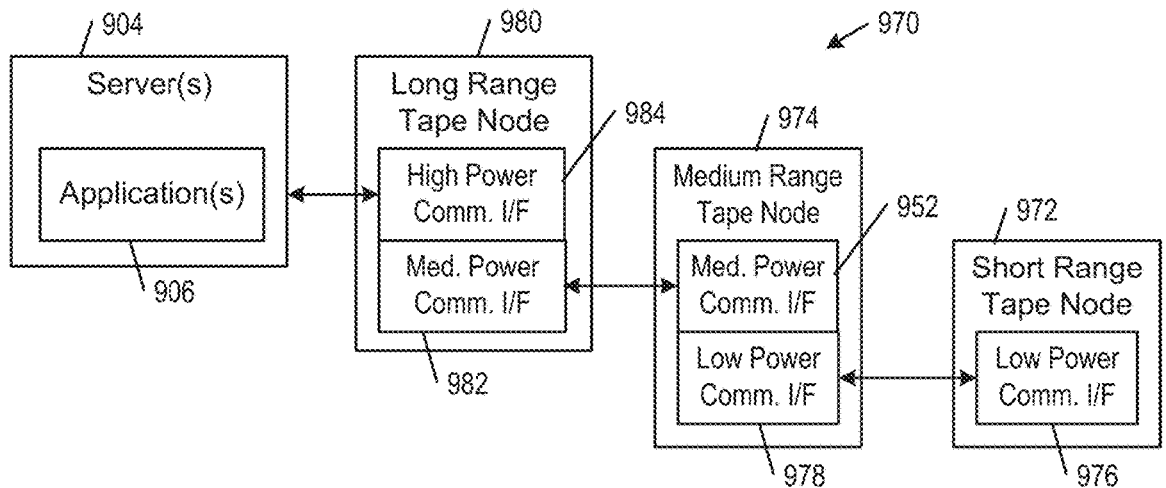
FIG. 9 is a diagrammatic view of a hierarchical communications network including an adhesive tape platform, according to an embodiment.

FIG. 9 shows an example hierarchical wireless communications network of tape nodes 970. In this example, the short-range tape node 972 and the medium range tape node 974 communicate with one another over their respective low power wireless communication interfaces 976, 978. The medium range tape node 974 and the long-range tape node 980 communicate with one another over their respective medium power wireless communication interfaces 978, 982. The long-range tape node 980 and the one or more network service servers 904 communicate with one another over the high-power communication interface 984. In some examples, the low power communication interfaces 976, 978 establish wireless communications with one another in accordance with the Bluetooth LE protocol, the medium power communication interfaces 986, 982 establish wireless communications with one another in accordance with the LoRa communications protocol, and the high-power communication interface 984 establishes wireless communications with the one or more network service servers 904 in accordance with a cellular communications protocol.

In some examples, the different types of tape nodes are deployed at different levels in the communications hierarchy according to their respective communications ranges, with the long-range tape nodes generally at the top of the hierarchy, the medium range tape nodes generally in the middle of the hierarchy, and the short-range tape nodes generally at the bottom of the hierarchy. In some examples, the different types of tape nodes are implemented with different feature sets that are associated with component costs and operational costs that vary according to their respective levels in the hierarchy. This allows system administrators flexibility to optimize the deployment of the tape nodes to achieve various objectives, including cost minimization, asset tracking, asset localization, and power conservation.

In some examples, one or more network service servers 904 of the network service 908 designates a tape node at a higher level in a hierarchical communications network as a master node of a designated set of tape nodes at a lower level in the hierarchical communications network. For example, the designated master tape node may be adhered to a parcel (e.g., a box, pallet, or asset container) that contains one or more tape nodes that are adhered to one or more packages containing respective assets. In order to conserve power, the tape nodes typically communicate according to a schedule promulgated by the one or more network service servers 904 of the network service 908. The schedule usually dictates all aspects of the communication, including the times when particular tape nodes should communicate, the mode of communication, and the contents of the communication. In one example, the one or more network service servers 904 transmits programmatic Global Scheduling Description Language (GSDL) code to the master tape node and each of the lower-level tape nodes in the designated set. In this example, execution of the GSDL code causes each of the tape nodes in the designated set to connect to the master tape node at a different respective time that is specified in the GSDL code, and to communicate a respective set of one or more data packets of one or more specified types of information over the respective connection. In some examples, the master tape node simply forwards the data packets to the one or more network service servers 904, either directly or indirectly through a gateway tape node (e.g., the long-range wireless communication unit 816 adhered to the mobile gateway 812 (which could be a vehicle, ship, plane, etc.) or the stationary gateway 814 is a long-range tape node adhered to an infrastructure component of the network 800). In other examples, the master tape node processes the information contained in the received data packets and transmits the processed information to the one or more network service servers 904.

Figure 10:
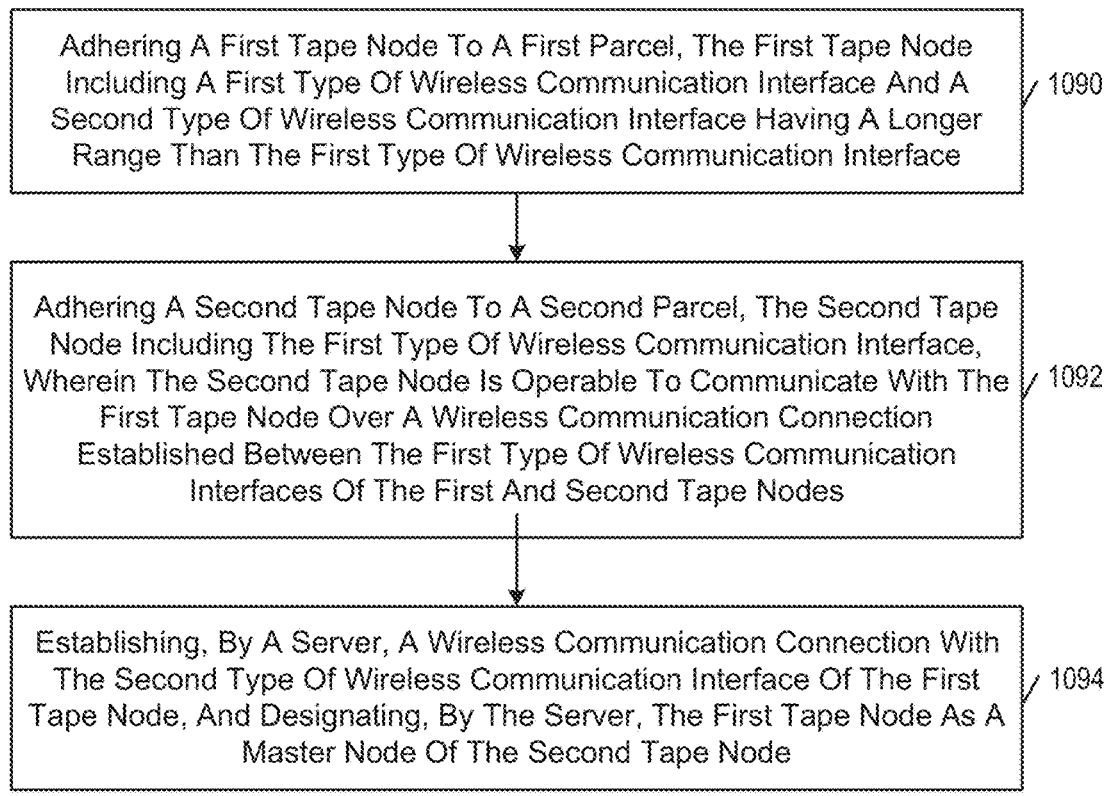
FIG. 10 is a flow diagram of a method of creating the hierarchical communications network, according to an embodiment.

FIG. 10 shows an example method of creating a hierarchical communications network. In accordance with this method, a first tape node is adhered to a first parcel in a set of associated parcels, the first tape node including a first type of wireless communication interface and a second type of wireless communication interface having a longer range than the first type of wireless communication interface (FIG. 10, block 1090). A second tape node is adhered to a second parcel in the set, the second tape node including the first type of wireless communication interface, wherein the second tape node is operable to communicate with the first tape node over a wireless communication connection established between the first type of wireless communication interfaces of the first and second tape nodes (FIG. 10, block 1092). An application executing on a computer system (e.g., the one or more network service servers 904 of a network service 906) establishes a wireless communication connection with the second type of wireless communication interface of the first tape node, and the application transmits programmatic code executable by the first tape node to function as a master tape node with respect to the second tape node (FIG. 10, block 1094).

As used herein, the term "node" refers to both a tape node and a non-tape node unless the node is explicitly designated as a "tape node" or a "non-tape node." In some embodiments, a non-tape node may have the same or similar communication, sensing, processing and other functionalities and capabilities as the tape nodes described herein, except without being integrated into a tape platform. In some embodiments, non-tape nodes can interact seamlessly with tape nodes. Each node is assigned a respective unique identifier.

Embodiments of the present disclosure further describe a distributed software operating system that is implemented by distributed hardware nodes executing intelligent agent software to perform various tasks or algorithms. In some embodiments, the operating system distributes functionalities (e.g., performing analytics on data or statistics collected or generated by nodes) geographically across multiple intelligent agents that are bound to logistic items (e.g., parcels, containers, packages, boxes, pallets, a loading dock, a door, a light switch, a vehicle such as a delivery truck, a shipping facility, a port, a hub, etc.). In addition, the operating system dynamically allocates the hierarchical roles (e.g., master and slave roles) that nodes perform over time in order to improve system performance, such as optimizing battery life across nodes, improving responsiveness, and achieving overall objectives. In some embodiments, optimization is achieved using a simulation environment for optimizing key performance indicators (PKIs). In some embodiments, the nodes are programmed to operate individually or collectively as autonomous intelligent agents. In some embodiments, nodes are configured to communicate and coordinate actions and respond to events. In some embodiments, a node is characterized by its identity, its mission, and the services that it can provide to other nodes. A node's identity is defined by its capabilities (e.g., battery life, sensing capabilities, and communications interfaces).

A node may be defined by the respective program code, instructions, or directives it receives from another node (e.g., a server or a master node) and the actions or tasks that it performs in accordance with that program code, instructions, or directives (e.g., sense temperature every hour and send temperature data to a master node to upload to a server). A node's services may be defined by the functions or tasks that it is permitted to perform for other nodes (e.g., retrieve temperature data from a peripheral node and send the received temperature data to the server). At least for certain tasks, once programmed and configured with their identities, missions, and services, nodes can communicate with one another and request services from and provide services to one another independently of the server. Thus, in accordance with the runtime operating system every agent knows its objectives (programmed). Every agent knows which capabilities/resources it needs to fulfill objective. Every agent communicates with every other node in proximity to see if it can offer the capability. Examples include communicate data to the server, authorize going to lower-power level, temperature reading, send an alert to local hub, send location data, triangulate location, any boxes in same group that already completed group objectives.

Nodes can be associated with logistic items. Examples of a logistic item includes, for example, a package, a box, pallet, a container, a truck or other conveyance, infrastructure such as a door, a conveyor belt, a light switch, a road, or any other thing that can be tracked, monitored, sensed, etc. or that can transmit data concerning its state or environment. In some examples, a server or a master node may associate the unique node identifiers with the logistic items.

Communication paths between tape and/or non-tape nodes may be represented by a graph of edges between the corresponding logistic items (e.g., a storage unit, truck, or hub). In some embodiments, each node in the graph has a unique identifier. A set of connected edges between nodes is represented by a sequence of the node identifiers that defines a communication path between a set of nodes.

Figure 11A:
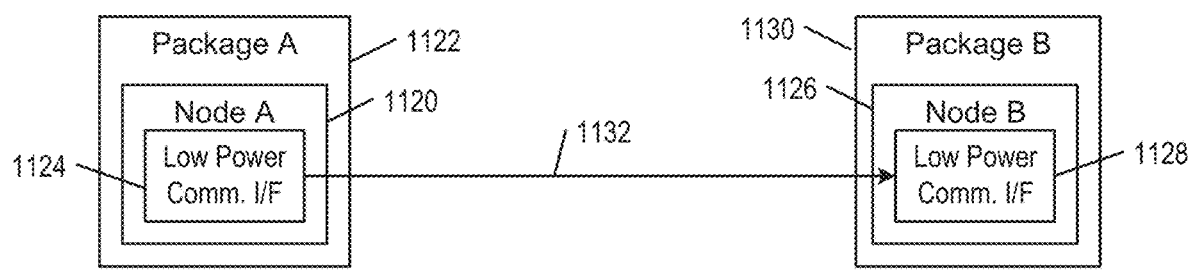
FIGS. 11A-E are diagrammatic views showing example use cases for a distributed wireless sensing system, according to an embodiment.

Referring to FIG. 11A, a node 1120 (Node A) is associated with a package 1122 (Package A). In some embodiments, the node 1120 may be implemented as a tape node that is used to seal the package 1122 or it may be implemented as a label node that is used to label the package 1122; alternatively, the node 1120 may be implemented as a non-tape node that is inserted within the package 1122 or embedded in or otherwise attached to the interior or exterior of the package 1122. In the illustrated embodiment, the node 1120 includes a low power communications interface 1124 (e.g., a Bluetooth Low Energy communications interface). Another node 1126 (Node B), which is associated with another package 1130 (Package B), is similarly equipped with a compatible low power communications interface 1128 (e.g., a Bluetooth Low Energy communications interface).

In an example scenario, in accordance with the programmatic code stored in its memory, node 1126 (Node B) requires a connection to node 1120 (Node A) to perform a task that involves checking the battery life of Node A. Initially, Node B is unconnected to any other nodes. In accordance with the programmatic code stored in its memory, Node B periodically broadcasts advertising packets into the surrounding area. When the other node 1120 (Node A) is within range of Node B and is operating in a listening mode, Node A will extract the address of Node B and potentially other information (e.g., security information) from an advertising packet. If, according to its programmatic code, Node A determines that it is authorized to connect to Node B, Node A will attempt to pair with Node B. In this process, Node A and Node B determine each other's identities, capabilities, and services. For example, after successfully establishing a communication path 1132 with Node A (e.g., a Bluetooth Low Energy formatted communication path), Node B determines Node A's identity information (e.g., master node), Node A's capabilities include reporting its current battery life, and Node A's services include transmitting its current battery life to other nodes. In response to a request from Node B, Node A transmits an indication of its current battery life to Node B.

Figure 11B:
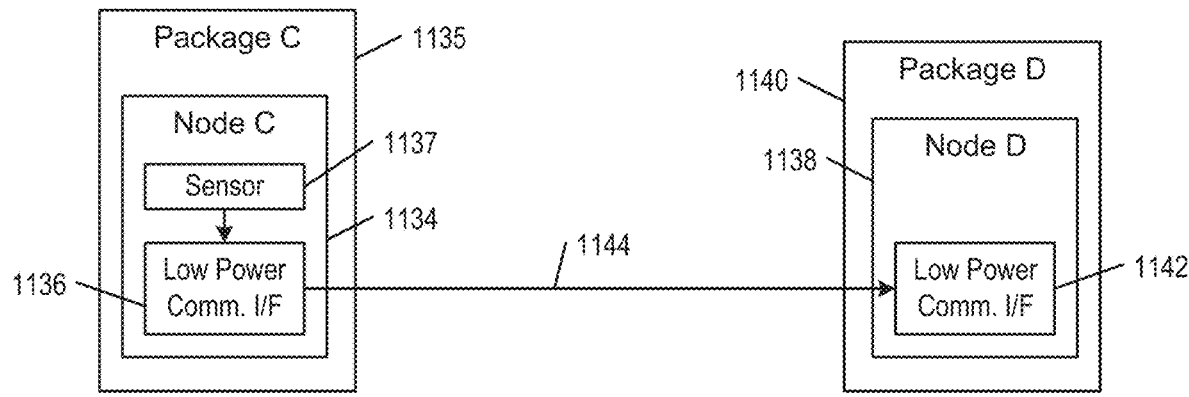

Referring to FIG. 11B, a node 1134 (Node C) is associated with a package 1135 (Package C). In the illustrated embodiment, the Node C includes a low power communications interface 1136 (e.g., a Bluetooth Low Energy communications interface), and a sensor 1137 (e.g., a temperature sensor). Another node 1138 (Node D), which is associated with another package 1140 (Package D), is similarly equipped with a compatible low power communications interface 1142 (e.g., a Bluetooth Low-Energy communications interface).

In an example scenario, in accordance with the programmatic code stored in its memory, Node D requires a connection to Node C to perform a task that involves checking the temperature in the vicinity of Node C. Initially, Node D is unconnected to any other nodes. In accordance with the programmatic code stored in its memory, Node D periodically broadcasts advertising packets in the surrounding area. When Node C is within range of Node D and is operating in a listening mode, Node C will extract the address of Node D and potentially other information (e.g., security information) from the advertising packet. If, according to its programmatic code, Node C determines that it is authorized to connect to Node D, Node C will attempt to pair with Node D.

In this process, Node C and Node D determine each other's identities, capabilities, and services. For example, after successfully establishing a communication path 1144 with Node C (e.g., a Bluetooth Low Energy formatted communication path), Node D determines Node C's identity information (e.g., a peripheral node), Node C's capabilities include retrieving temperature data, and Node C's services include transmitting temperature data to other nodes. In response to a request from Node D, Node C transmits its measured and/or locally processed temperature data to Node D.

Figure 11C:
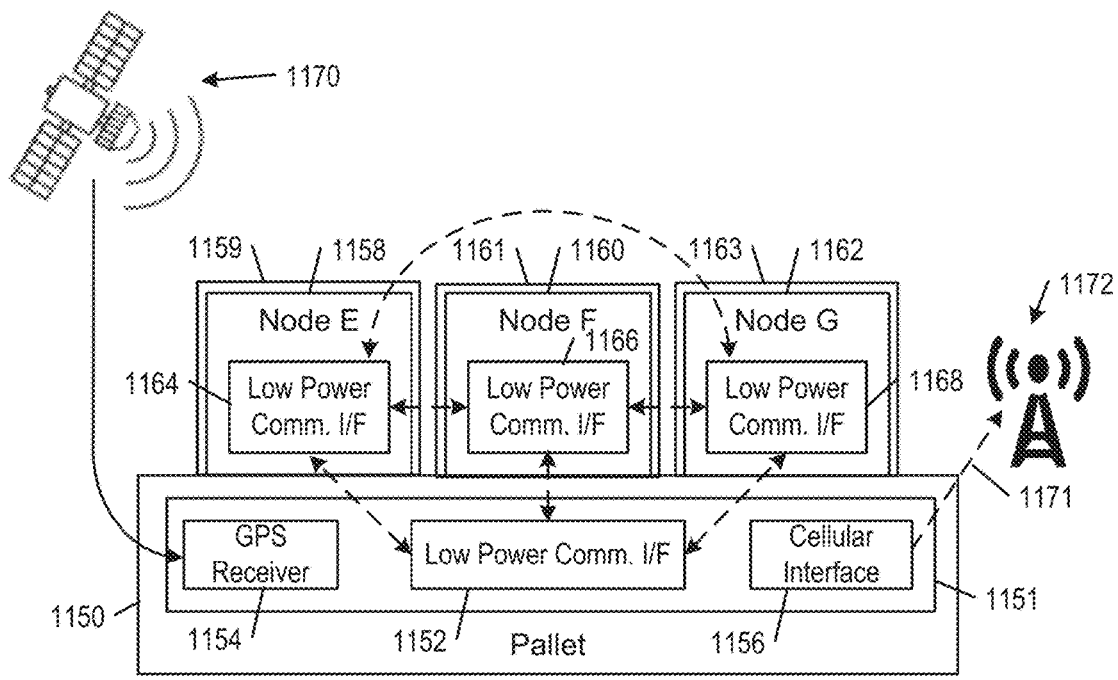

Referring to FIG. 11C, a pallet 1150 is associated with a master node 1151 that includes a low-power communications interface 1152, a GPS receiver 1154, and a cellular communications interface 1156. In some embodiments, the master node 1151 may be implemented as a tape node or a label node that is adhered to the pallet 1150. In other embodiments, the master node 1151 may be implemented as a non-tape node that is inserted within the body of the pallet 1150 or embedded in or otherwise attached to the interior or exterior of the pallet 1150.

The pallet 1150 provides a structure for grouping and containing packages 1159, 1161, 1163 each of which is associated with a respective peripheral node 1158, 1160, 1162 (Node E, Node F, and Node G). Each of the peripheral nodes 1158, 1160, 1162 includes a respective low power communications interface 1164, 1166, 1168 (e.g., Bluetooth Low Energy communications interface). In the illustrated embodiment, each of the nodes E, F, G, and the master node 1151 are connected to each of the other nodes over a respective low power communications path (shown by dashed lines).

In some embodiments, the packages 1159, 1161, 1163 are grouped together because they are related. For example, the packages 1159, 1161, 1163 may share the same shipping itinerary or a portion thereof. In an example scenario, the master pallet node 1151 scans for advertising packets that are broadcasted from the peripheral nodes 1158, 1160, 1162. In some examples, the peripheral nodes broadcast advertising packets during respective scheduled broadcast intervals. The master node 1151 can determine the presence of the packages 1159, 1161, 1163 in the vicinity of the pallet 1150 based on receipt of one or more advertising packets from each of the nodes E, F, and G. In some embodiments, in response to receipt of advertising packets broadcasted by the peripheral nodes 1158, 1160, 1162, the master node 1151 transmits respective requests to the server to associate the master node 1151 and the respective peripheral nodes 1158, 1160, 1162. In some examples, the master tape node requests authorization from the server to associate the master tape node and the peripheral tape nodes. If the corresponding packages 1159, 1161, 1163 are intended to be grouped together (e.g., they share the same itinerary or certain segments of the same itinerary), the server authorizes the master node 1151 to associate the peripheral nodes 1158, 1160, 1162 with one another as a grouped set of packages. In some embodiments, the server registers the master node and peripheral tape node identifiers with a group identifier. The server also may associate each node ID with a respective physical label ID that is affixed to the respective package.

In some embodiments, after an initial set of packages is assigned to a multi package group, the master node 1151 may identify another package arrives in the vicinity of the multi-package group. The master node may request authorization from the server to associate the other package with the existing multi-package group. If the server determines that the other package is intended to ship with the multi-package group, the server instructs the master node to merge one or more other packages with currently grouped set of packages. After all packages are grouped together, the server authorizes the multi-package group to ship. In some embodiments, this process may involve releasing the multi-package group from a containment area (e.g., customs holding area) in a shipment facility.

In some embodiments, the peripheral nodes 1158, 1160, 1162 include environmental sensors for obtaining information regarding environmental conditions in the vicinity of the associated packages 1159, 1161, 1163. Examples of such environmental sensors include temperature sensors, humidity sensors, acceleration sensors, vibration sensors, shock sensors, pressure sensors, altitude sensors, light sensors, and orientation sensors.

In the illustrated embodiment, the master node 1151 can determine its own location based on geolocation data transmitted by a satellite-based radio navigation system 1170 (e.g., GPS, GLONASS, and NAVSTAR) and received by the GPS receiver 1154 component of the master node 1151. In an alternative embodiment, the location of the master pallet node 1151 can be determined using cellular based navigation techniques that use mobile communication technologies (e.g., GSM, GPRS, CDMA, etc.) to implement one or more cell-based localization techniques. After the master node 1151 has ascertained its location, the distance of each of the packages 1159, 1161, 1163 from the master node 1151 can be estimated based on the average signal strength of the advertising packets that the master node 1151 receives from the respective peripheral node. The master node 1151 can then transmit its own location and the locations of the package nodes E, F, and G to a server over a cellular interface connection with a cellular network 1172. Other methods of determining the distance of each of the packages 1159, 1161, 1163 from the master node 1151, such as Received Signal-Strength Index (RSSI) based indoor localization techniques, also may be used.

In some embodiments, after determining its own location and the locations of the peripheral nodes, the master node 1151 reports the location data and the collected and optionally processed (e.g., either by the peripheral nodes peripheral nodes 1158, 1160, 1162 or the master node 1151) sensor data to a server over a cellular communication path 1171 on a cellular network 1172.

In some examples, nodes are able to autonomously detect logistics execution errors if packages that are supposed to travel together no longer travel together and raise an alert. For example, a node (e.g., the master node 1151 or one of the peripheral nodes 1158, 1160, 1162) alerts the server when the node determines that a particular package 1159 is being or has already been improperly separated from the group of packages. The node may determine that there has been an improper separation of the particular package 1159 in a variety of ways. For example, the associated peripheral node 1158 that is bound to the particular package 1159 may include an accelerometer that generates a signal in response to movement of the package from the pallet. In accordance with its intelligent agent program code, the associated peripheral node 1158 determines that the master node 1151 has not disassociated the particular package 1159 from the group and therefore broadcasts advertising packets to the master node, which causes the master node 1151 to monitor the average signal strength of the advertising packets and, if the master node 1151 determines that the signal strength is decreasing over time, the master node 1151 will issue an alert either locally (e.g., through a speaker component of the master node 1151) or to the server.

Figure 11D:
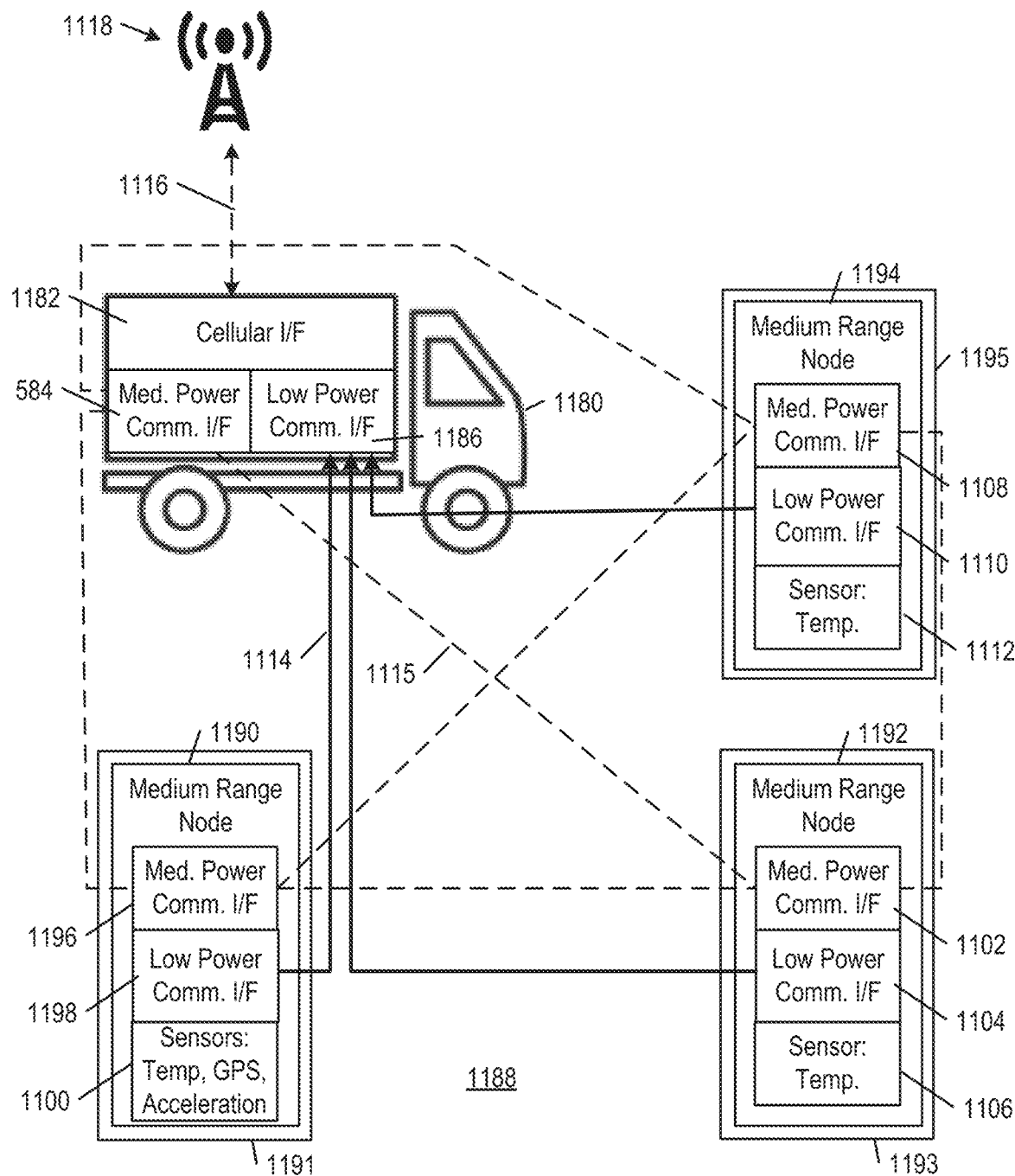

Referring to FIG. 11D, a truck 1180 is configured as a mobile node or mobile hub that includes a cellular communications interface 1182, a medium-power communications interface 1184, and a low power communications interface 1186. The communications interfaces 1180-1186 may be implemented on one or more tape and non-tape nodes. In an illustrative scenario, the truck 1180 visits a logistic storage facility, such as a warehouse 1188, to wirelessly obtain temperature data generated by temperature sensors in the medium range nodes 1190, 1192, 1194. The warehouse 1188 contains nodes 1190, 1192, and 1194 that are associated with respective logistic containers 1191, 1193, 1195. In the illustrated embodiment, each node 1190-1094 is a medium range node that includes a respective medium power communications interface 1196, 1102, 1108, a respective low power communications interface 1198, 1104, 1110 and one or more respective sensors 1100, 1106, 1112. In the illustrated embodiment, each of the package nodes 1190, 1192, 1194 and the truck 1180 is connected to each of the other ones of the package nodes through a respective medium power communications path (shown by dashed lines). In some embodiments, the medium power communications paths are LoRa formatted communication paths.

In some embodiments, the communications interfaces 1184 and 1186 (e.g., a LoRa communications interface and a Bluetooth Low Energy communications interface) on the node on the truck 1180 is programmed to broadcast advertisement packets to establish connections with other network nodes within range of the truck node. A warehouse 1188 includes medium range nodes 1190, 1192, 1194 that are associated with respective logistic containers 1191, 1193, 1195 (e.g., packages, boxes, pallets, and the like). When the truck node's low power interface 1186 is within range of any of the medium range nodes 1190, 1192, 1194 and one or more of the medium range nodes is operating in a listening mode, the medium range node will extract the address of truck node and potentially other information (e.g., security information) from the advertising packet. If, according to its programmatic code, the truck node determines that it is authorized to connect to one of the medium range nodes 1190, 1192, 1194, the truck node will attempt to pair with the medium range node. In this process, the truck node and the medium range node determine each other's identities, capabilities, and services. For example, after successfully establishing a communication path with the truck node (e.g., a Bluetooth Low Energy formatted communication path 1114 or a LoRa formatted communication path 1117), the truck node determines the identity information for the medium range node 1190 (e.g., a peripheral node), the medium range node's capabilities include retrieving temperature data, and the medium range node's services include transmitting temperature data to other nodes. Depending of the size of the warehouse 1188, the truck 1180 initially may communicate with the nodes 1190, 1192, 1194 using a low power communications interface (e.g., Bluetooth Low Energy interface). If any of the anticipated nodes fails to respond to repeated broadcasts of advertising packets by the truck 1180, the truck 1180 will try to communicate with the non-responsive nodes using a medium power communications interface (e.g., LoRa interface). In response to a request from the medium-power communication interface 1184, the medium range node 1190 transmits an indication of its measured temperature data to the truck node. The truck node repeats the process for each of the other medium range nodes 1192, 1194 that generate temperature measurement data in the warehouse 1188. The truck node reports the collected (and optionally processed, either by the medium range nodes 1190, 1192, 1194 or the truck node) temperature data to a server over a cellular communication path 1116 with a cellular network 1118.

Figure 11E:
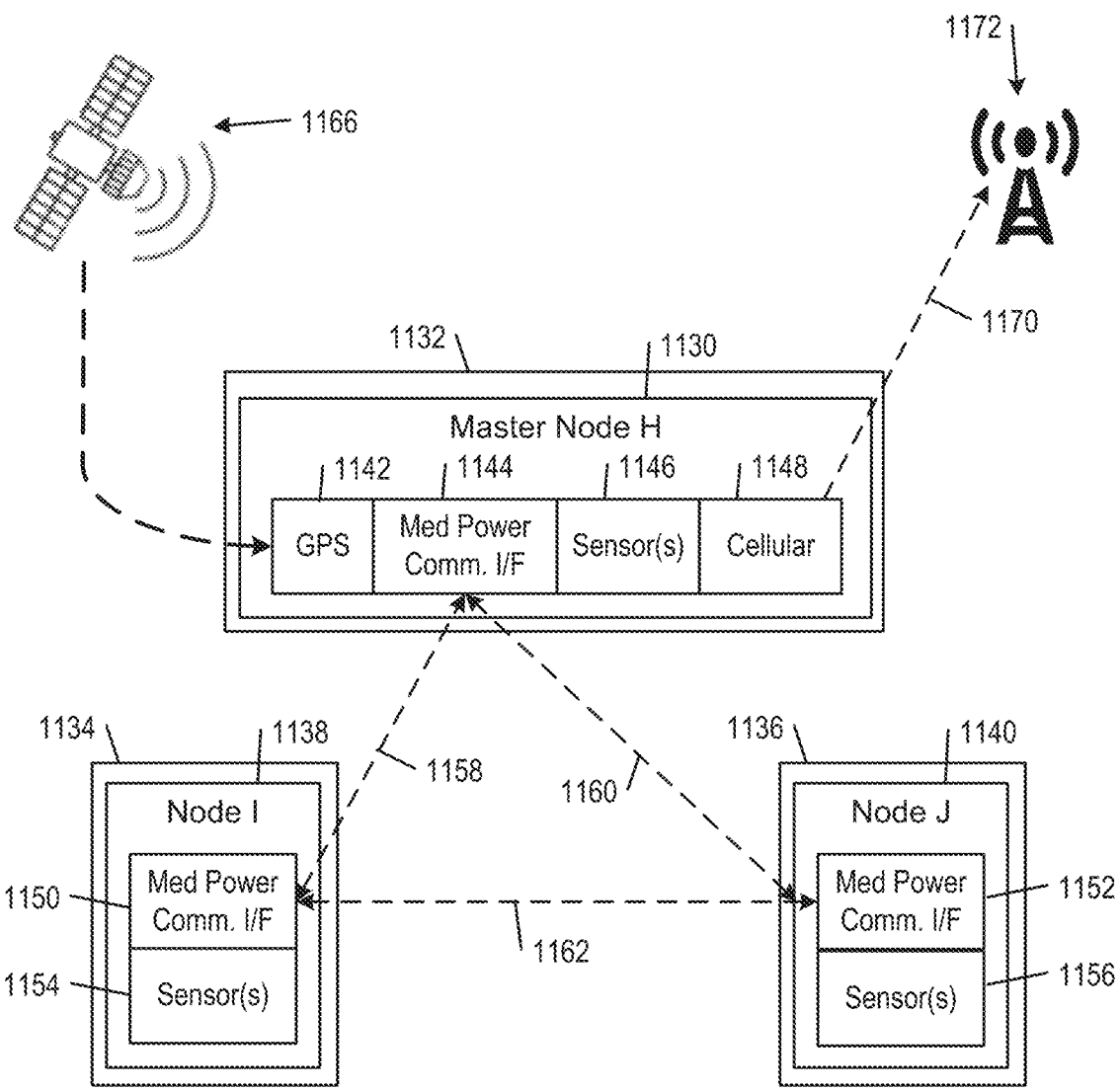

Referring to FIG. 11E, a master node 1130 is associated with a logistic item 1132 (e.g., a package) and grouped together with other logistic items 1134, 1136 (e.g., packages) that are associated with respective peripheral nodes 1138, 1140. The master node 1130 includes a GPS receiver 1142, a medium power communications interface 1144, one or more sensors 1146, and a cellular communications interface 1148. Each of the peripheral nodes 1138, 1140 includes a respective medium power communications interface 1150, 1152 and one or more respective sensors 1154, 1156. In the illustrated embodiment, the peripheral and master nodes are connected to one another other over respective pairwise communications paths (shown by dashed lines). In some embodiments, the nodes 1130, 1138, 1140 communicate through respective LoRa communications interfaces over LoRa formatted communications paths 1158, 1160, 1162.

In the illustrated embodiment, the master and peripheral nodes 1130, 1138, 1140 include environmental sensors for obtaining information regarding environmental conditions in the vicinity of the associated logistic items 1132, 1134, 1136. Examples of such environmental sensors include temperature sensors, humidity sensors, acceleration sensors, vibration sensors, shock sensors, pressure sensors, altitude sensors, light sensors, and orientation sensors.

In accordance with the programmatic code stored in its memory, the master node 1130 periodically broadcasts advertising packets in the surrounding area. When the peripheral nodes 1138, 1140 are within range of master node 1130, and are operating in a listening mode, the peripheral nodes 1138, 1140 will extract the address of master node 1130 and potentially other information (e.g., security information) from the advertising packets. If, according to their respective programmatic code, the peripheral nodes 1138, 1140 determine that they are authorized to connect to the master node 1130, the peripheral nodes 1138, 1140 will attempt to pair with the master node 1130. In this process, the peripheral nodes 1138, 1140 and the master node 1130 determine each other's identities, capabilities, and services. For example, after successfully establishing a respective communication path 1158, 1160 with each of the peripheral nodes 1138, 1140 (e.g., a LoRa formatted communication path), the master node 1130 determines certain information about the peripheral nodes 1138, 1140, such as their identity information (e.g., peripheral nodes), their capabilities (e.g., measuring temperature data), and their services include transmitting temperature data to other nodes.

After establishing LoRa formatted communications paths 1158, 1160 with the peripheral nodes 1138, 1140, the master node 1130 transmits requests for the peripheral nodes 1138, 1140 to transmit their measured and/or locally processed temperature data to the master node 1130.

In the illustrated embodiment, the master node 1130 can determine its own location based on geolocation data transmitted by a satellite-based radio navigation system 1166 (e.g., GPS, GLONASS, and NAVSTAR) and received by the GPS receiver 1142 component of the master node 1130. In an alternative embodiment, the location of the master node 1130 can be determined using cellular based navigation techniques that use mobile communication technologies (e.g., GSM, GPRS, CDMA, etc.) to implement one or more cell-based localization techniques. After the master node 1130 has ascertained its location, the distance of each of the logistic items 1134, 1136 from the master node 1130 can be estimated based on the average signal strength of the advertising packets that the master node 1130 receives from the respective peripheral node. The master node 1130 can then transmit its own location and the locations of the package nodes H, J, and I to a server over a cellular interface connection with a cellular network 1172. Other methods of determining the distance of each of the logistic items 1134, 1136 from the master node 1130, such as Received Signal-Strength Index (RSSI) based indoor localization techniques, also may be used.

In some embodiments, after determining its own location and the locations of the peripheral nodes, the master node 1130 reports the location data, the collected and optionally processed (e.g., either by the peripheral nodes peripheral nodes 1138, 1140 or the master node 1130) sensor data to a server over a cellular communication path 1170 on a cellular network 1172.

Reuse Mode for Multiple-Phase Transport

The present embodiments discussed herein realize a technical problem exists where a monitoring agent (e.g., any of the "nodes" or "agents" discussed herein) needs to conserve energy use and battery life to enable functionality throughout a full application that includes multiple phases. The present embodiments discussed herein also realize a technical problem exists where a monitoring agent may utilize more energy than expected during a given phase of a multi-phase application, resulting in the monitoring agent not being able to perform its required monitoring actions due to limited battery life.

To implement the solutions to the above-described technical problems associated with multi-phase monitoring applications (e.g., tracking, sensing, or other multi-phase applications), the embodiments herein include a multi-phase application manager. FIG. 12 shows an example multi-phase monitoring module 1200, in embodiments. Multi-phase monitoring module 1200 may be implemented on a standalone device, and include processor 1202, communications device 1204, and memory 1206. Additionally, or alternatively, one or more components of the multi-phase application manager 1200 may be integrated into one or more of the devices discussed herein, such as, but not limited to, tape-agent platform 112, 330, or 500 (e.g., one segment 113, 332, or 502 thereof), a component of the wireless transducing circuit 410 discussed above, a component of segments 640, 670, or 680 of agent platforms in FIGS. 6A-C, a component of products 774, 794, or 700 in FIGS. 7A-C, a component of server 804 and/or application(s) 806, a component of mobile gateway 810 and/or client application 822, a component of any one of tape nodes in FIG. 8, or any other device within the wireless tracking system 800 of FIG. 8.

Multi-phase monitoring module 1200 thus implements a firmware or software module that, when executed, implements the functionality of the multi-phase monitoring module 1200 as discussed below. Multi-phase monitoring module 1200 may utilize the communications device 1204 to receive data from or transmit data to external devices (such as tape nodes, or a server, or a client device) via one or more of a low-power, medium-power, or high-power wireless communication interface as discussed herein, or via a hardwired communications interface as known in the art.

For example, referring to a wireless tracking system (e.g., the wireless tracking system 800), the tracking system may use tape nodes (e.g., tape nodes 818, 828, 832, 842-848, 860, 866, or any other node or agent discussed herein) during multi-phase transport of assets, for example, to monitor or collect environmental data proximate to assets. To address the technical problem of conserving energy usage throughout the full tracking application, the multi-phase monitoring module 1200 may receive agent phase data 1208 regarding one or more monitoring agents. The agent phase data 1208 may be detected by the monitoring agent (e.g., a tracking device or any of the tape-nodes or agents discussed herein) itself, such as via sensed location information and comparison to a multi-phase itinerary 1210. In another example, the agent phase data 1208 may include sensed temperature, accelerometer, photonic sensor data, image sensor data or other sensed data by the tape node as compared to an end-of-phase trigger as defined within the multi-phase itinerary 1210. As another example, the multi-phase monitoring module 1200 may receive indication of a scan of the monitoring agent (e.g., a scan of identifier 122) indicating that the monitoring agent has reached a given location. Any data received related to (either directly sensed by the monitoring agent, or captured via an external device analyzing the monitoring agent) may be used as the agent phase data 1208 depending on the particular application.

Each individual phase 1212 of the itinerary 1210 may be designated (and defined by in requirements 1222, discussed below) based on anyone more of a route, location data, a location of a destination, mapping data, a schedule for performing actions (e.g., collecting sensor data, transmitting/receiving data to/from other monitoring agents, gateway nodes, server, etc.), a threshold battery energy level required (e.g., determined by training a machine learning model on historical data, as discussed below) to complete the next phase, data indicating estimated power consumption, locations of gateway nodes along the route, identifiers of other tape nodes and/or gateway nodes (e.g., unique identifiers, hardware identifiers, MAC address, etc.), methods of transportation affecting operations to be performed during the next phase of the itinerary, other assets or monitoring agent associated with the next phase of the itinerary, other information relevant to the next phase of the itinerary, or some combination thereof.

Based at least in part on the agent phase data 1208, the multi-phase monitoring module 1200 may detect when an end of journey or end of active phase of the multi-phase transport for a given monitoring agent, or grouping of monitoring agents, is reached by comparison to the multi-phase itinerary 1210. In response to detection that a first phase 1212(1) within the multi-phase itinerary is finished, the multi-phase monitoring module 1200 may generate and/or initiate an operating status 1214 change. In one example, the operating status change initiates a dynamic hibernation mode 1216 (e.g. to conserve battery life, as discussed below) at the monitoring agent. The dynamic hibernation mode 1216 may stop or significantly reduce sensor data collection, may perform communications with other nodes in the wireless tracking system infrequently, may scan for other nodes (e.g., monitoring agents such as one or more of tape nodes, mobile gateways 810, 812, or stationary gateways 814) or entities of the wireless tracking system at a lower frequency, may execute one or more pending updates to firmware of the monitoring agent, and the like. A frequency of operations during hibernation mode is lower than a frequency of operations during standard operation 1218 (e.g., during the first phase 1212(1) or another phase (1212(2)-1212(N)) of the multi-phase itinerary 1210, such as when shipping an asset monitored by said monitoring agent). For example, the dynamic hibernation mode 1216 may cause the monitoring agent to perform these or other operations once a day or once an hour, while a standard operation mode (e.g., during a phase of the multi-phase itinerary 1210) may cause the monitoring agent to perform these or other operations once a minute.

In a particular embodiment, the monitoring module 1200 may implement a task manager 1220. Task manager 1220 may be a software or firmware module, such as computer readable instructions that when executed by the processor 1202 implement the following functionality. In one embodiment, when a monitoring agent detects a start of a next phase (any of phases 1212, including but not limited to the first assigned phase 1212(1)) of the multi-phase monitoring itinerary 1210, the task manager 1220 compares agent capabilities 1224 (e.g. any one or more of available battery life, available sensors, available communication capabilities) against the phase requirements 1222 (required battery life, required sensors, required communication capabilities to implement the next phase in itinerary 1210) to determine whether the monitoring agent is able to perform a next phase of the itinerary 1210 (e.g., whether monitoring agent have sufficient battery life, necessary sensors for environmental data collection, correct communication systems, etc.). If the task manager 1220 determines it is not able to perform the next phase of itinerary 1210, the monitoring agent is flagged using one or more of a recharge indication 1226, refurbishment indication 1228, or transport indication 1230 to be sent to another location for disposal, refurbishment, or recharging at a secondary location. Additionally, or alternatively, the task manager 1220 may transmit the above-discussed indications (or a list thereof) to an external device (which may be another monitoring agent (e.g., an agent in the same-level, or a higher level of the hierarchy discussed above), a user-device located in communicable proximity to the monitoring agent, and/or an external server directly or indirectly through any intermediate device necessary to transmit the indication from the monitoring agent to the external server) that the monitoring agent is able to, or not able to, perform its prescribed actions for the next phase of the multi-phase application. If the task manager 1220 determines the monitoring agent is able to perform the next phase of itinerary 1210, the monitoring agent may be affixed or adhered to a respective asset (if not already affixed or adhered) and initiate standard operations 1218 for the next phase of transport. The standard operations 1218 may be a generic operating condition, or may be tailored to the given phase 1212 in the multi-phase itinerary 1210.

In some embodiments, agent phase data 1208 indicates the monitoring agent is at an end of journey or end of active phase within the itinerary 1210 in the form of a communication or notification by another entity of the wireless tracking system (e.g., tape node 818, 828, 832, 842-848, 860, 866, mobile gateway 810, 812, stationary gateway 814, server 804, network 802, or cloud of the wireless tracking system). A stimulus 1209 may detect the communication or notification from the another entity and notify the agent phase data 1208 that the monitoring agent is at the end of journey or end of active phase. For example, a server or gateway node of the wireless tracking system may detect an end of journey for a monitoring agent based on the monitoring agent arriving at a storage or unloading facility, e.g., responsive to the monitoring agent being within a range (e.g., mile, half-mile, three hundred feet, twenty feet, etc.) of the server or gateway node at the storage or unloading facility. In another example, a server or gateway node of the wireless tracking system may detect an end of journey for a monitoring agent responsive to a human operator scanning an identifier (e.g., the identifier 122, such as a barcode, QR code, RFID, etc.) of the tape node with a client device (e.g., mobile gateway 810) running a client application (e.g., client application 822). The scanning of the identifier may in turn prompt a notification, from the client device, which the external stimulus 1209 detects. In another example, a server or gateway node of the wireless tracking system may receive sensor data from a monitoring agent and determine based on an analysis, applied algorithm, or other computation that the sensor data corresponds to an end of journey for the monitoring agent. For example, the monitoring agent transmits a multi-phase application itinerary that includes the location of the facility as a destination of an active phase of a multi-phase transport. Responsive to the determination, the server or gateway node of the wireless tracking system transmits a notification to the monitoring agent indicating that the monitoring agent is at an end of journey or end of phase. In embodiments, the other member of the wireless tracking system transmits instructions to the stimulus 1209 of the wireless monitoring agent to perform actions. The actions may correspond to the hibernation mode 1216 or may correspond to other functions that the tape node performs between and/or during phases 1212 of itinerary 1210.

In other embodiments, the stimulus 1209 of the multi-phase monitoring module 1200 is integral to the monitoring agent and detects an end-of-journey or end-of-active phase without receiving a notification from another monitoring agent, server, network, or cloud of the wireless tracking system. The monitoring agent may locally store and/or execute one or more conditions and/or logic for detecting an end of journey or end of active phase and determine that an end-of-journey or end-of-active phase has occurred responsive to capturing sensor data corresponding to the one or more conditions described for each phase 1212. For example, the one or more conditions may be the stimulus 1209 of the monitoring agent capturing sensor data corresponding to a lack of motion, vibration, angular momentum, or acceleration for greater than a threshold amount of time (e.g., five minutes, ten minutes, etc.); the stimulus 1209 of the monitoring agent capturing GPS or location data associated with a destination stored locally by the monitoring agent (e.g., within memory 58, 58', 58"); and the like. In another example, the stimulus 1209 may detect a gateway node associated with a destination location establishing a connection with the monitoring agent. Responsive to the connection being established, the multi-phase monitoring module 1200 determines that it has reached the destination location and therefore an end-of-journey or end-of-active phase. In other embodiments, the stimulus 1209 of the multi-phase monitoring module 1200 detects an end of journey based on one or more geo-fence perimeters (e.g., surrounding a facility, surrounding an area comprising a facility or city block, etc.) associated with a destination of the journey or active phase. The stimulus 1209 of the multi-phase monitoring module 1200 within the monitoring agent may determine that its own location is within a geo-fenced area that corresponds to a destination location of the active phase or journey as prescribed in itinerary 1210. In response, the monitoring agent determines that the active phase or journey has ended. In other embodiments, multi-phase monitoring module 1200 determines an end-of-journey or end-of-active phase based on the stimulus 1209 detecting sensor data associated with reaching a destination, e.g., vibration data indicating that a user of the wireless tracking system has removed the monitoring agent from a respective asset or a vehicle, temperature data indicating that the asset has been placed in a refrigeration unit for storage, and/or the like.

A monitoring agent in hibernation mode 1216 may cease or modify frequencies of one or more standard operations 1218 in order to preserve battery life. For example, monitoring agent(s) implementing hibernation mode 1216 may cease to capture sensor data, may capture sensor data at infrequent intervals, or may switch from a high-power wireless-communication interface (e.g., high-power wireless-communication interface 682") to a medium or low-power wireless communication interface (e.g., the medium and low-power wireless-communication interface 652, 652', 652", 672', 672"). In another example of operation according to hibernation mode 1216, the monitoring agent may cease to transmit data or communications to other tape nodes, mobile and/or stationary gateways, servers, networks, or clouds of the wireless tracking system, or may transmit data or communications responsive to a request ping or at infrequent intervals. In yet another example, the monitoring agent may respond to communications at a specific frequency that requires less battery consumption. In embodiments, monitoring agents implementing hibernation mode 1216 may program itself to receive wireless communications (e.g., from other monitoring agents, mobile and/or stationary gateways, server, and/or other entities of the wireless tracking system 800) at fewer intervals than during the standard mode 1218. For example, the monitoring agent may check for incoming communications (e.g., wake signals from other monitoring agents, mobile and/or stationary gateways, server, and/or other entities of the wireless tracking system 800) for a predetermined duration (e.g., for a duration of one minute) once per time period (e.g., 5 minutes, 30 minutes, hour, etc.). The monitoring agent may then transition from the hibernation mode 1216 to a standard mode 1218 upon receiving a wake signal.

Via implementation of multi-phase monitoring module 1200, monitoring agents in hibernation mode 1216, exit hibernation mode 1216 and resume standard operation mode 1218 responsive to the stimulus 1209 detecting a start of a next phase 1212 of itinerary 1210. In some embodiments, detection of a start of the next phase 1212 is based stimulus 1209 detecting a communication or notification by another tape node, server, network, or cloud of the wireless tracking system. For example, a server of the wireless tracking system may transmit a notification (e.g., at a specific frequency detectable to the stimulus 1209 of the monitoring agent implementing the monitoring module 1200 during the hibernation mode 1216) to the monitoring agent to start a next phase 1212 (e.g., to the hibernation mode 1216). In another example, a gateway node associated with a loading zone at a facility where the monitoring agent is located may establish a connection with the stimulus 1209 of the monitoring agent. The connection being established is an example of agent phase data 1208 and may indicate a new phase 1212 has started. The stimulus 1209 may further detect, via a magnetic sensor of the monitoring agent, a magnetic signal proximate to the monitoring agent, indicating a start of a next phase. In substantially the same way as the stimulus 1209 detects the end of an active phase, as discussed above, the stimulus 1209 may detect stimulus (e.g., a wake signal) prompting the monitoring agent to exit hibernation mode 1216, to enter the standard mode 1218.

Responsive to the connection being established, the stimulus 1209 of the monitoring agent determines that it has reached the loading zone and therefore a start of a new phase 1212 and associated operating status 1214. In other embodiments, agent phase data 1208 and itinerary 1210 indicate an end-of-journey or end-of-active phase based on sensor data associated with reaching a destination, e.g., vibration or acceleration data indicating that a user of the wireless tracking system has affixed or adhered the monitoring agent to a respective asset, temperature data indicating that the asset has been removed from a refrigeration unit, location data indicating the monitoring agent has reached the loading zone or a geofenced perimeter, and the like.

When a start of next phase 1212 is detected, the task manager 1220 determines whether monitoring agents assigned to the next phase 1212 are able to perform actions and functions necessary (as defined within the phase requirements 1222) for monitoring the associated asset during the next phase. In some embodiments, the task manager 1220 determines whether the associated monitoring agents are able to perform the actions and function necessary before beginning the next phase 1212 within itinerary 1210, such as when said associated monitoring agents are in an hibernation mode. Each phase 1212 in multi-phase itinerary 1210 may vary in duration, distance, required actions or tasks performed, method of travel, and the like, resulting in different requirements for battery life or other functionality of monitoring agents. For example, another factor besides battery life may be a condition or maintenance requirement for a component (e.g., an antenna, a communication system, such as a low, medium, or high-power wireless-communication interface; one or more sensors, such as a temperature sensor, vibration sensor, etc.) of the monitoring agent. In an embodiment, the task manager 1220 determines an agent capability 1224, such as a current energy level of a battery (e.g., energy storage 662) of the monitoring agent, and compares that agent capability 1224 information about the next phase 1212. In some embodiments, the task manager 1220 receives phase requirements 1222 about the next phase 1212 and/or agent capability 1224 from a gateway node, another monitoring agent, one or more servers, the cloud, or other members of the wireless tracking system. For example, the phase requirements 1222 and/or agent capability 1224 may be gathered by a server or gateway node of the wireless tracking system responsive to a user scanning a tracking number, QR code, or barcode (e.g., using a client device running a client application) associated with an asset and transmitting information associated with the scanned tracking number, QR code, or barcode (e.g., identifier 122 of FIG. 1) to the monitoring agent. Based on the energy level of the battery of said monitoring agent and the phase requirements 1222, the task manager 1220 determines whether the associated monitoring agent has sufficient battery life to perform the next phase 1212 in itinerary 1210, e.g., the monitoring agent has at least a required energy level to perform standard operation functions throughout the next phase 1212. In some embodiments, if the energy level of the battery is below a threshold value, it is determined that the monitoring agent does not have sufficient battery life. In an embodiment as described further in conjunction with FIG. 16, the task manager 1220 accesses or receives historic information describing battery life requirements or consumption for prior implementations of a given phase 1212 or similar prior-executed phases.

In another embodiment, the monitoring agent implements task manager 1220 and self-performs one or more checks to determine that a component of the monitoring agent is functioning correctly and/or is operating above a threshold level of performance. For example, the monitoring agent tests an antenna and communications system of the monitoring agent by transmitting a communication to a gateway node or server of the wireless tracking system and receiving a response communication from the gateway node or server. If the monitoring agent fails to receive a response communication, the monitoring agent determines that the antenna and/or the communications system is not in a suitable condition to begin a next phase 1212 and generates refurbish indication 1228 which flags the antenna and/or communications system to be inspected or refurbished. In some embodiments, the monitoring agent performs multiple attempts of transmitting a communication signal to the gateway node or server before determining the monitoring agent is not in a suitable condition to begin the next phase 1212.

In other embodiments, the monitoring agent transmits a current energy level of the battery of the monitoring agent to a gateway node, server, or cloud of the wireless tracking system. In an example, the gateway node, server, or cloud of the wireless tracking system implementing the task manager 1220 may generate an itinerary assignment list 1232 that indicates one or more monitoring agents assigned to one or more respective assets beginning a next phase 1212 for which the one or more monitoring agent has sufficient battery life. For example, in an environment (e.g., a facility, such as a warehouse, distribution center, manufacturing center, shipping center, etc.) having a plurality of monitoring agents and a plurality of assets, monitoring agents are assigned to assets in order to optimize respective battery life of the monitoring agent. The gateway node, server, or cloud of the wireless tracking system may perform the optimization or the assigning based at least in part on historic data describing battery life requirements or consumption for implementation of one or more phases 1212 of itinerary 1210. In some embodiments, an energy level threshold 1234 for battery life or energy level of a battery for determining whether a monitoring agent's battery energy level is sufficient for performing tracking of an asset during a given phase is determined based at based at least in part on historic data describing battery life requirements or consumption for prior implementations of a given phase 1212 or similar prior-executed phases.

The task manager 1220 may perform the optimization and generation of itinerary assignment list 1232 or the assigning based at least in part on an output of a machine learning model 1236. In embodiments, the machine learning model is trained on historic data describing battery life requirements or consumption for during specific phases 1212 of the multi-phase itinerary 1210 for prior implementations of a given phase 1212 or similar prior-executed phases. In embodiments, the machine learning assignment model 1236 receives information (e.g., a multi or single-phase application itinerary 1210, such as a set of tasks, distance, or time of transport) describing a next phase 1212 of transportation for an asset and generates the phase requirements 1222 (such as energy level threshold 1234 representing sufficient battery life for a monitoring agent to perform the next phase of itinerary 1210. For example, the multi or single-phase application itinerary 1210 describes a requirement of collecting environmental data (e.g., temperature data, vibration data, humidity data, acceleration data, etc.), with corresponding sensors, proximate the asset; collecting location data of the asset; frequency of transmitting the collected data and other data to a remote entity (e.g., the server, mobile or stationary gateways, client application, network, etc.) of the wireless tracking system 800; a distance and time duration of each phase of the single or multi-phase application; etc. The application itinerary 1210 may further include information relating to the sensor and data collection requirement, frequency of communication with entities of the wireless tracking system 800, a distance and time of duration, etc. while in the hibernation mode, e.g., while at a facility. Using the required information, model 1236 may generate the list of phase requirements 1222 needed, and then use that list of phase requirements 1222 to select a subset of agents from a list of available monitoring agents 1238 and output the subset as the itinerary assignment list 1232.

In another embodiment, the machine learning model 1236 receives information describing a current battery level of the monitoring agent and generates the itinerary assignment 1232 including an output identifying an asset to which each monitoring agent (or a subset of available monitoring agents) should be assigned, or the refurbish indication 1228 indicating that the monitoring agent should be flagged for refurbishment, or the recharge indication 1226 indicating that one or more monitoring agents should be recharged (discussed below). In another embodiment, the machine learning model receives information describing respective next phases of the single or multi-phase application itinerary 1210 for one or more assets and current battery levels for one or more available monitoring agents 1238 and identifies, for the one or more assets, a monitoring agent of the available monitoring agents 1238 having sufficient battery level to perform the next phase itinerary 1210 for the asset and being the most closely matched to the required battery level to perform the next phase of itinerary 1210. This provides the advantage that use of the monitoring agents are optimized to not waste newly manufactured monitoring agents when a partially-used monitoring agent can suffice for a given phase of itinerary 1210. In an embodiment, the gateway node, server, or cloud of the wireless tracking system transmits a notification to the monitoring agent indicating whether the monitoring agent is assigned to an asset for a next phase of itinerary 1210 or is being flagged for refurbishment or recharging. Further, the notification may be transmitted to the client device running the client application, so that an operator (e.g., an employee shipping the asset) may adhere an assigned monitoring agent to the asset.

When monitoring agents are flagged for refurbishment or recharging via indications 1228, 1226, respectively, it is important to ensure that users of the wireless tracking system are able to identify the flagged monitoring agents quickly and without interrupting normal flow of operation. Refurbishing may be based on a number of time a monitoring agent has been recharged exceeding a threshold (e.g., five, ten, or fifteen times). Recharging may include a wireless or wired charger, recharging the battery. Recharging may also include replacing the battery with a new or used battery. Recharging may be based on the battery-level being near zero or zero, or the battery-level being at a level that the monitoring agent cannot complete any phase of potential itineraries 1210 being analyzed by task manager 1220.

Often, recharging or refurbishment occur at a different location or in separate areas within a facility. As such, monitoring agents requiring refurbishment or recharging may need to be separated from a plurality of other monitoring agents to be recharged or refurbished, e.g., pulled from a conveyer belt or bin containing a plurality of monitoring agents. In an embodiment, the recharge indication 1226, refurbish indication 1228, and/or transport indication 1220 may initiate the monitoring agent (either when generated at the monitoring agent because monitoring module 1200 is integral to the monitoring agent, or when received by a monitoring agent) to transmit an alarm or notification to a client device (e.g., the mobile gateway 810 running the client application 822), when the client device scans an identifier (e.g., identifier 122) of the monitoring agent. In embodiments, when the monitoring agents are in motion, e.g., on conveyer belts, the alarm or notification may preempt arrival of the monitoring agent to a location where it may be accessed. For example, the alarm or notification may appear on a display within the facility, an auditory or visual may appear from the tape node (e.g., from a speaker, screen, etc.), or a digital signal may be sent to the client device, via the client application, of an operator within the facility to generate the alarm or notification within a graphical user interface of the client device. In other embodiments, the alarm or notification may occur in real-time as the client device interacts (e.g., scans the identifier, establishes a wireless connection, etc.) with the plurality of tape nodes. In embodiments, plurality of monitoring agents that are capable of being dispensed or sorted using an automatic dispenser (e.g., an automatic dispenser is connected with the conveyor belt, etc.). The automatic dispenser utilizes one or more of the recharge indication 1226, refurbish indication 1228, and transport indication 1230 to identify monitoring agents flagged for refurbishment or recharging (e.g., by scanning the identifier of the monitoring agents during dispensing) and withholds, groups, sorts, etc. the flagged monitoring agents. In embodiments, flagged monitoring agents may provide a visual or auditory signal such as a low-volume noise, a LED light, or the like in response to generation or receipt of recharge indication 1226, refurbish indication 1228, and/or transport indication 1230.

In some embodiments, task manager 1220 receives or maintains a history of charging cycles 1240 within memory 1206 (e.g., memory 658, 658', 658"), or a history of charging cycles of monitoring agents is maintained by a cloud or server (e.g., the database 808) of the wireless tracking system 800. Historic information about when monitoring agents require recharging may be useful in a number of scenarios. For example, historic information about charging cycles 1240 may assist in training a machine learning model 1236 on expected battery life of monitoring agents relative to phase factors such as distance, duration, method of transportation, and the like. In an example, historic information about charging cycles may be used to determine when batteries of tape nodes become incapable of maintaining expected energy levels 1240 (e.g., when a battery drains faster than expected during standard operation in a phase of a multi-phase application) and should be refurbished or replaced. In some embodiments, tape nodes are refurbished when charging cycles are shorter than a threshold amount of time. For example, short charging cycles may indicate the battery lifespan has degraded past a threshold amount, and that the monitoring agent is not able to perform efficiently. In other embodiments, task manager 1220 generates refurbish indication 1228 for a given monitoring agent when a threshold number of charging cycles is achieved (e.g., after 10 cycles of recharging, the tape node is flagged for refurbishment).

Any given implementation of multi-phase monitoring module 1200 may implement any one or more of the above-described functionalities of the multi-phase monitoring module 1200. For example, one implementation of multi-phase monitoring module 1200 may implement only the operating status 1214 generation. As another example, one implementation of multi-phase monitoring module 1200 may implement only the task manager 1220 functionality. As another example, one implementation of multi-phase monitoring module 1200 may implement only a portion of the task manager 1220 functionality, such as only generation of one or more of recharge indication 1226, refurbish indication 1228, transport indication 1230, itinerary assignment 1232, and any combination thereof.

Figure 13:
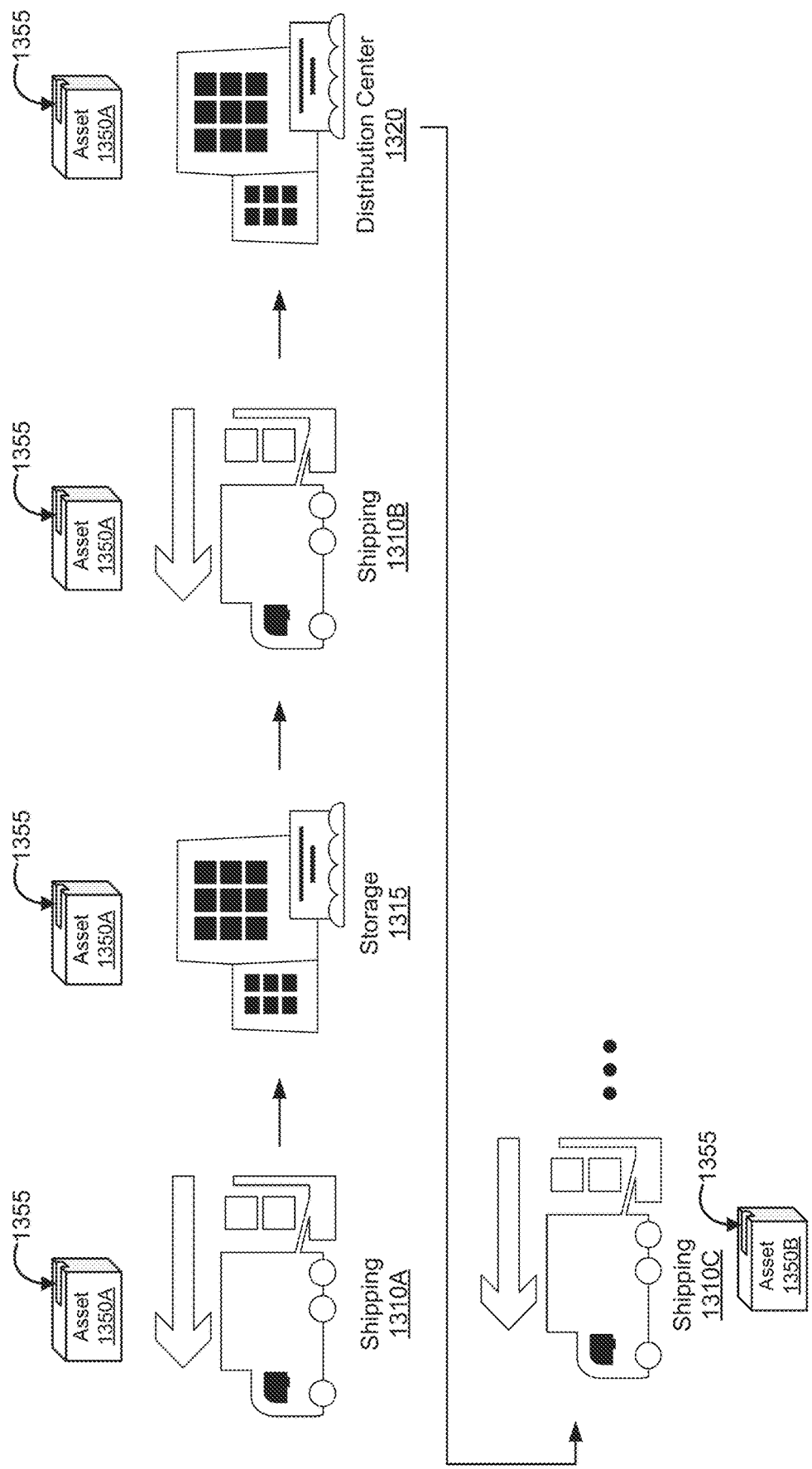
FIG. 13 is an example illustration of multi-phase transportation in a wireless tracking system, according to an embodiment.

FIG. 13 is an example illustration of a multi-phase transportation itinerary, including three shipping phases, a storage facility, and a distribution center. Shipping phases are examples of phases 1212 and multi-phase transportation itinerary is an example of itinerary 1210 (and the reference to "phase(s)" and "itinerary" below are examples thereof as well even if not referenced by a numeral 1212 or 1210). An asset 1350A tracked by a tape node 1355 (e.g., any of tape nodes 818, 828, 832, 842-848, 860, 866), adhered to the asset 1350A, is shipped 1310A from a first location, a storage facility 1315. The shipping 1310A is a first phase of a multi-phase transportation itinerary. During shipping 1310A, the tape node 1355 performs one or more standard operations (e.g., implementation of a standard operating condition 1218), such as, for example, gathering GPS or other location data, gathering sensor data (e.g., vibration data, acoustic data, acceleration data, etc.) describing vibrations, sound, acceleration, or other events experienced by the asset 1350A, transmitting gathered data to one or more other nodes (e.g., tape node 818, 828, 832, 842-848, 860, 866, mobile or stationary gateways 810, 812, 814, etc.) or entities of the wireless tracking system (e.g., server 804, client application 822, etc.), and the like.

The first phase of the multi-phase transport itinerary ends and a second phase of the multi-phase transport itinerary begins when the asset 1350A arrives at a storage facility 1315, where it may be stored for a duration of time. In some examples, the tape node 1355 may be removed for recharging or refurbishing at the storage facility 1315 where a task manager either on the tape node 1355, or at a device at or associated with the storage facility flags the tape node 1355 for recharge or refurbishment (via generation of a recharge indication 1226 or refurbish indication 1228). In an example, the tape node 1355 is stored with the asset 1350A at the storage facility 1315. While the asset 1350A is stored or processed at the storage facility 1315, the tape node 1355 may not be required to perform operations required during transportation. For example, it may be unnecessary for the tape node 1355 to gather GPS or other location data, as a location of the tape node is unchanged for the duration of time that the asset 1350A is stored. In another example, it may be unnecessary for the tape node 1355 to gather and transmit sensor data, as events such as tampering, shaking, and the like are unlikely to occur while the asset 1350A is stored. As such, the tape node of the asset 1350A may activate a hibernation mode (e.g., hibernation mode 1216), as discussed herein, where the tape node 1355 deactivates, or reduces, data collection, transmission, and reception. For example, the tape node 1355 may deactivate all sensor data collection, reduce or deactivate data reception from other nodes or entities of the wireless tracking system or adjust the frequency at which data packets are received by the tape node, and/or may deactivate GPS location collection.

In embodiments, hibernation mode 1216 may be programmed to activate during phases as well as between phases. For example, the storage facility 1315 may be a phase where the monitoring agent activates hibernation mode 1216 or remains in a standard mode 1218 for a next phase 1212. For example, if the storage facility 1315 is a final destination of a multi-phase application, the monitoring agent may activate hibernation mode 1216 when being prepared for storage at a collection point. Upon being assigned a new task (e.g., by the server 804 or other entity of the wireless tracking system 800) for a next phase 1212, the monitoring agent transitions from hibernation mode 1216 to a standard mode 1218 to perform the new task.

A third phase of the multi-phase transportation itinerary occurs when the asset 1350A is shipped 1310B from the storage facility 1315 to a next location. In the example of FIG. 13, the asset 1350A is shipped to a distribution center 1320. Before entering the third phase of the multi-phase transport itinerary, the tape node 1355 may exit the hibernation mode and begin performing one or more standard operations as described in conjunction with the first phase of the multi-phase itinerary. In embodiments, the one or more standard operations performed for the third phase of the multi-phase itinerary may be different than those performed during the first phase and the second phase of the multi-phase itinerary. For example, a third phase shipping 1310B may involve transport in a more secure vehicle than the first phase shipping 1310A, and the third phase 1310B may require the tape node 1355 to gather less sensor data, collect less location data, and/or transmit/receive fewer data packets to/from other tape nodes, gateway nodes, or entities of the wireless tracking system. In another example, third phase shipping 1310B involves transport in a slower vehicle than the first phase shipping 1310A, and the third phase shipping 1310B may require the tape node to collect GPS or other location data at less frequent intervals. In another example, a third phase shipping 1310B may involve a different method or mode of transportation (e.g., airplane, train, ship, etc.) and the third phase shipping 1310B may require the tape node to transmit data via different communication channels or at different frequencies of communication.

The third phase of the multi-phase transportation itinerary ends and a fourth phase begins at a distribution center 1320. In the embodiment of FIG. 13, the tape node is removed from the asset 1350A and is recycled in response to a generation of a transport indication (e.g., transport indication 1230), e.g., by being adhered to or otherwise put into a second asset 1350B. For example, an adhesive layer (e.g., adhesive layer 118, 642, 646, 712; FIGS. 1, 6, 7) of the monitoring agent may be a reusable adhesive layer or, alternatively, an adhesive (e.g., glue the tape to the asset)

may be applied to a surface of the adhesive layer to adhere the monitoring agent to the second asset 1350B. Alternatively, the monitoring agent may not be required to adhere to the second asset 1350B, or may not have an adhesive layer (e.g., a sticky side) at all and may be rather placed inside the second asset 1350B. As yet another example, the monitoring agent may be otherwise adhered to the second asset 1350B (e.g., Velcro, zip tie, hooks, rope, wire, etc.). While the tape node 1355 is at the distribution center 1320, the tape node 1355 experiences downtime and, as described in conjunction with the downtime experienced between the first and third phases of the multi-phase transport itinerary, may be required to perform different or fewer functions (e.g., enter a hibernation mode), may be recharged or refurbished, and the like.

The next phase of the multi-phase transportation itinerary begins when the second asset 1350B is shipped 1310C from the distribution center 1320. The tape node 1355 may perform one or more standard operations as described in conjunction with previous shipping phases 1310A, 1310B. In other embodiments, the tape node 1355 may experience one or more additional phases of the multi-phase transportation itinerary before, during, or after the phases described in FIG. 13, and may be associated with different or additional functions, assets, and locations during the multi-phase transportation itinerary.

FIG. 13 merely illustrates example phases for multi-phase transport, but other phases, methods, and locations may be included in a multi-phase transport, that may include additional and/or alternative phases than those shown in FIG. 13. Accordingly, with respect to multi-phase monitoring module 1200, it should be appreciated that, as illustrated in FIG. 13, each individual phase 1212 of the multi-phase itinerary 1210 may have different, or the same, phase requirements 1222.

Figure 14:
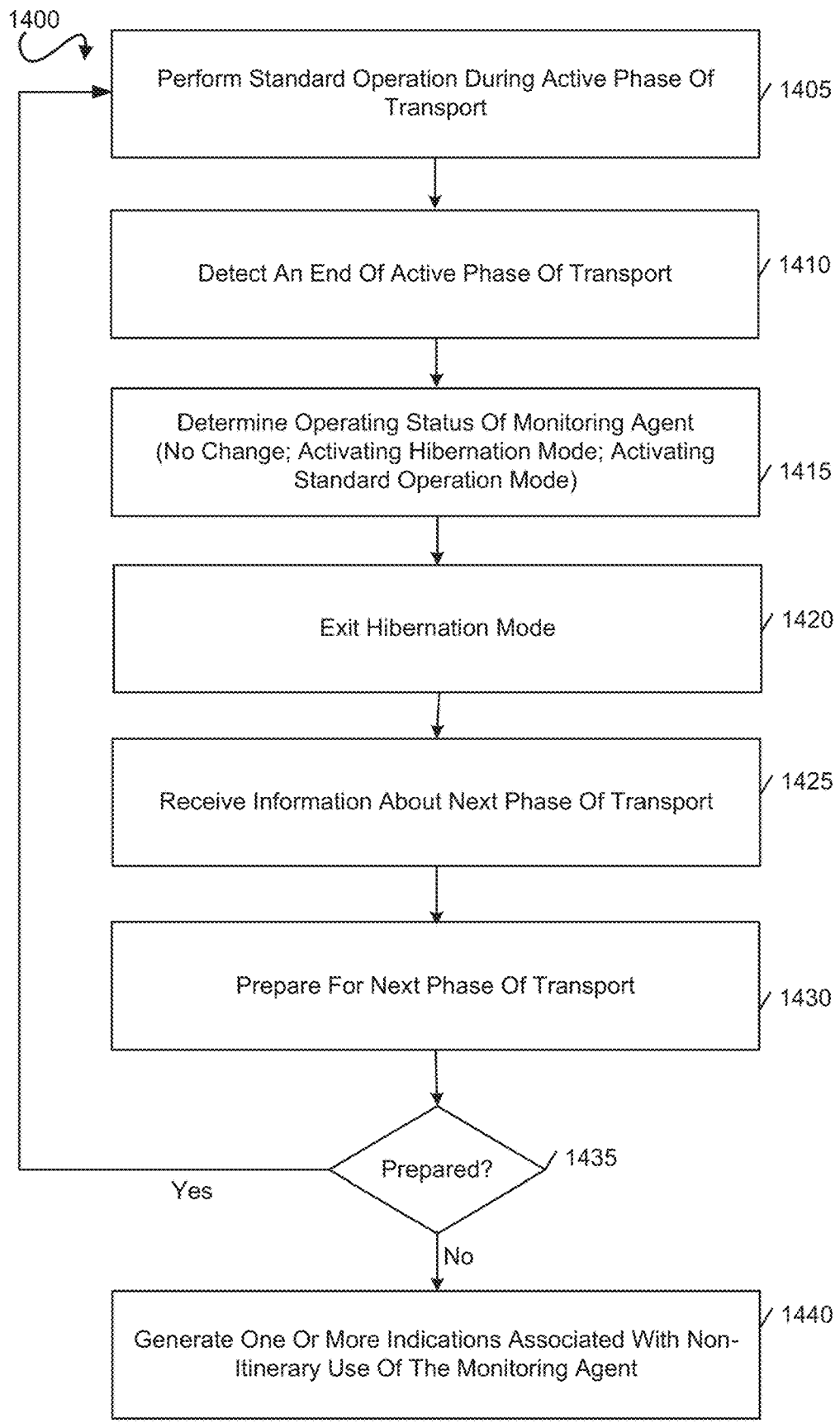
FIG. 14 is a flowchart illustrating a method for preparing tape nodes of a wireless tracking system for multi-phase transport, according to an embodiment.

FIG. 14 is a flowchart illustrating a method 1400 for preparing tape nodes of a wireless tracking system for multi-phase transport. Method 1400 may be implemented by any device including the multi-phase monitoring module 1200, discussed above, such as any device (including a monitoring agent/tape node itself, or an external device such as client device or server) within wireless tracking system 800 of FIG. 8. A monitoring agent (e.g., any of tape nodes 818, 828, 832, 842-848, 860, 866, etc.) of a wireless tracking system (e.g., wireless tracking system 800) performs (1405) an active phase of transport of a multi-phase itinerary in a standard operation mode. A standard operation mode is an example of standard operation mode 1218 and may, for example, comprise one or more of: capturing sensor data (e.g., vibration data, acceleration data, humidity data, etc.) at regular intervals or in real-time; transmitting data packets of the sensor data or other information to a cloud, server (e.g., server 804), or other node of the wireless tracking system; establishing communications connections with clouds, servers, other nodes (e.g., tape nodes 818, 828, 832, 842-848, 860, 866, mobile gateways 810, 812, stationary gateway 814, etc.), Wi-Fi networks, etc.; and the like.

The multi-phase monitoring module detects (1410) an end of itinerary or end of active phase of transport. In one example of block 1410, agent phase data 1208 is generated with respect to the monitoring agent detects the end of a first phase of the itinerary (e.g., one of phases 1212 in itinerary 1210) upon receipt of agent phase data 1208 of a designated monitoring agent (such as via establishing a wireless connection with a designated monitoring agent, mobile gateway, stationary gateway, and/or client device (e.g., running a client application 822), each of which may be located at a perimeter of, or within, the facility; or via capturing data at the monitoring agent itself in embodiments where the module 1200 is integral to a monitoring agent). The received journey status information is compared to itinerary 1210 and phase(s) 1212 therein to determine if one of phases 1212 has been completed. In one example of block 1410, the monitoring agent detects the end of active phase upon traversing a geofenced perimeter, e.g., by matching collected GPS data of the monitoring agent with a coordinate stored in memory representing the end of an active phase (e.g., phase 1212). In one example of block 1410, the detection occurs upon the client device (e.g., client device 810) scanning an identifier (e.g., identifier 122) of the monitoring agent. The client device may then store the scanned identifier in local memory or transmit the scanned identifier, and corresponding information regarding the monitoring agent, to the server (e.g. server 804), for the server to update a database (e.g., database 808). In one example of block 1410, the monitoring agent detects a magnetic field, with a magnetic sensor of the monitoring agent, propagated by a monitoring agent, mobile gateway, stationary device, etc.

Responsive to the monitoring agent detecting an end of journey or an end of phase, an operating status is determined (1415). In one embodiment, multi-phase monitoring module 1200 determines operating status 1214 for an additional one (following the most-recently finished phase) of phases 1212 of itinerary 1210. In one example of block 1415, the operating status does not change from the prior phase that just ended. In another example of block 1415 the monitoring agent is activated into a hibernation mode according to hibernation mode 1216. In one example of block 1415, during hibernation mode, one or more of the functions of standard operation are turned off or significantly reduced (e.g., in frequency, in amount of data exchanged, etc.), so as to reduce battery consumption while the monitoring agent is not in active transport. In one example of block 1415, during hibernation mode, the monitoring agent deactivates all functionality for a finite amount of time (e.g., thirty minutes, an hour, two hours, etc.). In one example of block 1415, during hibernation mode, the monitoring agent alters the frequency of data reception to a frequency that requires less battery-power consumption. In one example of block 1315, during hibernation mode, the monitoring agent deactivates all functionality, except at least one sensor, which detects an environmental condition (e.g., a magnetic field, humidity, temperature, etc.) differential, indicating the monitoring agent is starting a next phase of the multi-phase application.

If, in block 1415, the monitoring agent is put into a hibernation mode, responsive to the monitoring agent identifying when a start of a next phase is to occur, e.g., by receiving a notification from a gateway node, server, or network of the wireless tracking system or by identifying one or more indicators of a start of next phase via captured sensor data, the monitoring agent exits (1420) hibernation mode 1216. In embodiments, the monitoring agent exits the hibernation mode 1216 in response to the stimulus 1209 detecting an external stimulus, such as an alteration to the monitoring agent. For example, the alteration to the monitoring agent may include a tab or a circuit of the monitoring agent being broken, a physical button located on the monitoring agent being pressed, a capacitive sensor/button being pressed, a magnet being within a proximity of a magnetometer/hall sensor/switch on the monitoring agent, the monitoring agent being shaken (e.g., detected by an accelerometer, vibration sensor, etc.), or other stimulus. Likewise, the end of a phase may be detected by the stimulus 1209 detecting a stimulus (such as, but not limited to, a predefined pattern of movement, temperature, light detection, etc.) associated with the end of the phase. For example, a user may be trained to use one of the above stimulus to signal the end of a task for a monitoring agent. Further, the external stimulus may be provided or coincidentally exist in an automated process. For example, at the end of an assembly line or a conveyor belt, a particular shaking or movement of the asset/monitoring agent occurs which is detected by an accelerometer.

The monitoring agent receives (1425) information (e.g., a multi-phase application itinerary) about the next phase of itinerary. In one example of block 1425, the monitoring agent may receive the multi-phase application itinerary (e.g., itinerary 1210) from a gateway node, server, or network of the wireless tracking system describing the next phase (e.g., phase 1212). In some embodiments, the monitoring agent may have previously received the information and stored the information in its memory. The multi-phase application itinerary and phase requirements (e.g., phase requirements 1222) associated therewith may define anyone more of a route, location data, a location of a destination, mapping data, a schedule for performing actions (e.g., collecting sensor data, transmitting/receiving data to/from other monitoring agents, gateway nodes, server, etc.), a threshold battery energy level required (e.g., determined by training a machine learning model on historical data, as discussed below) to complete the next phase, data indicating estimated power consumption, locations of gateway nodes along the route, identifiers of other tape nodes and/or gateway nodes (e.g., unique identifiers, hardware identifiers, MAC address, etc.), methods of transportation affecting operations to be performed during the next phase of the itinerary, other assets or monitoring agent associated with the next phase of the itinerary, other information relevant to the next phase of the itinerary, or some combination thereof.

Method 1400 further includes preparing (1430) for the next phase of the itinerary. In one example of block 1430, preparing for the next phase of the itinerary may include activating each of the sensors required for sensor data collection during the next phase of the itinerary. In one example of block 1430, preparing may include activating a wireless-communication interface (e.g., medium-power wireless-communication interface 672') required for transmitting/receiving data during the next phase of the itinerary. Method 1400 further includes determining (1435) whether it is able to perform the next phase of the itinerary. In one example of block 1435, task manager 1220 compares 1222 to agent capabilities 1224 as discussed above to determine if the monitoring agent is capable of performing the next phase 1212 defined in itinerary 1210. For example, the battery level defined within agent capability 1224 may be compared to energy level threshold 1234 to determine if the monitoring agent is capable of performing the next phase including the required duration, distance, sensor function, and method of transport for the next phase of the itinerary. In one example of decision block 1435, the energy level of the monitoring agent (e.g., as defined in the agent capability data 1224) is compared to an energy level threshold 1234, that was determined by training a machine learning model (e.g., assignment model 1236) on historical data (e.g., charging history 1240) from monitoring agent previously starting the same next phase of the itinerary or similar phases in other itineraries. If, in block 1435, the monitoring agent is capable of performing the next phase of itinerary (decision: "YES"), method 1400 continues to block 1405, with performing a standard operation (or otherwise defined operation status 1214) during the active phase of transport (next phase of transport) based on the requirements outlined in the multi-phase application itinerary 1210. However, in block 1435, the monitoring agent is not capable of performing the next phase of itinerary (decision: "NO"), method 1400 continues to block 1440.

Method 1400 further includes generating (1440) one or more indications associated with non-itinerary use of the monitoring agent. For example, block 1440 may include generating one or more of recharge indication 1226, refurbishment indication 1228, or transport indication 1230. In one example of block 1440, a client device, based on receipt of one or more of recharge indication 1226, refurbishment indication 1228, or transport indication 1230, will generate an alert for display flagging the monitoring for either refurbishment or recharging. In one example of block 1440, an audial or visual alert will be generated by the monitoring agent, mobile or stationary gateway, or a display within a monitor (e.g., desktop, monitor, etc.) within the facility. During refurbishment, one or more components of the monitoring agent may be removed and replaced with updated components to restore the monitoring agent to a standard of operation. For example, if a battery of a to monitoring agent is determined to be unable to hold charge, the monitoring agent may be flagged for refurbishment wherein the battery of the monitoring agent is removed and a new battery is placed into the monitoring agent. In another example, if one or more sensors of the monitoring agent are experiencing malfunctions, the monitoring agent may be flagged for refurbishment wherein the one or more sensors are removed and one or more corresponding new sensors are placed into the monitoring agent. Monitoring agents flagged for refurbishment or recharging may be transported to a location (as discussed below) for refurbishment or recharging, e.g., a distribution center having facilities to perform the refurbishment or recharging, or may be processed at a current location. "Flagged" as used above means, unless otherwise specified, that one or more of recharge indication 1226, refurbishment indication 1228, or transport indication 1230 have been generated in association with a given monitoring agent.

In embodiments, the monitoring agent performs one or more of the steps of determining whether it is prepared for the next phase of the itinerary (e.g., the multi-phase monitoring module 1200 is integral to the monitoring agent). For example, the monitoring agent determines the current energy level of a battery of the monitoring agent, accesses historic data about energy consumption of similar phase of the itinerary or a model (e.g., assignment model 1236), and compares the current energy level of the battery to historic data about energy consumption during transportation. Responsive to a determination that the monitoring agent is not prepared for the next phase of the itinerary, the monitoring agent flags itself for refurbishment or recharging (e.g., the multi-phase monitoring module 1200 is integral to the monitoring agent). In embodiments, one or more of the steps may be performed by other entities of the wireless tracking system (e.g., the multi-phase monitoring module 1200 is external to an analyzed monitoring agent). For example, a gateway node or server of the wireless tracking system may receive or request data from a plurality of monitoring agents about current energy levels and assign monitoring agents to assets preparing for next phases of the itinerary based on the current energy levels and stored historic data about energy consumption during transportation. In another example, a gateway node or server may transmit instructions to monitoring agents to enter hibernation mode, to enter standard operation, or to perform other operations or enter other configurations.

In other embodiments, the method 1400 may include additional, fewer, or different steps, and the steps may be performed in a different order. In other embodiments, steps of the method may be performed by different components of the wireless tracking system.

Figure 15A:
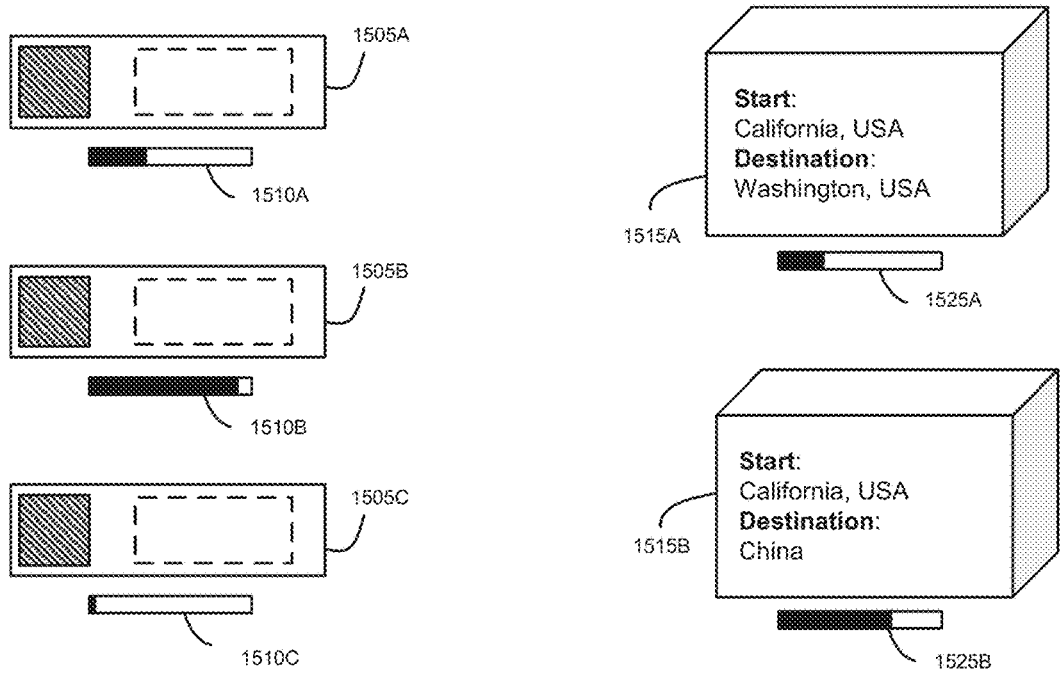
FIGS. 15A-B are example illustrations of optimizing tape nodes of a wireless tracking system for multi-phase transport, according to an embodiment.
Figure 15B:
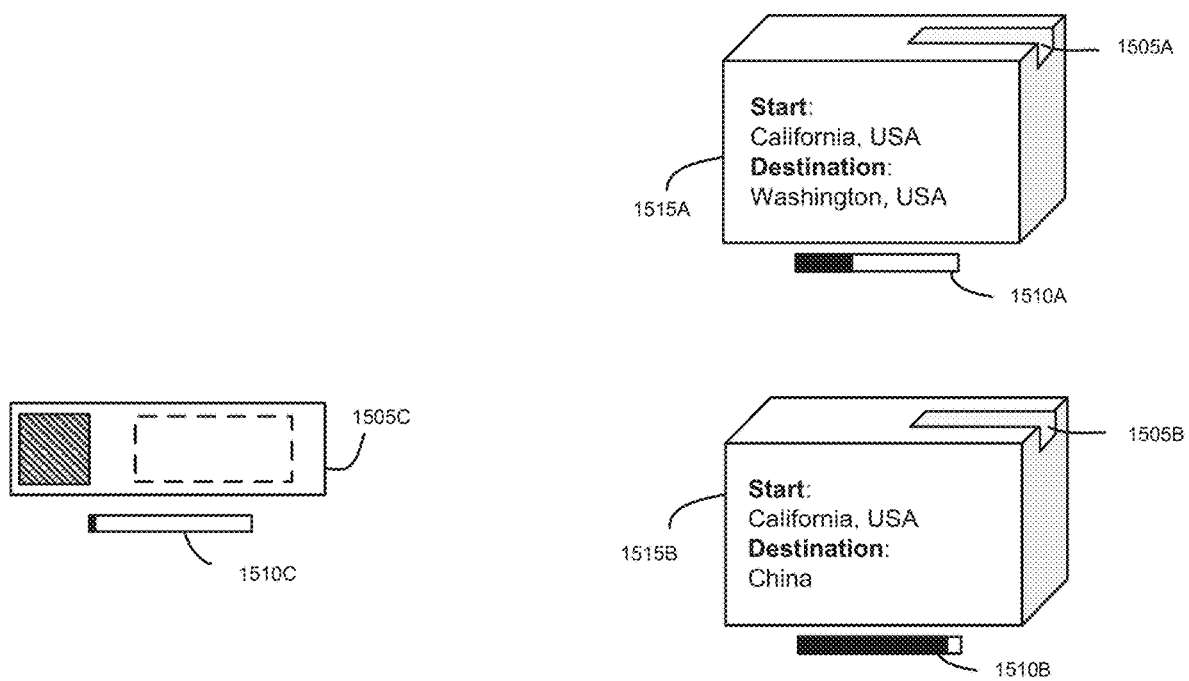

FIGS. 15A-15B are example diagrams illustrating a selection of monitoring agents for a next phase of a multi-phase application based on respective energy levels. FIGS. 15A-B show an example operation of task manager 1220 generating itinerary assignment 1232. FIGS. 15A and 15B show bar graphs 1510A, 1510B, 1510C that indicate a battery level of the respective monitoring agents 1505A, 1505B, 1505C and corresponding threshold indicators 1525A, 1525B that indicate a required battery level (e.g., the energy level threshold 1234, with reference to FIGS. 12 and 14) of a monitoring agent to perform a next phase of a itinerary for the respective assets (e.g., assets 1515A, 1515B). Graphs 1510 are examples of battery levels identified within agent capability data 1224. In environments with a plurality of monitoring agents 1505A-C having different battery levels 1510A-C and a plurality of assets 1515A-B having different destinations, standard operating requirements (e.g., certain temperature requirements, etc.), methods of transportation, and the like, it may be difficult to manually assign tape nodes to assets in such a way that current battery levels 1510 of monitoring agents 1505 are optimized (e.g., assigned to an asset with a battery level threshold that is within a value of the battery level of the monitoring agent). For example, given two monitoring agents, monitoring agents A and B, with numerical values of 5 and 10 representing their respective battery levels, and an asset C, with a respective battery level threshold of 4, monitoring agent A may be assigned to the asset C because 5 satisfies the battery level threshold but is closer to the threshold than the battery level of monitoring agent B. This may prove useful for when another asset that requires a battery level threshold of 9 arrives.

While the examples of FIGS. 15A-15B only show several monitoring agents and several assets, environments may have many more monitoring agents and assets, e.g., tens or hundreds or thousands. In embodiments, the tens, hundreds, thousands, etc. of monitoring agents may be dispensed by a tape distribution device (e.g., a smart vending machine, as discussed below). In embodiments, selection of which of the tens, hundreds, thousands, etc. of monitoring agents is optimized via generation of an itinerary assignment list (e.g., itinerary assignment list 1232). In an optimized embodiment, monitoring agents 1505 are assigned such that their current battery levels 1510 correspond to a required battery level threshold for a respective asset and phase(s) in the itinerary associated with the given monitoring agent/asset in a way that optimizes (or is within a range of optimization) the entire inventory of monitoring agents available. As such, monitoring agents having low battery levels may generally be assigned to assets having short phases of transport, or assets being transported via plane such that many functions of the monitoring agent may be disabled during a plane-transport phase of the itinerary, while monitoring agents having high battery levels may generally be assigned to assets having long phases of transport, or assets being transported via truck such that maintaining communications during transport is more valuable, depending on the available monitoring agents. Optimization may be based on different types of phases other than transport-types. For example, a given phase or itinerary may indicate a valuable sensor data is required, and thus battery level should be maintained high during a given phase or full itinerary, in which case the assigned monitoring agent would need to have a full charge, or a majority of its charge available. The wireless tracking system dynamically allocates the monitoring agents to various assets based on the battery level (or other capabilities such as sensor types, communication capabilities, etc. as defined in agent capability 1224) of the available monitoring agents and the phase requirements 1222 for the itinerary or phases thereof for all of the assets. Monitoring agents having battery levels so low that they cannot be assigned to assets without risk of battery depletion during the next phase of the itinerary are flagged to be refurbished or recharged.

In the example of FIGS. 15A-15B, a first tape node 1505A having a first battery level 1510A (e.g., a numerical, unitless value of 10) is assigned to a first asset 1515A having a required energy threshold 1525A (e.g., a numerical, unitless value of 9). The first asset 1515A is associated with a short phase of transport (e.g., California, USA to Washington, USA). As such, while the first tape node 1505A has a relatively low battery level 1510A, the battery level is at or above (i.e., satisfies) the required battery level threshold 1525A for the next phase of transport for the first asset 1515A. As such, the wireless tracking system determines that the first tape node is able to perform the next phase of transport. A second tape node 1505B having a second, higher battery level 1510B is assigned to a second asset 1515B having a required battery level threshold 1525B. The second asset 1515B is associated with a long phase of transport (California, USA to China), resulting in a higher required energy level threshold 1525B. A third tape node 1505C having a third, lower battery level 1510C is flagged for refurbishment or recharging, as the wireless tracking system determines that it is unable to sustain battery life for a next phase of transport for an asset in the environment.

FIG. 16 is an example illustration of a spreadsheet 1600 of a charging cycle for a monitoring agent (e.g., any of tape nodes 818, 828, 832, 842-848, 860, 866, etc.) of a wireless tracking system (e.g., the wireless tracking system 800). FIG. 16 is an example of charging history 1240 of FIG. 12. In embodiments, the spreadsheet 1600 is maintained by a respective monitoring agent of the wireless tracking system. In other embodiments, the spreadsheet 1600 is maintained by a server (e.g., database 808 of server 804) or cloud of the wireless tracking system. In the example of FIG. 16, information of charging cycles for monitoring agents include a number for the cycle, a date of receipt or intake of the monitoring agent at a facility for refurbishment or recharging, whether the monitoring agent was recharged or refurbished, whether the recharging or refurbishment was successful, and a date of deployment of the monitoring agent from the facility for refurbishment or recharging. In other examples, additional, fewer, or different information may be stored. For example, other information stored in conjunction with charging cycles may include one or more of: a running average of time since the last recharge or refurbishment for the respective monitoring agent; a historic average of time between recharges or refurbishments for a plurality of monitoring agents of the wireless tracking system; information describing one or more phases of transport performed by the monitoring agent and the corresponding multi-phase application itinerary, such as distance and time of phase, which sensors were utilized, sensor data requirements, frequency of transmission/reception of data or tracking requirements, prior to receipt for refurbishment or recharge; an amount of time since a last refurbishment; and the like.

In embodiments, the monitoring agent, cloud, mobile or stationary gateway, and/or server of the wireless tracking system determines, based on the charging cycle information, whether to recharge or refurbish the monitoring agent. For example, refurbishment may occur at regular charging cycles, e.g., after 10 cycles of recharging, as shown in FIG. 16. In another example, refurbishment may occur when battery life of a tape node averages below a threshold expected performance, e.g., requiring recharging at increasing frequency in comparison to previous performances by the tape node or in comparison to historic data describing performance of a plurality of other tape nodes, tracked with respective spreadsheets. In another example, refurbishment may occur responsive to a failed attempt at recharging the battery (as discussed below), e.g., indicating that the battery is unable to sustain charge. In other examples, other factors, intervals, or considerations may be used to determine when to refurbish a battery of a tape node.

FIG. 17 shows example graphs representing historic energy consumption during phases of transport for a plurality of monitoring agents. Graphs 1700 are another example of charging history 1240 of FIG. 12. Because monitoring agents may have different battery capacities based on, for example, a condition of batteries (new or used) at a time of a journey, functionalities of a monitoring agent (e.g., a tape node configured to perform satellite communications may have a larger battery capacity than a tape node configured to perform local Bluetooth communications only), sensor data requirements, and the like, it is valuable to ensure that a given monitoring agent has sufficient energy levels to complete a next phase of an itinerary associated with a respective asset. Each graph 1705, 1710 shows a distribution 1720, 1725 (e.g., during a one-day journey and a five-day journey) illustrating the energy consumption during a phase of itinerary for various monitoring agents, with the x-axis representing an amount of energy (in kilowatt-hours (kW-h)) that was used during the respective itinerary, and the y-axis representing a number of monitoring agents (normalized) that consumed the respective amount of energy. In embodiments, other units may be used to represent the amount of energy used during a respective itinerary. In other embodiments, the y-axis may represent a number of trips (e.g., specific routes or journeys) resulting in a respective energy usage. In some embodiments, data describing historic energy consumption during phases of an itinerary are stored by monitoring agents, mobile or stationary gateways, a cloud, or server of the wireless tracking system, and may be used to determine whether monitoring agents have sufficient battery levels to perform phases of an itinerary (such as used by multi-phase monitoring module 1200). In embodiments, the data describing historic energy consumption may be stored by monitoring agents, or may be transmitted to monitoring agents for use in determining whether the respective monitoring agents have sufficient battery levels to perform phases of an itinerary (such as used by multi-phase monitoring module 1200). In the example of FIG. 17, historic energy consumption is illustrated for two examples with different durations of itinerary. The first example shown in the first graph 1705 is of a five-day journey. The second example shown in the second graph 1710 is of a one-day journey. In examples, historic energy consumption may additionally or instead be illustrated based on other factors, including distance covered during transportation, method of transportation, tasks or actions to be performed by tape nodes during transportation, and the like.

The first graph 1705 illustrates energy consumption in kWh by monitoring agents over a five-day journey. The first distribution 1720 shows the most frequent amount energy consumption for the five-day journey at an energy consumption denoted by $e_1$. The second graph 1710 illustrates energy consumption in kWh by monitoring agents over a one-day journey. A second distribution 1725 shows the most frequent amount of energy consumption for the one-day journey at an energy consumption $e_2$. While the embodiment of FIG. 17 shows an $e_1$ greater than $e_2$, in other embodiments $e_1$ may be equal to or less than $e_2$. Because many factors can impact the energy consumption of a monitoring agent during an itinerary or given phase thereof (e.g., method of transportation; frequency of communications or connections to networks, nodes, servers, etc.; delays; frequency and type of tasks and/or actions performed during transportation; functionality of monitoring agents; freshness of batteries in monitoring agents; and the like), the distribution curves 1720, 1725 are bell curves having outlier data points. Based on the distribution curves 1720, 1725, and a model generated therefrom (such as assignment model 1236) the multi-phase monitoring module 1200 may determine a likelihood that a given monitoring agent is able to perform a given phase of an itinerary for an asset—for example, a monitoring agent having a partially depleted battery may only have a 20% chance of completing a five-day journey, but may have a 90% chance of completing a one-day journey and, therefore, may be assigned to an asset having a one-day journey. In embodiments, different distribution curves may be used to represent historic energy consumption during phases of itineraries, e.g., the distribution curves may not be bell curves, but may have a different distribution.

In embodiments, the multi-phase monitoring module 1200 may generate the itinerary assignment 1232 based on set threshold likelihoods for monitoring agents to be assigned to assets based on cost, whether a customer pays a premium, value of the asset (e.g., jewelry, etc.), susceptible to environmental conditions (e.g., medicine, perishable items, etc.), etc. For example, for high-priority or sensitive assets, the monitoring agent may require that monitoring agents have a 99% chance of completing respective next phases of a given itinerary to minimize a likelihood of the monitoring agents running out of battery power during the itinerary or being unable to fulfill one or more functions required for the respective high-priority or sensitive assets (such as temperature monitoring over a given period of time even where the asset is not being transported).

In other embodiments, the multi-phase monitoring module 1200 may select a threshold battery level or a threshold likelihood of success based on one or more of the peak of the curve, a mean or median of the data, an energy consumption value corresponding to a $40^{th}$ percentile (e.g., filter out every energy consumption level less than the $40^{th}$ percentile of the distribution), or an energy consumption value corresponding to some other percentile of the curve. For example, the multi-phase monitoring module 1200 may select the threshold battery level in order to maximize a number of monitoring agents that are selected for reuse (e.g., a lower threshold battery level, such that monitoring agents having lower battery levels are selected), to maximize a likelihood of success for a plurality of monitoring agents (e.g., a higher threshold battery level, such that the likelihood of a given monitoring agent running out of energy is minimized), or based on one or more other conditions.

In some embodiments, the multi-phase monitoring module 1200 trains and/or applies a machine learning model (e.g., assignment model 1236). Data describing historic energy consumption may be used to train the machine learning model. The machine learning models may be trained to receive as input data describing current energy levels of a monitoring agent and information describing a next phase of an itinerary and to output a prediction of whether the monitoring agent is able to perform the next phase of the itinerary. For example, the machine learning model outputs whether the monitoring agent performing the phase of the itinerary meets a threshold likelihood of success.

Renovating Components of Tape Nodes

The following description describes different embodiments for renovating, refurbishing, or recycling components of the monitoring agents, as discussed above in FIGS. 12-17. In some examples, a battery or batteries of a monitoring agent is recharged or replaced. In other examples, other components of the monitoring agent, such as electronic sensors, wireless communications systems, processors, and the like, are renovated, refurbished, recycled, or replaced instead of or in addition to a battery or batteries of the tape node.

Figure 18A:
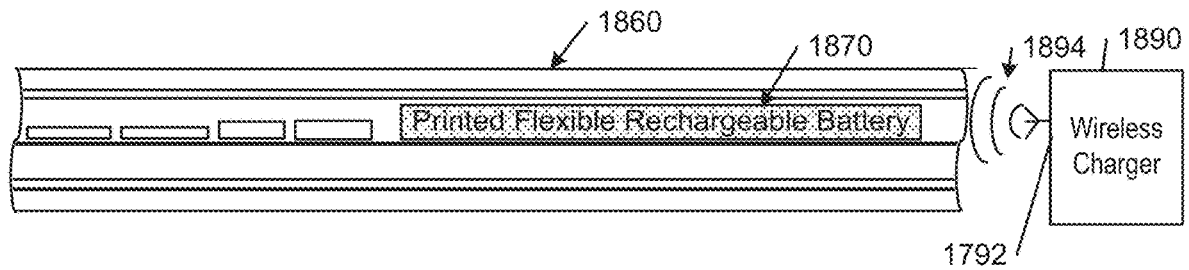
FIG. 18A is a diagrammatic cross-sectional side view of a tape node that includes a printed flexible rechargeable battery being charged by wireless charger, according to an embodiment.

FIG. 18A shows a cross-sectional side view of a portion of a segment of a tape node being wirelessly charged by a wireless charger. The tape node 1860 may include embodiments of the components of the wireless tape nodes 113, 410, 640, 670, 680 (FIGS. 1, 4, 6A-C). The tape node 1860 includes a flexible, rechargeable battery 1870. In some embodiments, the flexible battery 1870 is a printed flexible battery. In the illustrated embodiment, the tape node 1860 is configured to be recharged by a wireless charger 1890 that includes an antenna 1892 that generates radio frequency waves 1894 that are captured by a conventional RF receiver circuit configured to generate electrical power to charge the flexible rechargeable battery 1870. Thus, by using the wireless charger 1890 the tape node 1860 may be recharged when its flexible battery 1870 is low. In other embodiments, the wireless charger 1890 is an inductive charger, and the tape node includes an inductive charging circuit. In this case, the flexible battery 1870 is recharged by inductive charging (e.g., using the Qi standard). In other embodiments, the tape node includes a conventional single or multiple cell rechargeable battery, instead of the flexible battery 1870.

Figure 18B:
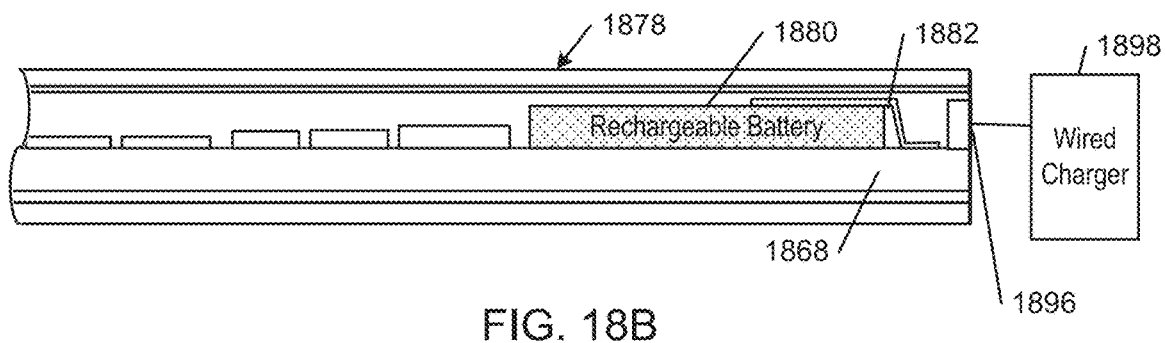
FIG. 18B is diagrammatic cross-sectional side view of a tape node that includes a rechargeable battery being charged by wired charger, according to an embodiment.

FIG. 18B shows a cross-sectional side view of an alternate example 1878 of the segment of the tape node 1860 shown in FIG. 18A. One difference between this alternative example 1878 and the example 1860 shown in FIG. 18A is that the tape node 1878 includes a conventional single or multiple cell rechargeable battery 1880 (e.g., a watch style disk or button cell battery) and associated electrical connection apparatus 1882 (e.g., a metal clip) that electrically connects the electrodes of the battery 1880 to contact pads on the flexible circuit 1868, instead of the printed flexible rechargeable battery 1870 and the RF receiver circuit.

In the illustrated embodiment of FIG. 18B, the tape node 1878 includes an electrical adapter 1896 that is configured to receive an electrical connection with a wired charger 1898. The wired charger 1898 can be connected to the electrical adapter 1896 to provide electrical power to the rechargeable battery 1880. The wired charger 1898 may be connected to a power source (not shown) (e.g., an electrical line) or include a power source integrated with the wired charger 1898. The wired charger may be, for example, a USB charger or some other type of wired charger, according to some embodiments.

Figure 19A:
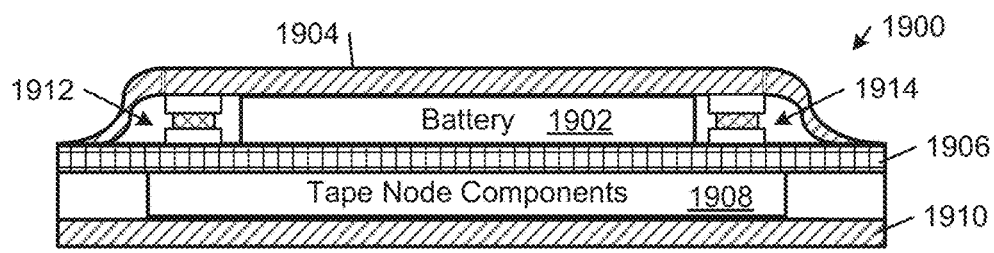
FIG. 19A is a diagrammatic cross-sectional side view of a tape node that includes tape node components and an embedded battery, according to an embodiment.
Figure 19B:
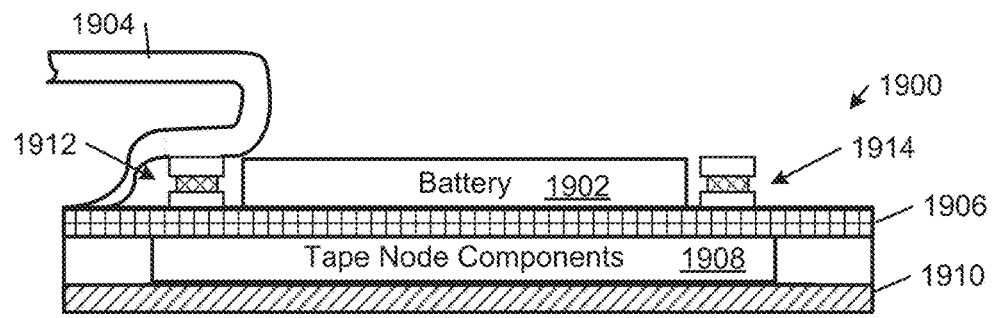
FIG. 19B is a diagrammatic cross-sectional side view of the tape node shown in FIG. 13A with a flexible cover peeled back to allow the embedded battery to be replaced, according to an embodiment.

FIGS. 19A and 19B show an embodiment of an example tape node 1900 that includes an embedded battery 1902. The tape node 1900 may be an embodiment of the wireless tape nodes 113, 410, 640, 670, 680, 1760, 1778 (FIGS. 1, 4, 6A-C, 17A, B). FIG. 19A shows the tape node 1900 with a flexible cover layer 1904 covering a battery 1902. The battery 1902 may be any type of battery, including but not limited to a rechargeable battery, a thin film printed battery, a conventional coin cell battery, an alkaline battery, or the like. The tape node 1900 includes the removable cover 1904, a circuit layer 1906, a component layer 1908, and a substrate layer 1910, as described with reference to FIGS. 6A-C. In some examples, the removable cover 1904 includes a flexible material (e.g., plastic) that is attached to the top surface of the battery 1902 with an adhesive layer. In some embodiments, the adhesive layer is a pressure sensitive adhesive that holds the flexible cover layer 1904 to the battery 1902 and other underlying structures. The circuit layer 1906 includes circuits for interconnecting and delivering power from the battery 1902 through the terminals 1912, 1914 to the tape node components 1908.

Referring to FIG. 19B, the flexible cover layer 1904 can be selectively removed to expose the underlying battery 1902 and terminals 1912, 1914. This allows access to the battery for replacement, wired charging, or wireless charging, as discussed with reference to FIGS. 18A, B. For example, if the tape node 1900 is capable of wireless charging, removing the flexible cover layer 1904 may expose a wireless charging circuit (e.g., a RF receiver or an inductive charging circuit/loop) and allow for a user to align the wireless charging circuit with a wireless charger (e.g., wireless charger 1890). In the example of wired charging, removing the flexible cover layer 1904 may expose an electrical adapter (e.g., electrical adapter 1896) allowing for a connection with a wired charger (e.g., wired charger 1878) to the electrical adapter for recharging the tape node 1900. Partially or completely removing the flexible cover 1904 also enables the terminals and other components of the tape node to be cleaned or replaced, according to some embodiments. After one or more of the tape node components have been inspected, renovated, replaced, recycled, had some other modification of the components, or some combination thereof, the same flexible cover layer 1904 may be reattached over the battery 1902, the terminals 1912, 1914, and the circuit layer 1906. Alternatively, a new flexible cover layer may be used to seal the cover layer 1904 over the battery 1902, the terminals 1912, 1914, and the circuit layer 1906, in some embodiments.

The removable flexible cover layer 1904 protects the components of the tape node 1900 while it is used to track an asset, wirelessly communicate with nodes of the wireless tracking system 800, or perform other functions, but allows for the battery 1902 and other components to be renovated, replaced, recharged, inspected, and/or modified by a user.

Figure 20A:
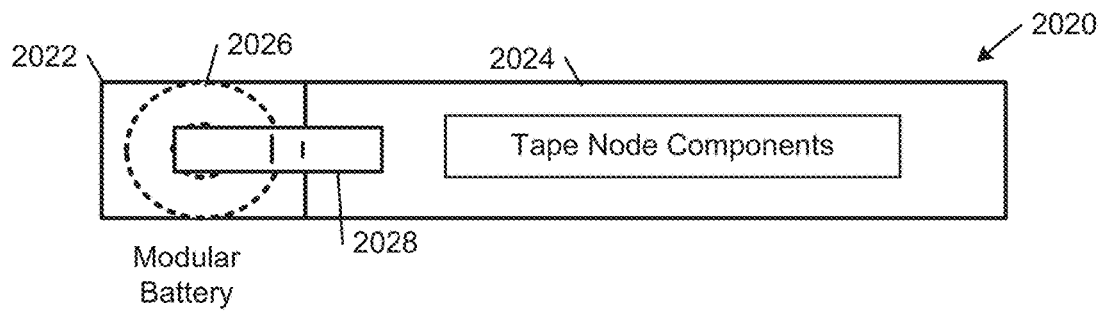
FIG. 20A is a diagrammatic side view of a modular tape node that includes a battery compartment that is electrically connected to the tape node components module, according to an embodiment.

FIG. 20A is a diagrammatic side view of a modular tape node 2020 that includes a battery module 2022 that is electrically connected to the tape node 2020 components module 2024. The modular tape node 2000 may be an embodiment of the tape nodes 113, 410, 640, 670, 680, 1760, 1778, 1800 (FIGS. 1, 4, 6A-C, 17A, B, 18A, B). The battery module 2022 includes a compartment for a battery 2026. In the illustrated embodiment, the battery module 2022 includes a pair of resilient latch mechanisms 2028 on opposite exterior sides of the modular battery compartment 2026 that each snap over a respective ridge member 2030 of a pair of ridge members (FIG. 20B) on opposite sides of the tape node components module 2024. In other embodiments, the battery module 2022 includes more than two resilient latch mechanisms 2028 and corresponding ridge members 2030 of the tape node 2020 components module 2024. For example, the battery module 2022 and the tape node components module 2024 may include four resilient latch mechanisms 2028 and four corresponding ridge members 2030, one on each of a lateral side (e.g., the side shown in FIGS. 20A and 20B), an opposite lateral side, a top side, and a bottom side of the battery module 2022 and the tape node components module 2024. The modular battery compartment 2026 includes an electrical interface that matches a corresponding electrical interface in the tape node components module 2024 so that electrical power is delivered to the tape node components when the modular battery compartment 2026 is snapped onto the tape node components module 2024.

Figure 20B:
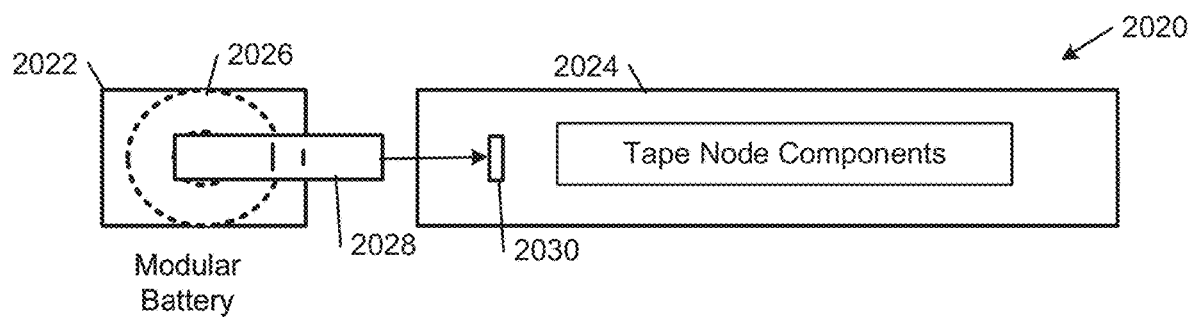
FIG. 20B shows a diagrammatic side view of the modular tape node depicted in FIG. 14A with the battery compartment detached from the tape node components module, according to an embodiment.

FIG. 20B shows a diagrammatic side view of the modular tape node 2020 depicted in FIG. 20A with the modular battery compartment 2026 detached from the tape node components module 2024. In the illustrated embodiment, the modular battery compartment 2026 may be detached from the tape node components module 2024 by pulling outwardly on one or both distal ends of the resilient latch mechanisms 2028 on opposite exterior sides of the modular battery compartment.

Figure 20C:
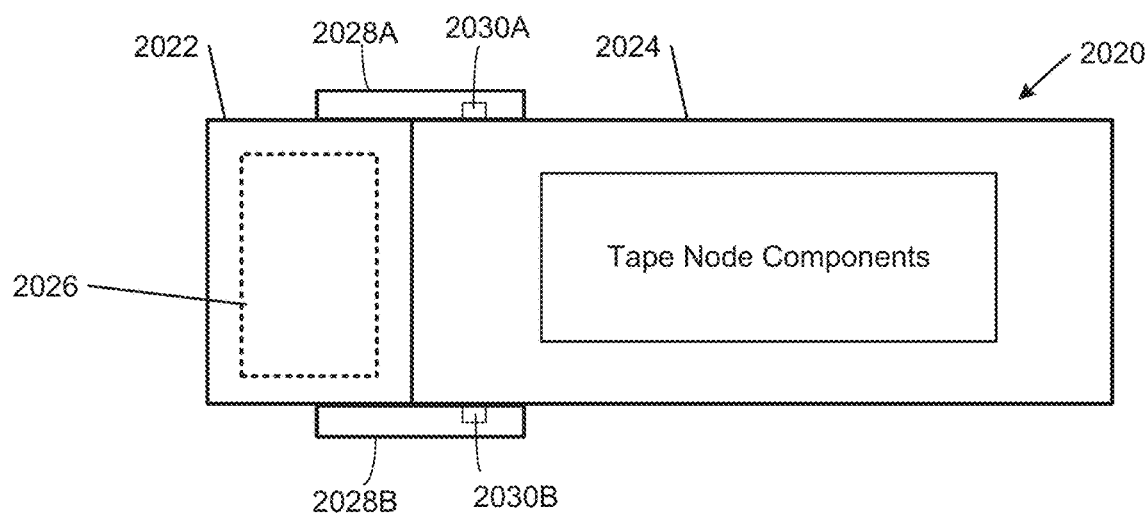
FIG. 20C shows a diagrammatic top view of the modular tape node depicted in FIG. 19A, according to an embodiment.

FIG. 20C shows a diagrammatic top view of the modular tape node 2020 depicted in FIGS. 20A-20B with the battery module 2022 attached to the tape node components module 2024 via two resilient latch mechanisms 2028A, 2028B. As discussed above, the resilient latch mechanisms 2028A, 2028B are attached or affixed to the battery module 2022 and are configured to snap over a respective ridge member 2030A, 2030B shown in FIG. 20B. When the resilient latch mechanisms 2028A, 2028B are snapped over the respective ridge members 2030A, 2030B, electrical power is delivered to the tape node component module 2024 from the battery module 2022.

In other embodiments, other methods or mechanisms may be instead or additionally used to access the battery module 2022 or other components of the tape node 2020. For example, a modular tape node 2020 may be implemented to access one or more other components of the tape node, e.g., sensors, processors, circuitry, and the like. In another example, tape nodes may be placed into a chemical bath to strip epoxy or other adhesives to separate layers of the tape node such that the one or more components being renovated or recycled may be accessed. In another example, tape nodes may be heated to weaken adhesives. In another example, tape nodes may comprise cut or tear lines that, when cut or torn as indicated, expose one or more components of the tape node to be renovated or recycled. The cut or tear lines may be hidden using mechanical or design means such that they are not prematurely or accidentally cut or torn, e.g., using flaps, folds, or colored portions of the tape node. In some embodiments, rather than recharging the battery, the tape node may have multiple alteration lines that, when interacted with (e.g., cutting, tearing, etc.), access a corresponding storage device or battery to increase the energy/power level of the tape node, e.g., before entering a next phase in a multi-phase application. For example, the alteration lines of the tape node are described in U.S. patent application Ser. No. 17/385,884, titled, "TEARING TO TURN ON WIRELESS NODE WITH MULTIPLE CUTOUTS FOR RE-USE," incorporated herein in its entirety.

Figure 21:
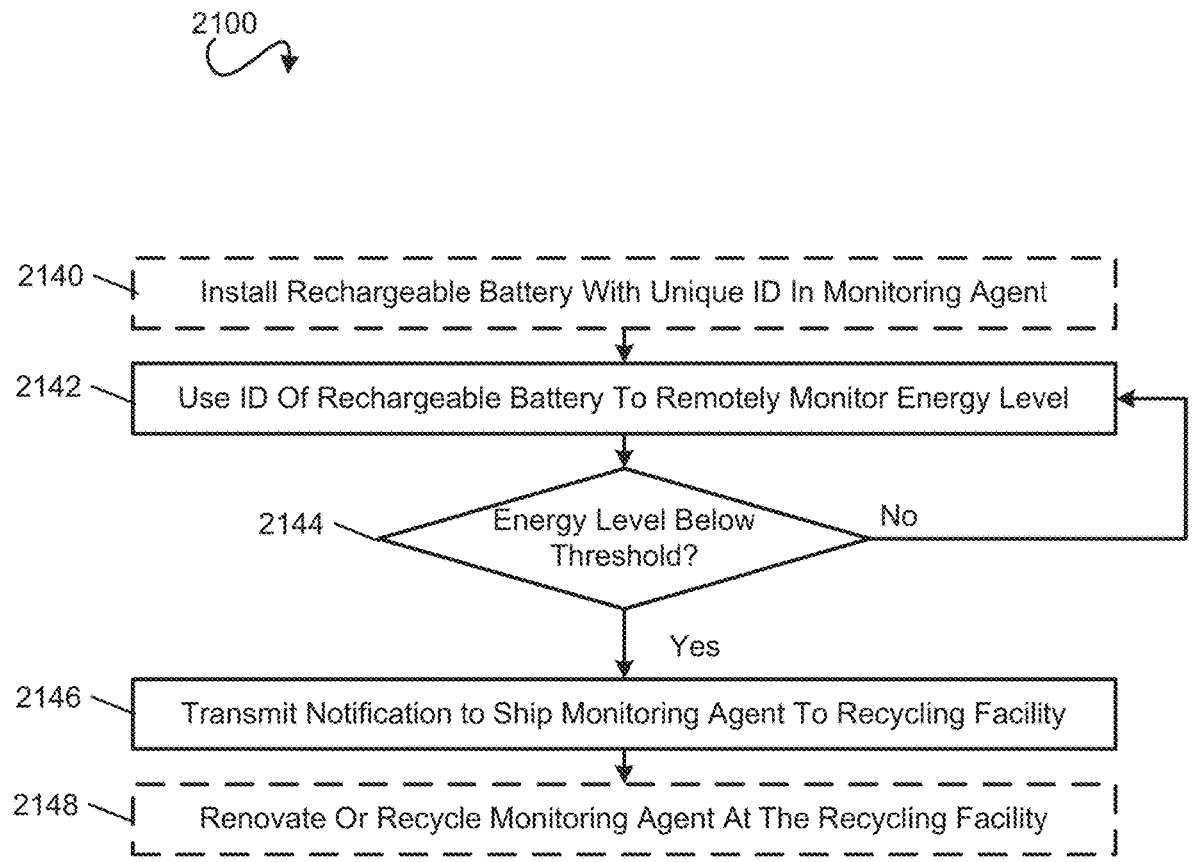
FIG. 21 is a flowchart illustrating an example method for remotely monitoring the energy level of a tape node battery and issuing an alert to ship the tape node for refurbishment or recycling when the monitored battery level is below a threshold, according to an embodiment.

FIG. 21 is a flowchart illustrating a method 2100 for remotely monitoring an energy level of a monitoring agent battery and issuing an alert to ship the monitoring agent for refurbishment or recycling when the monitored battery level is below a threshold. Method 2100 is implemented using task manager 1220, for example. In embodiments, other metrics may additionally or instead be remotely monitored and alerts (e.g., indications 1226, 1228, and/or 1230, discussed above) may be issued to ship the monitoring agent for refurbishment or recycling when the other metrics are below a threshold. For example, the metrics may include performance of a processor or sensor, e.g., based on accuracy or frequency of data collection or processing operations. The alert may be transmitted to a client device (e.g., for display within a graphical user interface) running a client application (e.g., application 822) operated by an authorized user of the tracking system 800. Method 2100 includes installing (2140) a rechargeable battery with a unique ID in a monitoring agent. The wireless tracking system 800 may store the unique ID in database 808 and associate the unique ID with an identifier 122 of the monitoring agent. As another example, the unique ID may be associated with the available agents 1238 or agent capability 1224 within memory 1206. The rechargeable battery may be an embodiment of the flexible rechargeable battery 1870 shown in FIG. 18A or the rechargeable battery 1880 shown in FIG. 18B. The rechargeable battery may, for example, comprise terminals that connect to an external power source through a wired connection, may comprise an internal radio frequency energy receiver that converts received external radio frequency energy into electrical energy, or may be a separate modular component configured to attach to and detach from one or more electrical components of the tape node.

The monitoring agent is then deployed in the field (e.g., adhered to an asset during a multi-phase application such as discussed above with respect to FIGS. 12-17) and may perform various functions. For example, the monitoring agent may be used to monitor an asset using sensed data from sensors within the monitoring agent. In further examples, the monitoring agent is attached to an asset and tracks the location of the asset during shipment (e.g., shipping 1310A-C, FIG. 13). In some examples, the monitoring agent includes sensors that gather environmental data (e.g., temperature data, vibration data, humidity data, etc.) for an asset. The monitoring agent may also communicate wirelessly with other nodes (e.g., mobile gateways 810, 812, stationary gateway 814, monitoring agents 818, 828, 832, 842-848, 860, 866, etc.) of the wireless tracking system 800. While performing the various functions, the monitoring agent may use energy stored in its battery. The monitoring agent stores in its memory and/or wirelessly communicates the current battery level of its rechargeable battery and the unique ID of its rechargeable battery to other nodes of the wireless tracking system (e.g., monitoring agent, gateway and stationary gateways, the server 804, etc.). For example, battery level is stored as agent capability data 1224 as discussed above. The monitoring agent may store and/or communicate the current battery level and the unique ID at a fixed time interval (e.g., every 3 hours), according to some embodiments. In other embodiments, the monitoring agent stores and/or communicates the current battery level and the unique ID, when the battery level falls below a threshold value. In further embodiments, there are multiple threshold values for the battery level, and the monitoring agent stores and/or communicates the current battery level and the unique ID each time the battery level falls below one of the multiple threshold values. In other embodiments, the monitoring agent stores and/or communicates the current battery level and the unique ID, in response to receiving an inquiry or communication from another node of the wireless tracking system 800. For example, the server(s) 804 may transmit to the monitoring agent a request for an update on the battery level of the monitoring agent.

Method 2100 further includes the wireless tracking system remotely monitoring (2142) the energy level of the rechargeable battery using the received battery level and unique battery identifier. Method 2100 further includes determining (2144) whether the energy level satisfies an energy level threshold, as discussed above. For example, the battery level defined in agent capability data 1224 may be compared to energy level threshold 1234 of phase requirements 1222. If the energy level is above the energy level threshold, the method 2100 continues to remotely monitor the energy level of the rechargeable battery. For example, in one embodiment of block 2142, the task manager 1220 may request updates on the battery level of the monitoring agent at a fixed frequency. In embodiments, the task manager 1220 may instruct the monitoring agent to transmit its current battery level and unique ID of its rechargeable battery to another node of the wireless tracking system at a fixed frequency. The other node (e.g., monitoring agent, tape node, mobile and/or gateway node, etc.) of the wireless tracking system 800 may relay the current battery level and unique ID to the server(s) 804 or another device such as a gateway node. In some embodiments, the other node is one of the server(s) 804 and the monitoring agent transmits it directly (e.g., via cellular communication).

However, if the energy level is at or below the energy level threshold, the task manager 1220 transmits 2146 an indication (e.g., transport indication 1230) to ship the monitoring agent to a recycling facility. The transport indication may be transmitted to a client device, running the client application 822, operated by an authorized user (e.g., via a user interface on a client device). In some embodiments, if the monitoring agent is currently performing some function (e.g., tracking an asset or implementing a phase of an itinerary) when its energy level falls below the threshold level, the client device receives a notification, e.g., from the monitoring agent itself, the server 804, or another node within the wireless tracking system 800, to replace the monitoring agent with another monitoring agent with an energy level above the threshold. In an example, the replacement may occur at the end of a shipping phase (e.g., after the shipping 1310A phase, at the storage 1315) The replacement monitoring agent then continues performing the same function in place of the monitoring agent that is shipped to the recycling facility.

In some embodiments, the wireless tracking system additionally transmits a notification to the monitoring agent. In some embodiments, the monitoring agent is configured to detect an end of an itinerary or phase thereof (as discussed above) and to determine that the monitoring agent will be shipped to a recycling facility, e.g., based on identification of a geofence associated with a destination location, based on a current battery level, based on sensor data associated with receipt by an end customer, etc. Responsive to receiving the notification or determining an end of itinerary or phase thereof, the monitoring agent enters a hibernation or recycling mode (e.g., one of the modes defined within operating status 1214) to conserve available battery levels or functionality of electronics. For example, the hibernation or recycling mode may include one or more of: reducing a frequency of outgoing communications; reducing an amount of sensor data collected, processed, or transmitted; turning off one or more long or medium-range communications capabilities; preparing the battery for recycling by completely using up remaining battery life, and the like. The hibernation or recycling mode may allow the monitoring agent to conserve the remaining energy in its battery and perform functions in support of returning the monitoring agent to a recycling facility. For example, in the hibernation or recycling mode, the monitoring agent may track its own location and transmit its current location at a lower frequency than when in use for tracking an asset.

The monitoring agent may then be shipped to a recycling facility, e.g., as described above. Method 2100 may include renovating or recycling the monitoring agent. In some embodiments, for example, the rechargeable battery is recharged wirelessly, through a wired connection, or by converting received external radio frequency energy into electrical energy (as described with reference to FIGS. 18A, 18B, 19A, 19B, 20A-C. In some embodiments, the battery is removed from the monitoring agent for refurbishment and the renovated battery is connected to electronic components of a new or refurbished monitoring agent using spot-welding or other means. In other embodiments, other types of rechargeable batteries and methods of recharging or refurbishment may be used, as described above, with respect to FIGS. 18A, B. In other embodiments, the monitoring agent is an embodiment of the tape node 2020 shown in FIGS. 20A and 20B, and the battery module 2022 is replaced at the recycling facility during the renovating or recycling step. In other embodiments, one or more other electronic components of the monitoring agent, such as sensors, processors, and the like, are renovated or recycled at the recycling facility. For example, a wireless antenna may be replaced at the recycling facility, if it is determined that the wireless antenna is malfunctioning or the wireless antenna's performance is below a threshold level (e.g., signal strength or accuracy).

In other embodiments, the method 2100 may comprise additional, fewer, or different steps, and the steps may be performed in a different order. In some embodiments, one or more of the steps may be executed by other entities of the wireless tracking system.

Figure 22:
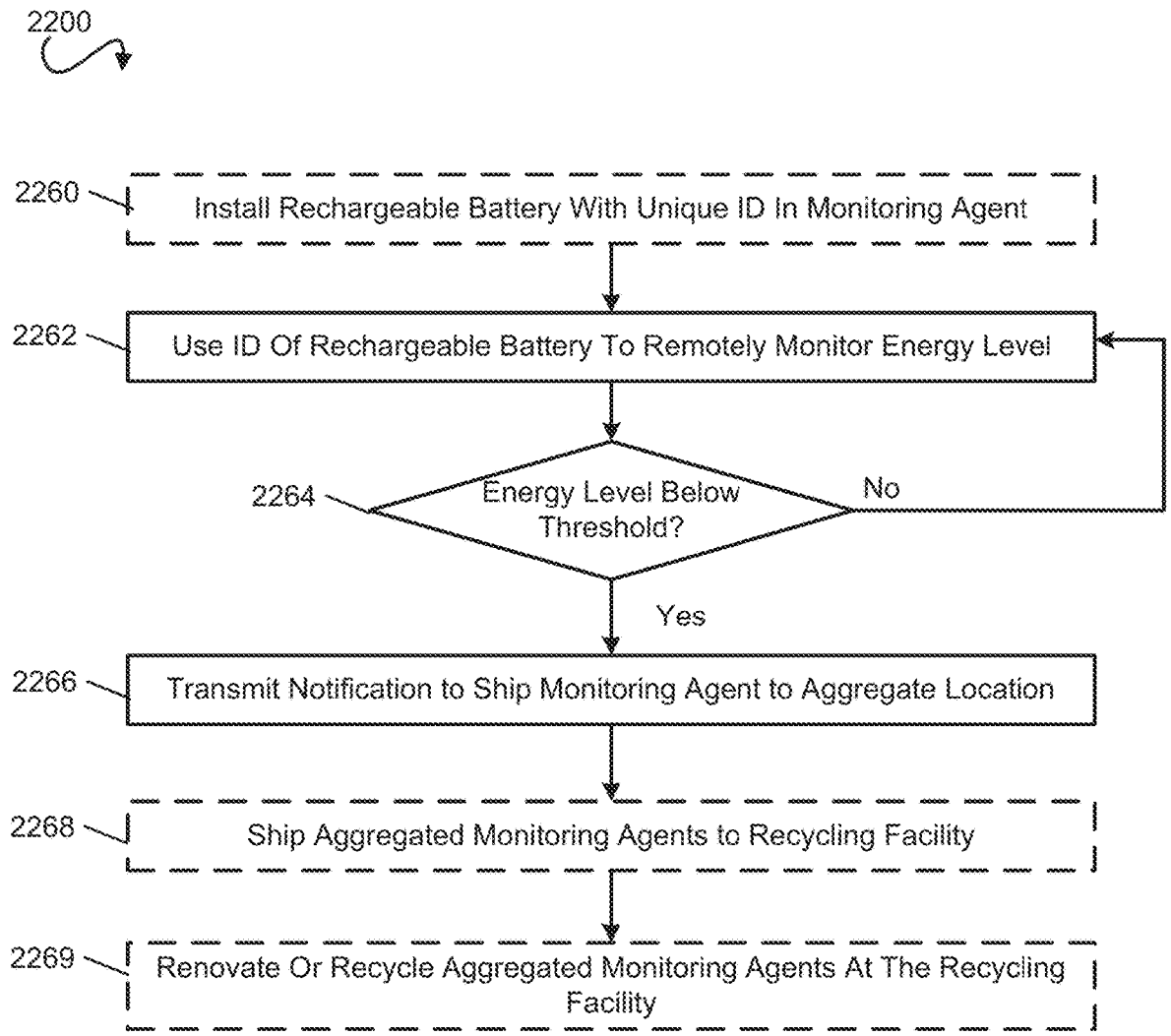
FIG. 22 is a flowchart illustrating an example method for remotely monitoring the energy level of a tape node battery and issuing an alert to ship the tape node for refurbishment or recycling when the monitored battery level is below a threshold, according to an embodiment.

FIG. 22 is a flowchart illustrating a method 2200 for remotely monitoring the energy level of a monitoring agent battery and issuing an alert to ship the monitoring agent for refurbishment or recycling when the monitored battery level is below a threshold. Method 2200 is implemented at least in part using task manager 1220, for example. In embodiments, other metrics may additionally or alternatively be remotely monitored and alerts may be issued (e.g. indications 1226, 1228, and/or 1230) to ship the monitoring agent for refurbishment or recycling when the other metrics are below a threshold. For example, the metrics may include performance of a processor or sensor, e.g., based on accuracy or frequency of data collection or processing operations. Method 2200 includes installing (2260) a rechargeable battery with a corresponding unique ID in a monitoring agent. The monitoring agent is then deployed in the field (e.g., adhered to an asset during a multi or single-phase application) and may perform various functions. For example, the monitoring agent may be used to monitor an asset using sensed data from sensors within the monitoring agent. Method 2200 further includes the wireless tracking system 800 remotely monitoring (2262) the energy level of the rechargeable battery by receiving the battery level and the unique battery identifier from the monitoring agent, as described above, with reference to block 2142, FIG. 21.

Method 2200 further includes determining (2264) whether the energy level of the monitoring agent battery satisfies a threshold. If the energy level is above a threshold energy level, the method 2200 continues (decision: "NO") to remotely monitor the energy level of the rechargeable battery. However, if the charge level is at or below the threshold energy level, method 2200 continues (decision: "YES") with the task manager 1220 transmits (2266) a recharge indication 1226 and/or transport indication 1230 including a notification to ship the monitoring agent to an aggregate location. The notification may be transmitted to a client device, running a client application (e.g., client application 822), operated by an authorized user (e.g., via a user interface on the client device). In embodiments, the monitoring agent includes the address of the aggregate location printed or otherwise displayed on the monitoring agent, such as with the tape node 2510, as discussed below.

Method 2200 may further include shipping (2268) the monitoring agent to an aggregate location. At the aggregate location, monitoring agents that have an energy level below the threshold are aggregated and prepared for shipment to a recycling facility. In this case, multiple monitoring agents with low energy levels are collected and shipped together to the recycling facility from the aggregate location, instead of being individually shipped directly to the recycling facility by users. This may improve efficiency of tracking, collecting, and shipping the monitoring agents to the recycling facility for recycling and/or refurbishment. In further embodiments, diagnostics or other processing of the monitoring agents is performed at the aggregate location. For example, the energy level of each monitoring agent may be checked to validate the charge level detected during remote monitoring. Method 2200 may further include renovating and recycling the aggregated tape nodes at the recycling facility, as discussed above with respect to FIG. 21, block 2148.

Figure 23:
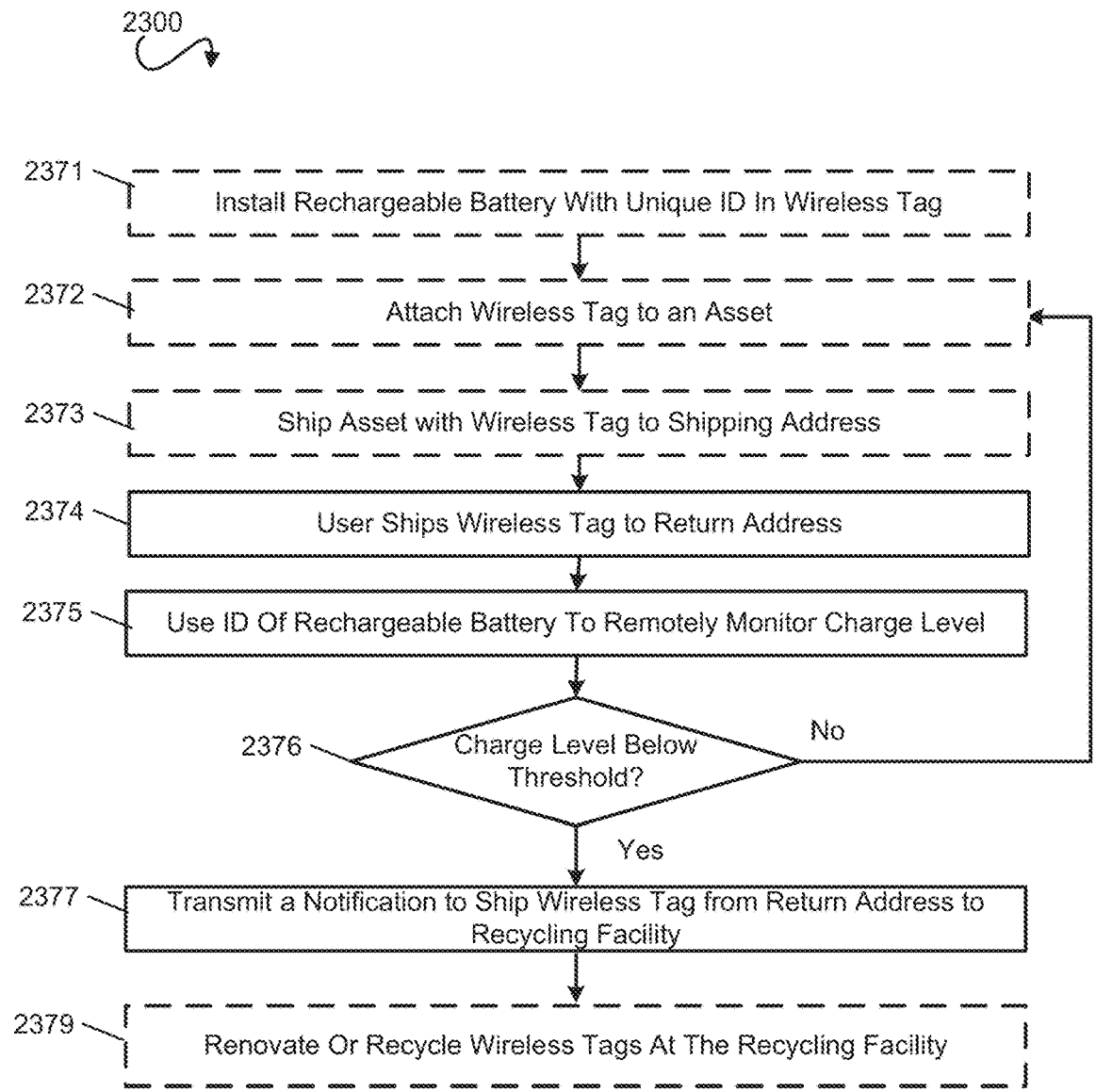
FIG. 23 is a flowchart illustrating an example method for remotely monitoring the energy level of a tape node battery and issuing an alert to ship the tape node for refurbishment or recycling when the monitored battery level is below a threshold, according to an embodiment.

FIG. 23 is a flowchart illustrating a method 2300 for remotely monitoring the energy level of a monitoring agent battery and issuing an alert to ship the monitoring agent for refurbishment or recycling when the monitored battery level is below a threshold. Method 2300 is implemented at least in part using task manager 1220, for example. Method 2300 is an alternate embodiment of method 2100. In other embodiments, other metrics may additionally or alternatively be remotely monitored and alerts (e.g. indications 1226, 1228, and/or 1230) may be issued to ship the monitoring agent for refurbishment or recycling when the other metrics are below a threshold. For example, the metrics may include performance of a processor or sensor, e.g., based on accuracy or frequency of data collection or processing operations. Method 2300 includes installing (2371) a rechargeable battery a unique ID is installed in a monitoring agent. The monitoring agent is then deployed (2372) in the field (e.g., adhered to an asset during a single or multi-phase application) and may perform various functions (e.g., as described above). In this example, the monitoring agent is used to track an asset during delivery of the asset and is attached to the asset.

Method 2300 further includes shipping (2373) the asset with the monitoring agent to a user (e.g., a customer, end-user, etc.) at a shipping address. In some embodiments, the monitoring agent includes instructions for the user, such as the instructions discussed below. The instructions may include those for shipping the tape node to a return address after the asset has been delivered to the user. Once the asset is received at the shipping address, method 2300 includes shipping (2373) the tape node to a return address. In some embodiments, the monitoring agent includes the return address printed or otherwise displayed on the tape node, such as with the tape node 2510. In some embodiments, the return address is obtained by a client device (e.g., a client device running the client application 822) scanning the identifier (e.g., identifier 122, or identifier 2426 discussed below) of the monitoring agent; the return address may appear when an authorized user accesses the client application.

After the monitoring agent has been delivered (2374) to the return address, the energy level of the rechargeable battery is remotely monitored (2375) by the wireless tracking system (as discussed above with respect to comparison of agent capability data 1224 to energy level threshold 1234) by receiving the battery level and the unique battery identifier from the monitoring agent, as described above with respect to FIG. 21. In other embodiments, the energy level and unique battery identifier are determined at the return address by a user (e.g., using a client device running a client application) a node of the wireless tracking system 800 or another electronic device communicatively coupled to the wireless tracking system 800 located at the return address. In this case, the energy level and unique battery identifier may be transmitted to another node (e.g., mobile gateway 810, 812, stationary gateway 814, tape node, server 804, etc.) of the wireless tracking system 800.

Method 2300 further includes determining (2376) whether the energy level satisfies an energy threshold. For example, block 2376 may include task manager 1220 determining if the given monitoring agent meets one or more phase requirements 1222 as discussed above. If the energy level is above the energy level threshold (decision: "NO"), the method 2300 further includes attaching the monitoring agent to a new asset to track the new asset. If the monitoring agent includes the shipping address for an asset it is currently tracking, displayed on the monitoring agent, the monitoring agent may be altered before the new asset is shipped. For example, the shipping address may be on a sticker or label that is adhered to the monitoring agent. The sticker or label may be replaced or covered with a new sticker or label that has the new shipping address for the new asset. Other modifications may be made to the monitoring agent before it is reused for the new asset, according to some embodiments.

If the energy level is at or below the energy level threshold, the method 2300 includes the wireless tracking system transmitting (2377) an indication (e.g., transport indication 1230) notification to ship the monitoring agent to a recycling facility. The notification may be transmitted to a client device, via the client application, operated by an authorized user (e.g., via a user interface on a client device) at the return address. The notification may be transmitted to a node (e.g., another monitoring agent, mobile or stationary gateway, server, etc.) of the wireless tracking system. The monitoring agent may be shipped with a plurality of monitoring agents that need refurbishment or recycling, as described above with respect to FIG. 22. Method 2300 further includes renovating or recycling the monitoring agent (e.g., transport indication 1230) at the recycling facility, as described above with respect to FIG. 21, block 2148.

Figure 24A:
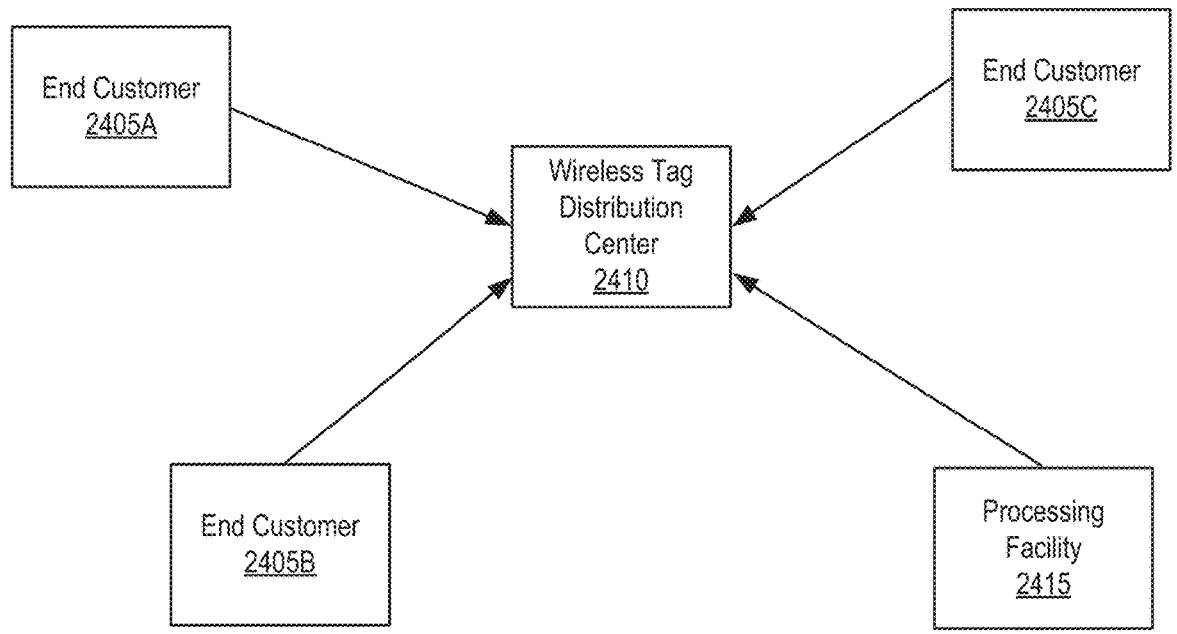
FIGS. 24A-C are block diagrams of aggregation points for renovating or recycling tape nodes, according to an embodiment.
Figure 24B:
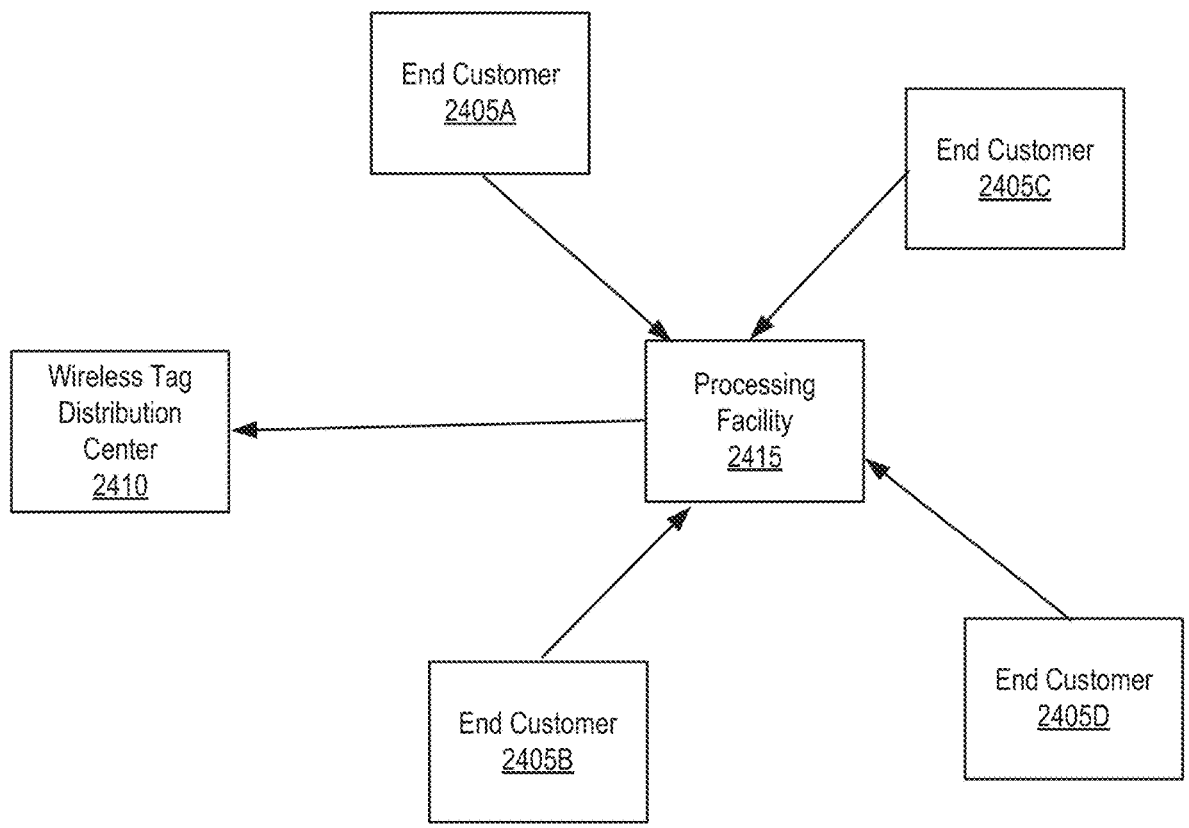
Figure 24C:
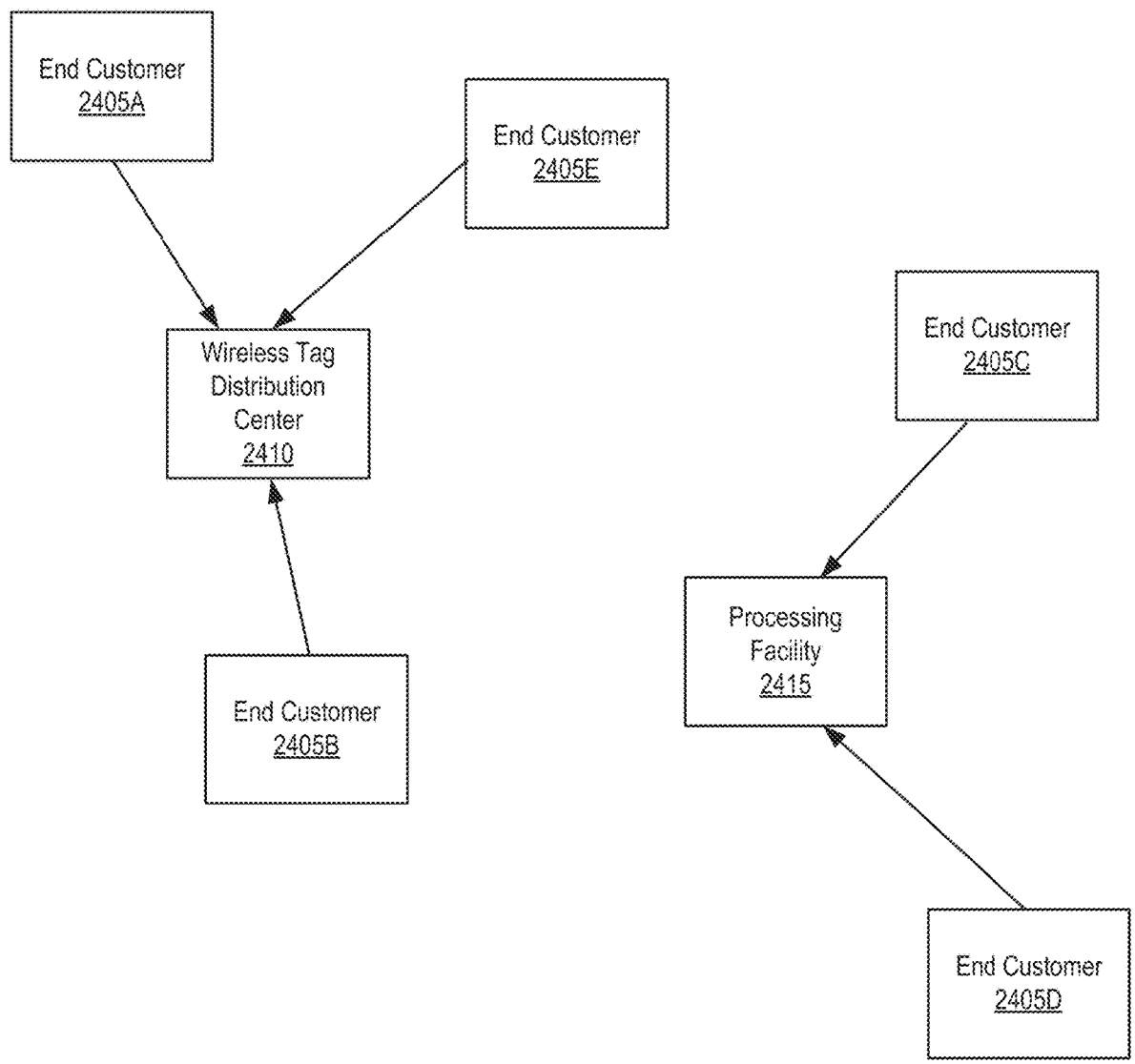

FIGS. 24A-24C are block diagrams of aggregation points, including a distribution center and a processing facility, for renovating or recycling monitoring agents. End customers 2405A-C, processing facilities 2415, and tape node distribution facilities 2410 are locations associated with one or more stages or phases of asset movement in a single or multi-phase transport. For example, the monitoring agents distribution center 2410 (e.g., a manufacturing plant or storage facility) is an origin location for a plurality of monitoring agents and/or for a plurality of assets. Processing facilities 2415 may be, for example, an intermediate transport or delivery service, e.g., UPS or USPS, and end customers 2405A-C are one or more destination locations of assets. In some embodiments, monitoring agent distribution centers 2410 or processing facilities 2415 may have means for renovating or recycling monitoring agents. In other environments, there may be more, different, or fewer end customers 2405, processing facilities 2415, and tape node distribution centers 2410 than shown in FIGS. 24A-C.

In the embodiment of FIG. 24A, one or more end customers 2405A, 2405B, 2405C and a processing facility 2415 release respective monitoring agents to be shipped to the monitoring agent distribution center 2410. In some embodiments, the one or more end customers 2405A, 2405B, 2405C receive an asset including a monitoring agent, remove the monitoring agent from the asset, and release the monitoring agent to be shipped to the monitoring agent distribution center 2310 to be renovated or recycled. In some embodiments, the processing facility 2415 removes one or more monitoring agents from respective assets and releases the one or more monitoring agents to be shipped to the monitoring agent distribution center 2410 to be renovated or recycled. For example, the processing facility 2415 may remove tape nodes from respective assets immediately prior to loading the assets for delivery to end customers 2405, enabling the processing facility to aggregate and release large numbers of tape nodes to monitoring agent distribution center 2410.

In the embodiment of FIG. 24B, one or more end customers 2405A, 2405B, 2405C, 2405D release respective monitoring agents to be shipped to a processing facility 2415. The processing facility aggregates the received monitoring agents. In some embodiments, the processing facility 2415 additionally aggregates one or more monitoring agents associated with other assets (e.g., removed from assets by the processing facility prior to shipping assets to end customers 2405). The processing facility 2415 then releases the aggregated monitoring agents to be shipped to the monitoring agent distribution center 2410 to be renovated or recycled.

In the embodiment of FIG. 24C, a processing facility 2415 has a means for renovating or recycling monitoring agents. A first set of end customers 2405A, 2405B, 2405E remove respective monitoring agents from assets and release the respective monitoring agents to a monitoring agent distribution center 2410 to be renovated or recycled. A second set of end customers 2405C, 2405D remove respective monitoring agents from assets and release the respective monitoring agents to the processing facility 2415 to be renovated or recycled. In some embodiments, the first and second sets of end customers 2405 are determined based at least in part on one or more of: relative locations of end customers to the monitoring agent distribution center 2410 and processing facility 2415; throughput of refurbishment or recycling of the monitoring agent distribution center 2410 and processing facility 2415; shipping costs of monitoring agents to the monitoring agent distribution center 2410 and the processing facility 2415; aggregation of sets of monitoring agents at the monitoring agent distribution center 2410 and the processing facility 2415; methods for refurbishment or recycling available at the monitoring agent distribution center 2410 and the processing facility 2415; and a number or type of asset in need of monitoring agents or monitoring agent components at the monitoring agent distribution center 2410 and the processing facility 2415. In other embodiments, other factors may be used to determine the sets of end customers 2405.

Dynamic Mailing Address for Recycling Wireless Device

Figure 25A:
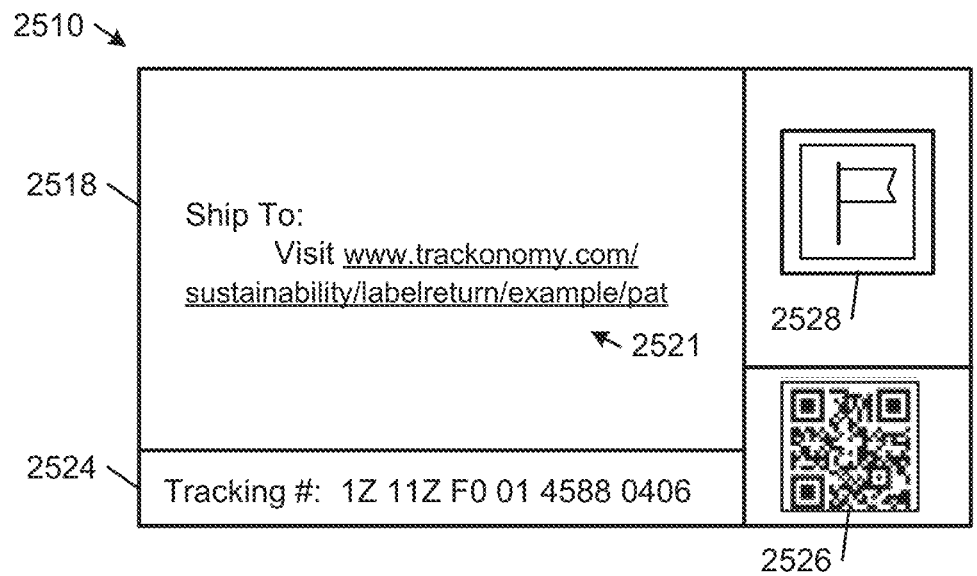
FIGS. 25A-B are schematic diagrams of an embodiment of a tape node with a shipping address, according to embodiments.
Figure 25B:
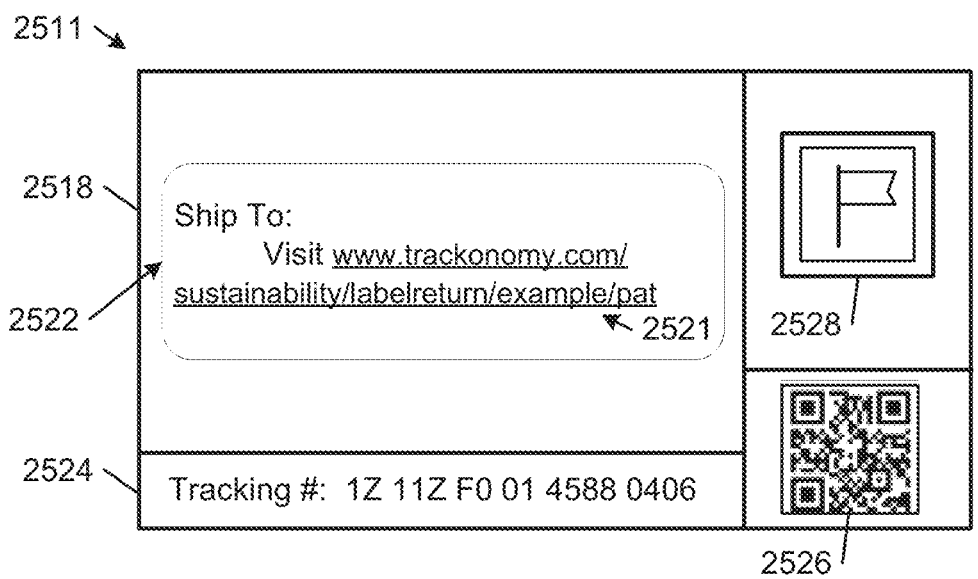

FIGS. 25A, B are schematic diagrams of an embodiment of a tape node (e.g., tape nodes 818, 828, 832, 842-848, 860, 866, etc.) with shipping instructions in the form of a digital representation (e.g., a URL and/or a QR code), according to embodiments. In FIG. 25A, a recycling instruction URL 2521 is printed (e.g., by a printer communicatively coupled to the wireless tracking device, such as a client device) on the tape node 2510 within section 2518. In FIG. 25B, the recycling instruction URL 2521 is printed on a label 2522 that is attached to the tape node 2511 within section 2518. A two-dimensional bar code 2526, e.g., a QR code, encoding the recycling instruction URL 2522 is printed on the tape nodes 2510, 2511. In some embodiments, the two-dimensional bar code 2526 is printed on the label 2522. Further, the tape nodes 2510, 2511 include a tracking number 2524 for tracking the tape nodes in-transit and (optionally) a postage stamp 2528, which may be included a shipping label that is applied or printed (e.g., the label 2522). In embodiments, a user may utilize the URL 2521 or the two-dimensional bar code 2526 to identify a shipping address (e.g., online, etc.) and manually add (e.g., with a pen, printer, etc.) the address directly to the tape node 2510, 2511. Alternatively, the shipping label 2522 (e.g., or a sticker) with a shipping address is printed by the user and applied to the tape node 2510, 2511.

Figure 25C:
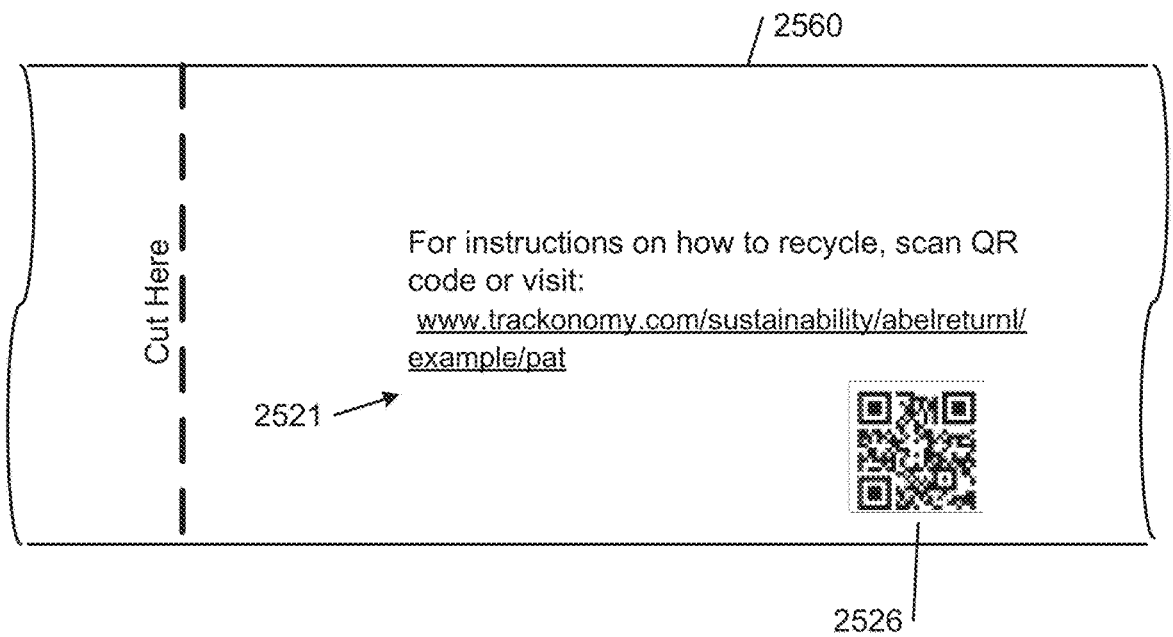
FIGS. 25C-D are schematic diagrams of an embodiment of a tape node with a shipping address, according to some embodiments.
Figure 25D:
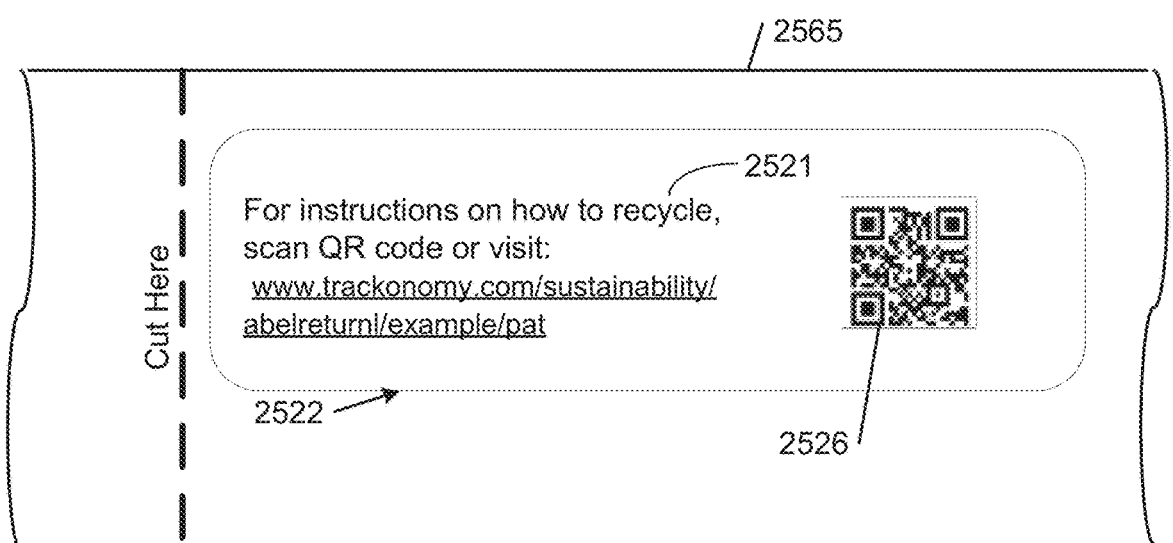

FIGS. 25C, D are schematic diagrams of an embodiment of a tape node, with shipping instructions adhered, in the form of a digital representation (e.g., a URL or QR code), according to embodiments. In FIG. 25C, the tape node 2560 includes the recycling instructions 2521 printed on a surface of the tape node 2560. In FIG. 25D, rather than the instructions being printed directly on the tape node 2565, a label 2522, with the recycling instructions 2521, is attached to a surface of the tape node 2565. The tape nodes 2560, 2565 are each an embodiment of the adhesive tape platform 112 or segment 113 thereof, with reference to FIG. 1.

In some embodiments, the recycling instruction URL 2521 may be printed on any tape node that is configured to be returned to a mailing address for collection and/or recycling. In some embodiments, the label 2522 may be attached to any tape node that is configured to be returned to a mailing address for collection and/or recycling. In embodiments, the tape nodes 2560, 2565 may include a QR code 2526 (or other identifier such as an RFID chip) scannable by a client device (e.g., a smart phone, tablet, such as the mobile gateway 810 running a mobile application). The client device may identify a mailing address for collection and/or recycling by referencing a database (e.g., database 808), and send the address to a nearby printer to print, or print itself, the label 2522. In embodiments, the tape node 2560 may be accepted to a printer, that received the shipping address from the client device, and print the shipping address directly on the tape node 2560.

In embodiments, the techniques herein described with reference to FIGS. 25A-D may be applied to other entities of the wireless tracking system 800 (e.g., mobile and/or stationary gateways 810, 812, 814) for shipping to a facility (e.g., for refurbishment, etc.). For example, the labels 2522, along with shipping URL 2521 or a two-dimensional barcode 2526, may be applied to mobile and/or stationary gateways 810, 812, 814. In embodiments, an engraving (e.g., etching, etc.), printing, or other instance of a URL address 2521, two-dimensional barcode 2526, etc. may be applied to the mobile and/or stationary gateway 810, 812, 814. In embodiments, the URL address 2521, two-dimensional barcode 2526, etc. may be molded within the housing of the mobile and/or stationary gateways 810, 812, 814, etc. The URL address 2521, two-dimensional barcode 2526, etc. may be inputted to a browser, or captured by a camera of a client device, to obtain the shipping address of the, e.g., nearest facility.

FIG. 26A, B are best viewed together. FIGS. 26A, B are examples of a view of the web page 2601 viewed on a browser 2602 of a client device (e.g., a mobile gateway 810 running a client application 822) before and after a server has retrieved an address of a nearest shipping address (e.g., for shipping a tape node to a recycling or refurbishing facility). FIG. 26A is an example view of a web page 2601 loading before illustrating instructions for recycling a tape node and FIG. 26B is an example view after the web page 2601 has loaded the address. The web page 2601 includes instructions and graphics 2610 for recycling the tape node (e.g., tape nodes 818, 828, 832, 842-848, 860, 866, etc.). The instructions 2610 may be for shipping tape nodes to a recycling center or distribution center, as discussed in each of FIGS. 21-25. The example webpage 2601 illustrated in FIG. 26, may be generated, within a client application (e.g., the client application), upon the client device scanning an identifier (e.g., the identifier 122) of the tape node. For example, the example webpage 2601 may be generated upon a client device scanning the QR code 2526 of the tape node or upon inputting the URL 2521 to the client application. A statement 2603 (i.e., "Finding your nearest return point.") notifying a user that the address of a nearest shipping center is loading, along with a dynamic loading symbol 2605, in the form of a recycling symbol, within a dynamic mailing address field.

A server of the wireless tracking system (e.g., server 804) references a database that includes a list or table with locations of shipping centers within a proximity of the user. For example, the server may determine the location of the user, as described above, e.g., by determining an IP address of the client device, by the user inputting their address, receiving location data of the client device, etc. For example, the dynamically loaded address 2625 is served by a server and displayed in the dynamic mailing address field 2620, based on a determined location (e.g., automatically by the client device or application, or manually by the user). The dynamically loaded address 2625 may be determined based on an IP address of the client device used to view the web page 2601. The location of the client device may be determined based on other information received from the client device, according to some embodiments. For example, the user may opt to share the client device location with the web page 2601, and the client device may share location data with the web page. Upon the server retrieving the address, the dynamic mailing address field 2620 is populated with an address of a recycling facility or distribution center 2625. In embodiments, the list or table of shipping centers within proximity to the user may be based on a last-known location of the monitoring agent prior to generation of transport indication 1230. Thus, transport indication 1230 may be transmitted to a server (e.g., server 804) which may, prior to scanning by the client device, automatically associate the given monitoring agent with a nearest recycling/refurbishment/recharging/or destruction location.

The dynamically loaded address 2625 may be a return address for a recycling or collection facility that is in proximity (e.g., relative to other recycling or collection facilities) to the determined user location, according to some embodiments. The server hosting the web page 2601 retrieves the dynamically loaded address 2625 from a database and serves the dynamically loaded address 2625 to the dynamic mailing address field 2620. In other embodiments, the return address may be a different address retrieved from a database, based on the determined location of the user.

In embodiments, if the IP address of client device is associated with a location on the North American west coast, then a North American west coast return address may appear within the dynamic mailing address field 2620. Alternatively, if IP address of the client device is associated with a location on the North American east coast, a North American east coast PO Box address may appear within the dynamic mailing address field 2620. If the IP address of the client device is associated with a location in Europe, a European return address may appear within the dynamic mailing address field 2620.

The embodiments may be performed within a shipping facility. For example, a shipping facility employee may have a client device (e.g., a mobile gateway 810 running a client application 822), such as a smart phone or tablet. A shipping label that includes the mailing address 2625 may be generated by the employee using the client device or a printer communicatively coupled with the client device or another node of the wireless tracking system. In embodiments, the shipping company can mail the generated shipping label to a customer.

In embodiments, the shipping label may be generated within a home of the customer. For example, the customer can print the shipping label on a printer at home (e.g., the contents within the webpage 2601 of FIG. 26B. In embodiments, the customer may have the shipping label emailed to them or have the shipping label delivered to a smart phone or PC application (e.g., the client application). Further, a shipping label that includes the contents of the webpage 2601 may be printed on-the-spot, e.g., with a portable printer, or at a delivery outpost (e.g., UPS store, etc.) or at a kiosk which prints shipping labels. In embodiments, when the client device, connected to a label printer, scans an identifier of the tape node (e.g., identifier 122, such as a barcode, QR code, RFID, etc.), the client device may be programmed to automatically transmit instructions to the printer to print a shipping label.

Figure 27:
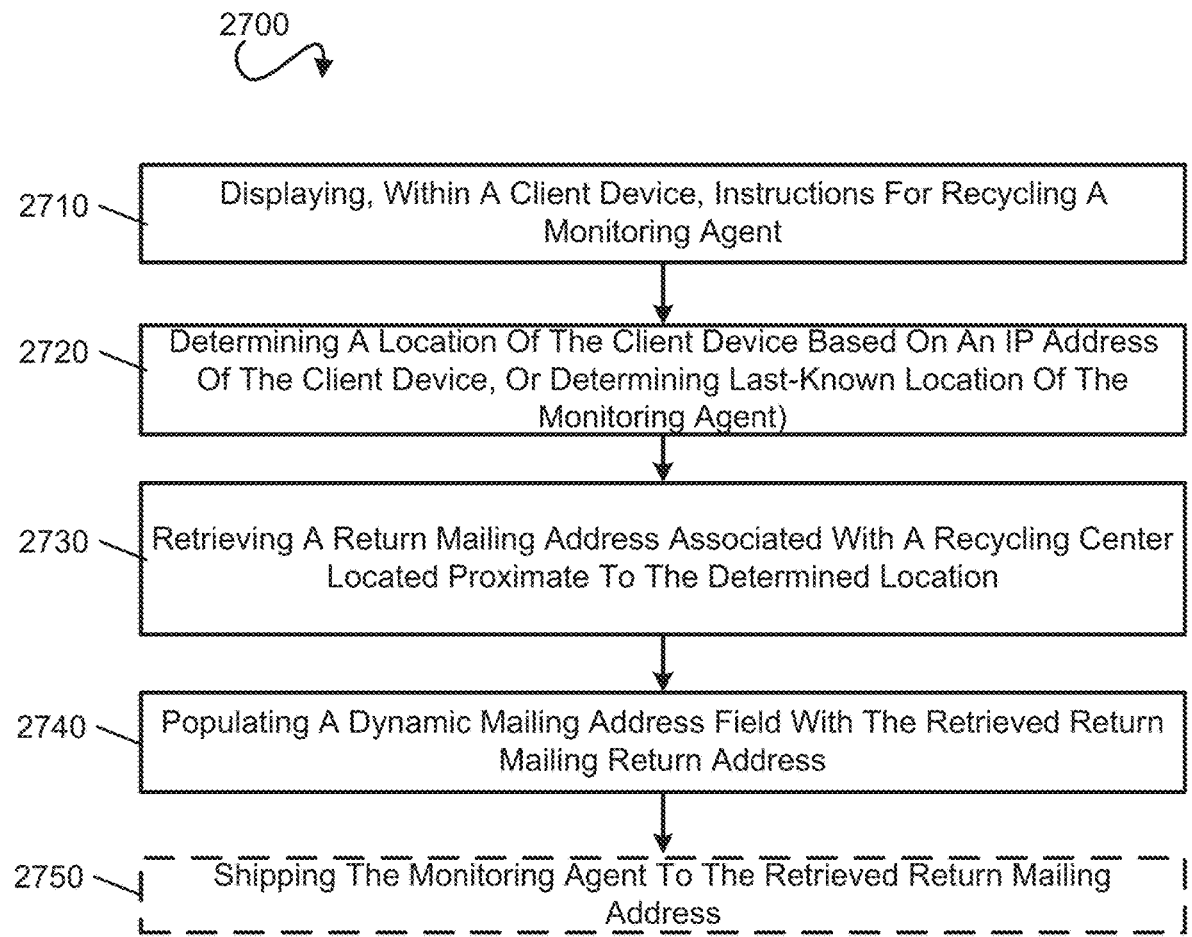
FIG. 27 is a flowchart illustrating a method for recycling a tape node, according to some embodiments.

FIG. 27 is a flowchart illustrating a method 2700 for recycling a tape node, according to embodiments. Method 2700 includes displaying, within a client device (e.g., a mobile gateway 810 running a client application 822), instructions (e.g., instructions 2610, FIG. 26) for recycling a monitoring agent (e.g., tape nodes 818, 828, 832, 842-848, 860, 866, etc.). In one example of block 2710, the instructions are displayed within a website (e.g., website 2601), generated by a browser (e.g., webpage browser 2602), loaded in response to the client device scanning (e.g., by a camera of the client device using image recognition) an identifier (e.g., identifier 122) of the monitoring agent.

Method 2700 further includes determining (2720) a location of the client device. In one example of block 2720, the location of the client device is determined by an IP address of the client device. In one example of block 2720, a server (e.g., server 804) and/or the client device determines the location of the client device. In an embodiment of block 2720, instead of a location of the client device, the last-known location of the monitoring agent prior to generation of transport indication 1230 may be used. Thus, transport indication 1230 may be transmitted to a server (e.g., server 804) which may, prior to scanning by the client device, automatically associate the given monitoring agent with a nearest recycling/refurbishment/recharging/or destruction location.

Method 2700 further includes retrieving (2730) a return mailing address associated with a recycling center that is located proximate to the determined location of the client device (or last-known location of the monitoring agent). In one example of block 2730, the server or client device (e.g., the location of each recycling center is stored locally in memory of the client device) retrieves the location from memory or using a web-based map platform. In the example of the server retrieving the return mailing address, the server transmits the address to the client device.

Method 2700 further incudes populating (2740) a dynamic mailing address field (e.g., the dynamic mailing address field 2620) with the retrieved return mailing address. In one example of block 2740, the dynamic mailing address field is within website 2601. In one example of 2740, the server or the client device populates the retrieved return mailing address to the dynamic mailing address field. Method 2700 further includes shipping (2750) the monitoring agent to the retrieved return mailing address. In one example of block 2750, the monitoring agent is automatically (e.g., by the wireless tracking system) or manually (e.g., by an authorized user operating the client device) shipped to the retrieved return mailing address.

Figure 28:
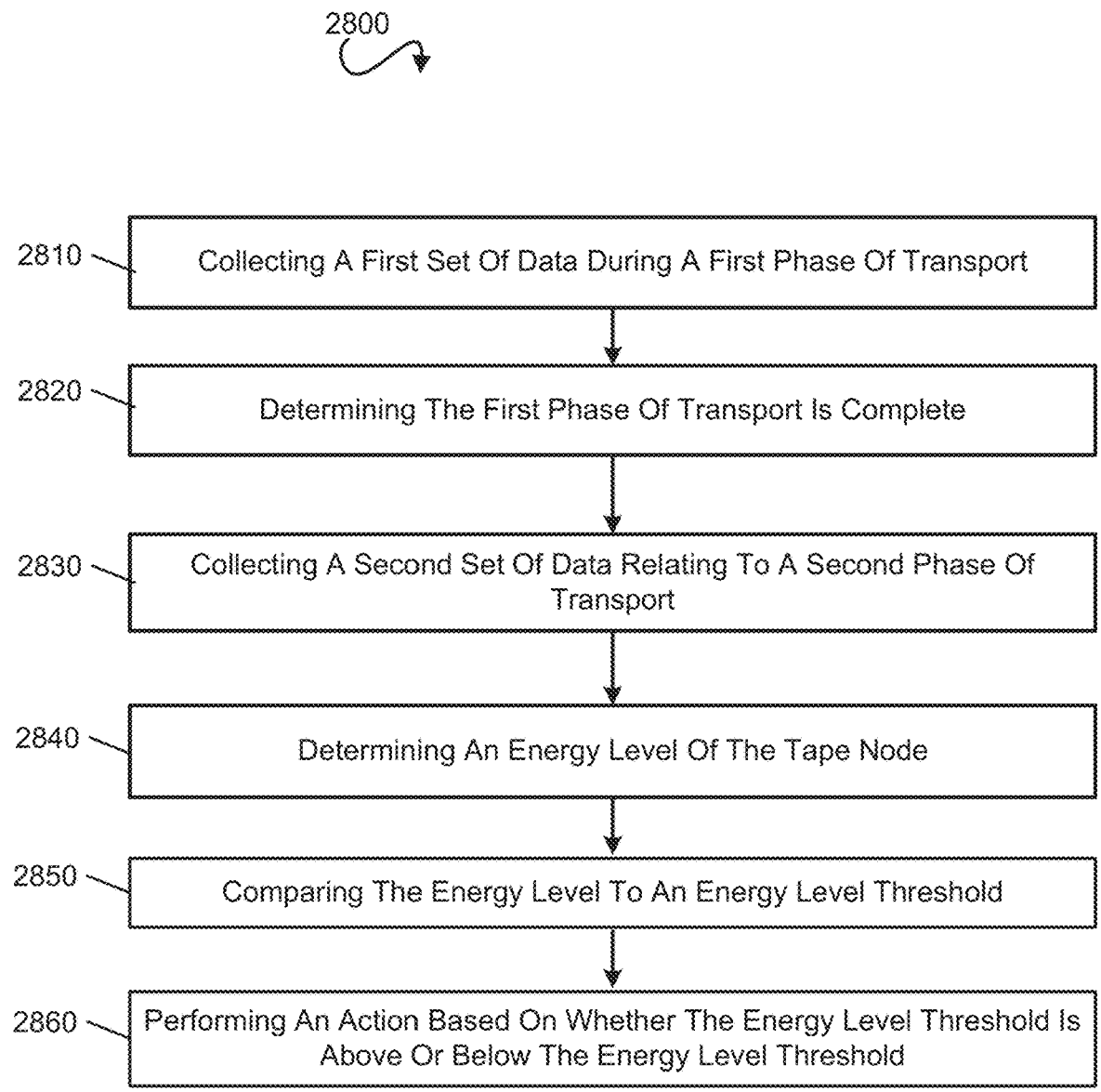
FIG. 28 is a flowchart illustrating a method for performing an action based on an energy level of a tape node in comparison to an energy level threshold, according to embodiments.

FIG. 28 is a flowchart illustrating a method 2800 for performing an action relating to a monitoring agent based on whether an energy level of the tape node is below or above a threshold. Method 2800 is implemented by a processor executing instructions (e.g., stored locally on a client device, tape node, gateway, etc. or remotely in a database or server) to perform each of the steps. In an embodiment, method 2800 is performed using, at least in part, multi-phase Each step may be performed by one or more entities. For example, a monitoring agent may perform all steps, or a monitoring agent and a gateway node may perform all steps. Method 2800 includes collecting (2810) a first set of data during a first phase of a planned itinerary. In one example of block 2810, the first set of data is received (either captured and stored, or received from) by a monitoring agent (e.g., tape nodes 818, 828, 832, 842-848, 860, 866, etc.) of the wireless tracking system (e.g., the wireless tracking system 800) during a first phase 1212(1) and stored in memory 1206 as at least a component of agent phase data 1208. In one example of block 2810, the first phase of transport is a phase 1212 of transport of a multi-phase itinerary 1210 (e.g., the shipping phase 1210A-C, storage 1215, etc., FIG. 12). In one example of block 2810, the first set of data includes location data (e.g., GPS data collected by the tape node with a tracking sensor) of the monitoring agent, sensor data (e.g., humidity data, acceleration data, light data, vibration data, temperature data, etc.), data received from a server of the wireless tracking system (e.g., server 804).

Method 2800 further includes determining (2820) the first phase of transport is complete. In one example of block 2820, the multi-phase monitoring module 1200 compares the agent phase data 1208 to one or more phases 1212 in itinerary 1210. As an example, a tape node implementing multi-phase monitoring module 1200 may determine the first phase of transport is complete by determining the tape node has traversed a geofence perimeter (e.g., surrounding a facility). In one example of block 2820, the tape node implementing multi-phase monitoring module 1200 may determine the first phase of transport is complete upon establishing a connection with a node (e.g., a mobile gateway 810, 812, stationary gateway 814, client device running a client application 822, etc.) of the wireless tracking system at a location defined by one or more phases 1212 in itinerary 1210. In one example of block 2820, the multi-phase monitoring module 1200 may receive a notification from a server that the tape node has completed the first phase of an itinerary. In one example of block 2820, multi-phase monitoring module 1200 determines the first phase of transport is complete upon analyzing collected data (e.g., by determining one or more of vibration data, acceleration data, temperature data satisfy a threshold). For example, the temperature data raising (e.g., from removing a perishable item from a refrigerator), the multi-phase monitoring module 1200 may determine the first phase of itinerary is complete.

In one example of block 2820, multi-phase monitoring module 1200 activates a hibernation mode 1216 upon determining the first phase of itinerary 1210 is complete. The hibernation mode 1216 may include deactivating some or all functionality of the monitoring agent (e.g., deactivating or decreasing the frequency of collecting data for at least one sensor of the monitoring agent; wireless communication system; receiving data from only a specific frequency; deactivating a higher-power wireless-communication interface or transitioning from a higher-power wireless-communication interface to a lower-power wireless communication interface; etc., as discussed with reference to block 1415, FIG. 14).

Method 2800 further includes collecting (2830) a second set of data relating to a second phase of transport. In one example of block 2830, the second set of data includes information about a next or future phase as defined within a multi-phase application itinerary (e.g., phase requirements 1222 associated with one or more of phases 1212 within itinerary 1210), which includes such information as sensor requirements (e.g., for a second phase of transport, communication system requirements (e.g., low, medium, or high-power wireless communication interfaces, FIG. 6A-C), energy level required to complete at least the second phase of transport (e.g., remaining battery power of the tape node) based on frequency of data collection, transmission, reception (e.g., the transmission/reception to/from other tape node, mobile gateways, stationary gateways, server, database 808, and/or other entities of the wireless tracking system), and historical data (e.g., the historical data, as discussed with reference to at least FIG. 17), map data of the multi-phase transport (e.g., destinations of each of the phases of the multi-phase transport, the determines routes, speed during route, etc.), etc. In one example of 2830, the second set of data is collected by a monitoring agent or other node of the wireless tracking system (e.g., mobile gateway, stationary gateway, and/or client device), while the monitoring agent is in a hibernation mode, and then transmitted (e.g., at a specific frequency) to the monitoring agent.

Method 2800 further includes determining (2840) an energy level of the monitoring agent. In one example of block 2840, the monitoring module 1200 receives agent capability data 1224 including energy level associated with a battery of the monitoring agent. In one example of block 2840, another monitoring agent, a gateway, or a client device determines the energy level by receiving and analyzing the agent phase data 1208. Method 2800 further includes comparing (2850) the energy level to an energy level threshold. In one example of block 2840, agent capability 1224 is compared to energy level threshold 1234. In one example of block 2840, the energy level threshold 1234 is determined by a machine learning model 1236 trained on historical data 1240, as discussed with reference to FIGS. 12 and 17. In one example of block 2840, the monitoring agent or another node of the wireless tracking system (e.g., mobile gateway, stationary gateway, client device, server, etc.) external to the monitoring agent compares the energy level defined in agent capability 1224 to the energy level threshold 1234.

Method 2800 further includes performing (2860) an action based on whether the energy level is above or below the energy level threshold. In one example of block 2860, the action performed is based on the energy level being above the energy level threshold, and the monitoring agent is applied to an asset (e.g., the same asset as the first phase of transport or another asset) to begin the second phase of the multi-phase itinerary 1210. In one example of 2860, the action performed is based on the energy level being below the energy level threshold and includes generating one or more of recharge indication 1226, refurbish indication 1228, and transport indication 1230. In one example of 2860, the action performed is based on the energy level being below the energy level threshold and includes recycling or refurbishing the tape node (e.g., shipping the tape node to a recycling center, as discussed with reference to FIG. 21-27), or recharging or replacing the battery of the tape node (e.g., as discussed with reference to FIG. 21-27). In one example of block 2860, the action performed is based on the energy level being below the energy level threshold and includes transmitting a notification to a client device that includes instructions, such as a mailing address of a recycling or refurbishment facility.

Figure 29:
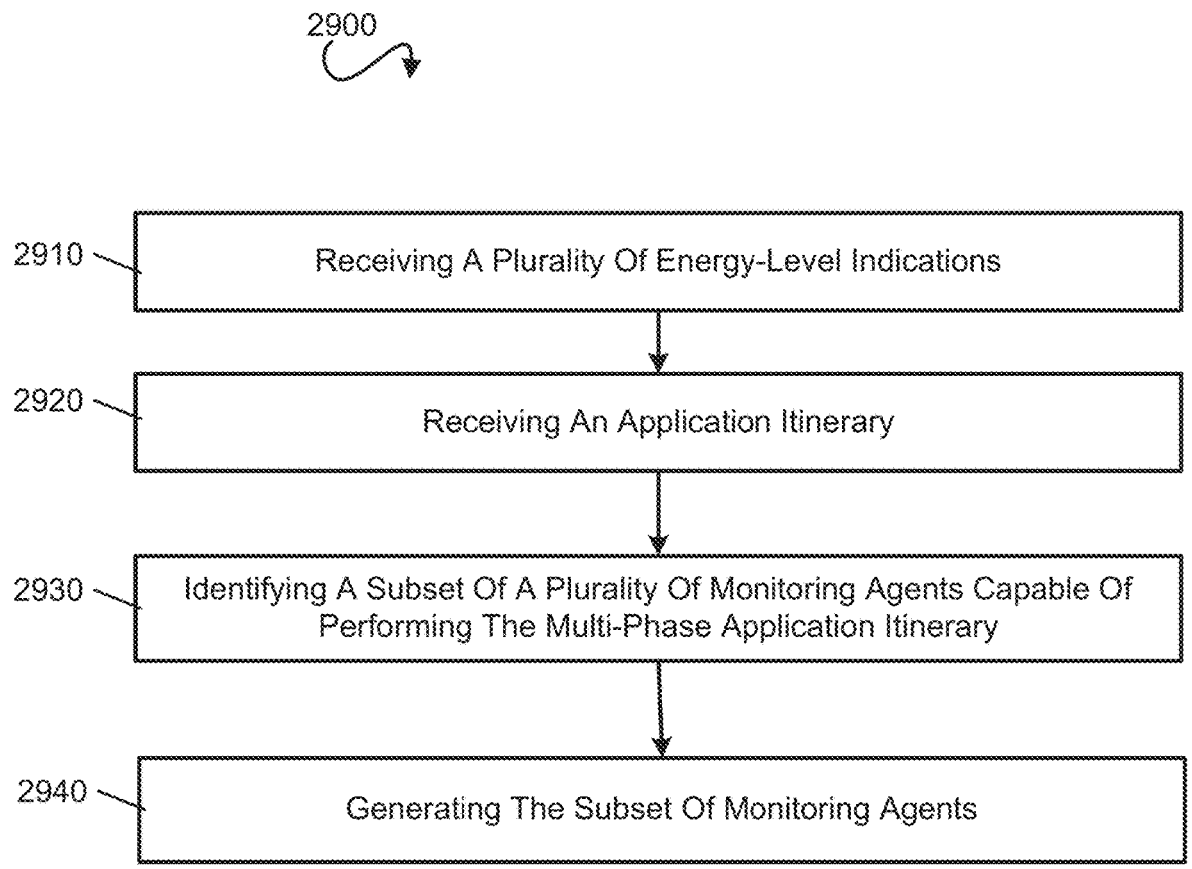
FIG. 29 is a flowchart illustrating a method for identifying a subset of tape nodes based on battery-level indications and a multi-phase application itinerary, according to embodiments.

FIG. 29 is a flowchart illustrating a method 2900 for a generating a subset of monitoring agents from a plurality of monitoring agents for use in an itinerary. Method 2900 may be implemented using task manager 1220 and includes generation of the itinerary assignment 1232, for example. Method 2900 may be implemented by a tape distribution device 872 (e.g., a smart vending machine), as discussed below with respect to FIG. 30. The itinerary associated with method 2900 may be a multi-phase itinerary, or a single-phase itinerary. Method 2900 includes receiving (2910) a plurality of energy-level indications. In one example of block 2910, each of the plurality of energy-level indications define an energy-life of a respective monitoring agent of a plurality of monitoring agents (e.g., tape nodes 818, 828, 832, 842-848, 860, 866, etc.). In one example of block 2910, task manager 1220 receives the plurality of energy-level indications as components of agent capability 1224. In one example of block 2910, the plurality of monitoring agents are located within a proximity of the device implementing task manager 1220 (for example, within the same facility as the device, within a threshold range (e.g., 20-50 feet (or more or less), etc. In one example of block 2910, the plurality of tape nodes are organized (e.g., by battery level; sensor capabilities, type, and quantity; wireless-communication interface capabilities; etc.).

Method 2900 includes receiving (2920) an application itinerary. In one example of block 2920, the task manager 1220 receives the itinerary 1210. In one example of block 2920, the application itinerary is a single-phase application itinerary and is defined by a phase requirement 1222. In one example of block 2920, the application itinerary is a multi-phase application itinerary includes phase requirements 1222 for each phase 1212 within the itinerary 1210. Phase requirements 1222 may include such information as sensor requirements (e.g., for each phase 1212 of the itinerary 1210, communication system requirements (e.g., low, medium, or high-power wireless communication interfaces, FIG. 6A-C), energy level required to complete each phase 1212 of the itinerary 1210 (e.g., remaining battery power of the monitoring agent) based on frequency of data collection, transmission, reception (e.g., the transmission/reception to/from other monitoring agent, mobile gateways, stationary gateways, server, database 808, and/or other entities of the wireless tracking system), and historical data (e.g., the historical data, as discussed with reference to at least FIG. 17), map data of the itinerary 1210 (e.g., destinations of each of the phases of the multi-phase itinerary, the determines routes, speed during route, etc.), etc. In one example of block 2920, the smart vending machine receives the itinerary from a client device (e.g., the client device running a client application 822), a gateway (e.g., a mobile or stationary gateway of the wireless tracking system), a server (e.g., server 804), etc.

Method 2900 includes identifying (2930) a subset of a plurality of monitoring agents capable of performing the application itinerary. In one example of method 2930, task manager 1220 generates itinerary assignment 1232 including a subset of monitoring agents from the list of available agents 1238. In one example of method 2930, the task manager 1220 initiates display of the identified subset of monitoring agents within a graphical user interface (e.g., transmits the itinerary assignment list 1232 to a client device for display thereon). In one example of block 2930, the task manager 1220 transmits a push notification (e.g., that includes itinerary assignment list 1232 including the identified set of monitoring agents) to a gateway node or to a client device (e.g., a client device running a client application 822). In one example of method 2900, after transmitting the push notification, the task manager 1220 may receive a selection of at least one tape node of the identified subset.

In embodiments, method 2900 includes generating (2940) the subset of monitoring agents. In one embodiment, a sorting machine, human, or other robot accesses the available monitoring agents defined within the list of available monitoring agents 1238 and separates and groups the subset of monitoring agents identified in the itinerary assignment list 1232. In one embodiment of block 2940, the smart vending machine, sorting machine, human, or other robot dispenses the identified subset of monitoring agents. In one example of method 2800, the smart vending machine, sorting machine, human, or other robot may package and then ship to a customer, the identified subset of tape nodes.

In some embodiments, to implement block 2930, the task manager 1220 may receive previous energy-level indications during individual phases of previous multi-phase applications. The task manager 1220 may utilize a machine learning model (e.g., locally or remotely at the server 804) such as assignment model 1236 to analyze the received previous energy level indications to determine the requisite energy level to complete each phase of the multi-phase application itinerary 1210. In embodiments, the task manager 1220 may scan an identifier (e.g., identifier 122) located on a surface of the monitoring agents to retrieve historical data pertaining to the monitoring agent. The task manager 1220 may then update a table (e.g., the spreadsheet 1600, FIG. 16) located within memory of the device implementing the task manager 1220 or remotely (e.g., in a database 808 of the wireless tracking system 800). The task manager 1220 may further compare the requisite energy level to complete each phase of the multi-phase application itinerary (as defined by the phase requirements 1222) to the plurality of monitoring agents respective energy-level indications.

Figure 30:
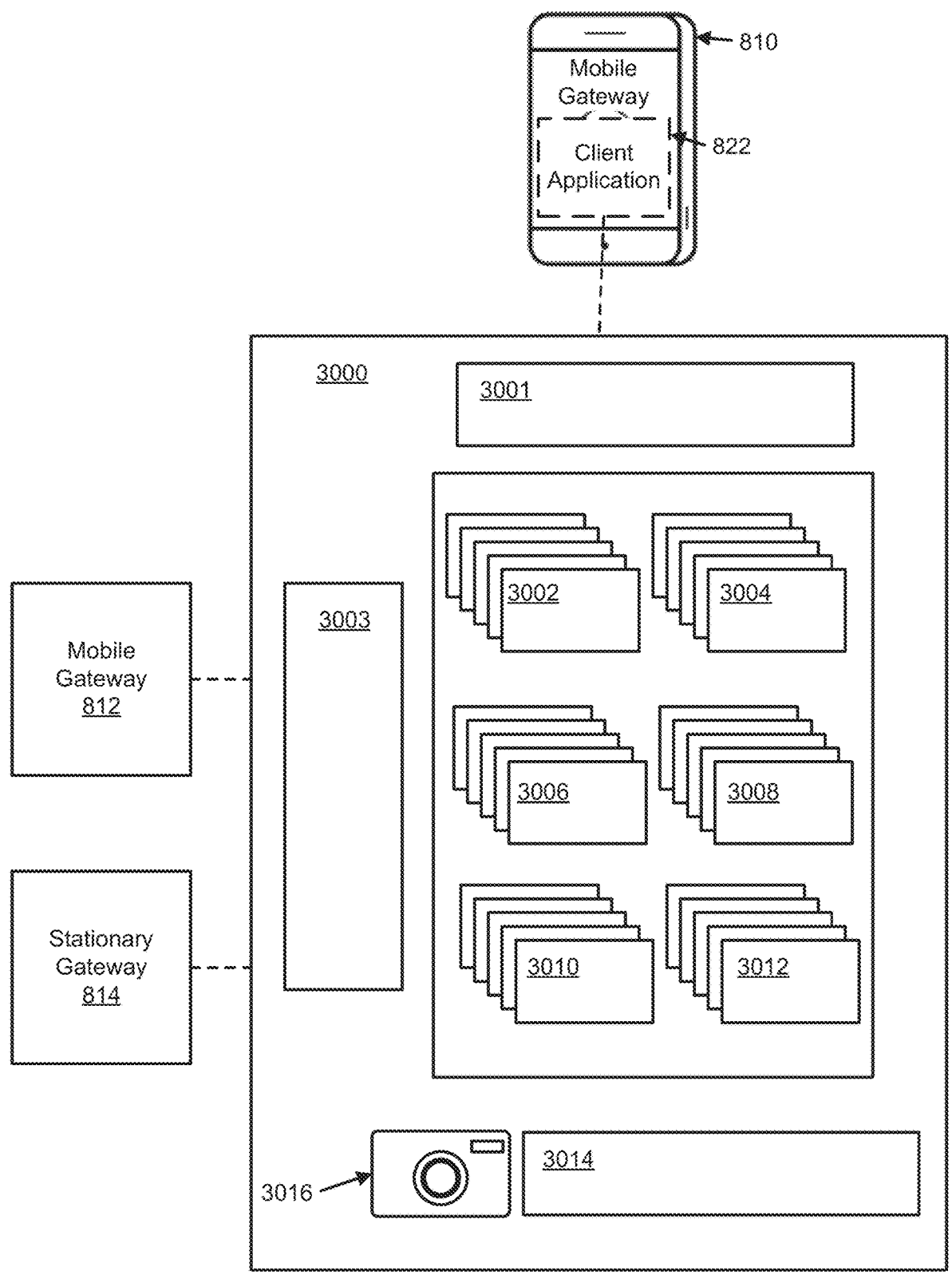
FIG. 30 is an example diagram of a tape node distribution device of the wireless tracking system, according to embodiments.

FIG. 30 depicts an example diagram of the smart vending machine 3000 (e.g., the tape node distribution device 872), in embodiments. Smart vending machine 3000 is shown in addition to aspects of the wireless tracking system 800. The smart vending machine may incorporate aspects of the multi-phase monitoring module 1200 and may perform at least two functions: storing received tape nodes and dispensing tape nodes based on an multi-phase application itinerary and/or itinerary assignment associated therewith. The smart vending machine 3000 includes at least one subset 3002, 3004, 3006, 3008, 3010, 3012 of a plurality of monitoring agents (e.g., tape nodes 818, 828, 832, 842-848, 860, 866, etc.) within the smart vending machine 3000. The subsets 3002-12 may be sorted, using a sorter (not shown), and organized according to the functionality (e.g., wireless communication systems, sensors within each tape node, etc.), battery level (e.g., amount of battery remaining in each tape node), etc. For example, monitoring agents 3002 may include a low-power wireless-communication interface (e.g., low-power wireless-communication interface 652, 652', 652"); monitoring agents 3004 may include temperature sensors; monitoring agents 3006 may include vibration sensors; monitoring agents 3008 may include humidity sensors; monitoring agents 3010 may have full battery life; monitoring agents 3012 may require at least one of recycling, refurbishing, and/or recharging. A subset of monitoring agents (e.g., monitoring agents 3012) may require shipping to a recycling or refurbishing facility (e.g., as discussed with reference to FIGS. 21-27).

The smart vending machine 3000 may accept the monitoring agents through a slot 3001 after scanning the monitoring agents with a scanner 3016. The monitoring agents may have been organized by the smart vending machine 3000, e.g., in response to the smart vending machine 3000 scanning an identifier (e.g., identifier 122, such as a barcode, QR code, RFID, etc.) of each monitoring agent with a scanner 3016, using image recognition techniques or RFID scanning techniques commonly known in the art. The smart vending machine 3000 may retrieve data, based on the identifier of the monitoring agent, from the server (e.g., server 804) or from the scanned monitoring agent. In embodiments, the smart vending machine 3000 may retrieve the data from a mobile gateway 810 (e.g., a client device, such as a smart phone, tablet, etc.), running a client application 822) operated by an authorized user, such as an employee at a shipping facility, the mobile gateway 822 and/or the stationary gateway (e.g., positioned within a shipping facility).

The smart vending machine 3000 may further dispense, with a dispenser 3014, at least one monitoring agent of an identified subset of monitoring agents based on a received multi-phase application itinerary and/or the itinerary assignment 1232 discussed above. For example, the smart vending machine 3000 may include aspects of multi-phase monitoring module 1200 such that it may receive the itinerary 1210 in anticipation of an incoming shipment, from at least one of a monitoring agent, client application 822, mobile gateway 812, stationary gateway 814, and/or server 804, via the client application 822 or gateways 812, 814. The smart vending machine 3000 may employ the task manager 1220 (or by the server, tape node, or gateways) to determine a battery level or other phase requirement 1222 necessary for a monitoring agent(s) to complete a next phase of a multi-phase itinerary 1210. The smart vending machine 3000 may implement the assignment mode 1236, based on historical data, as discussed above, with at least reference to FIG. 17. The smart vending machine 3000 may receive (or generate) the itinerary assignment 1232 then identify a subset of monitoring agents within the smart vending machine 3000 that meet the requisite phase requirements 1222. The smart vending machine 3000 may output, via the dispenser 3014, at least one of the identified subset of monitoring agents. Additionally or alternatively, the smart vending machine 3000 may transmit a push notification to the client application 822 that indicates the monitoring agent is about to be, or has been, dispensed.

The smart vending machine 3000 may further include a display 3003 (e.g., a graphical user interface). In embodiments, the display may be a touch screen interface, capable of accepting user-input for a selection of any of the stored monitoring agents 3002-3012. The display 3003 may present the plurality of monitoring agents respective functionality (e.g., the functionality includes one of a battery-level indication, type of sensor, wireless-communication interface range, and processing power). Further, the display may present the multi-phase application itinerary.

Figure 31:
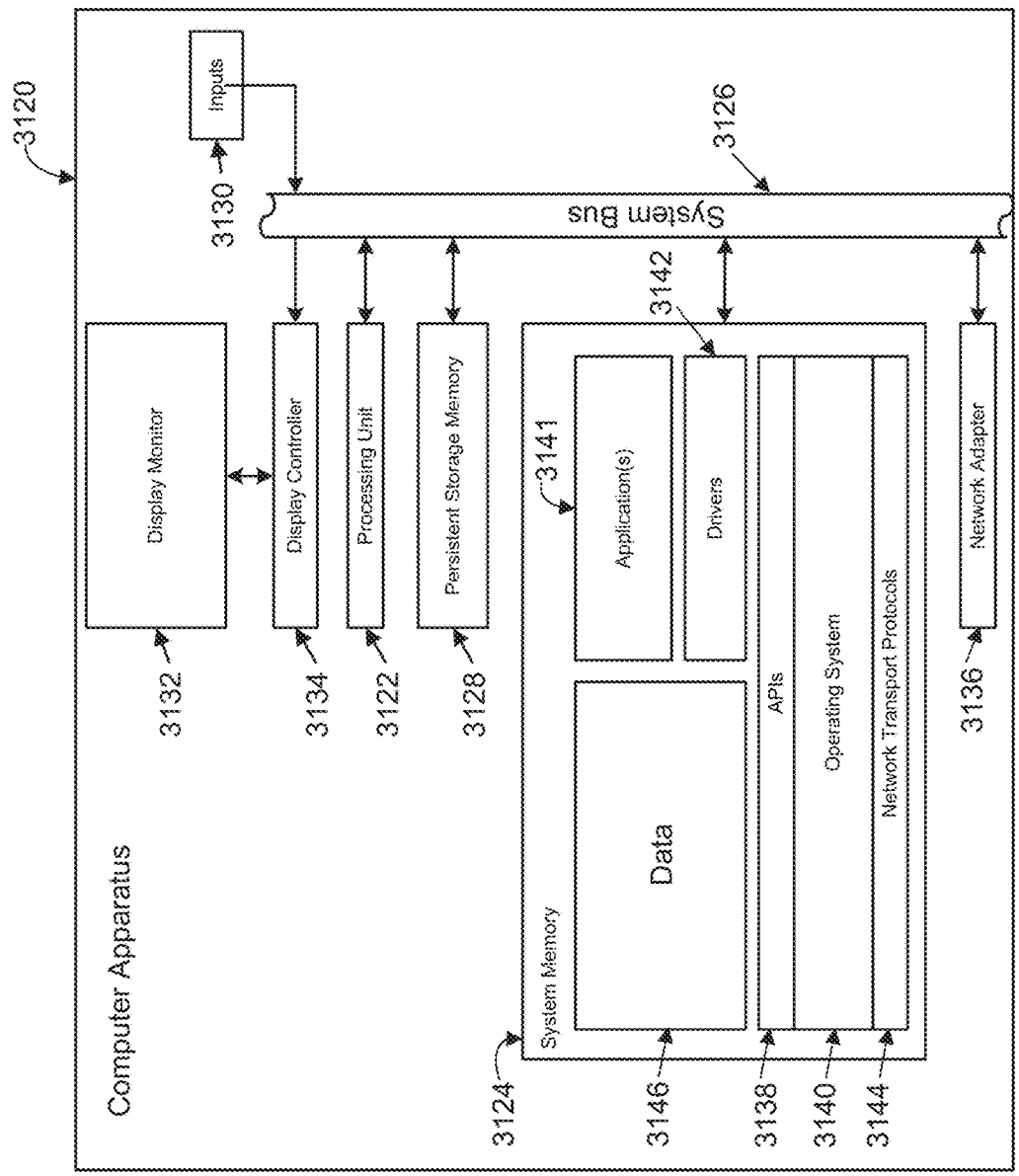
FIG. 31 is a block diagram of example computer apparatus, according to an embodiment.

FIG. 31 shows an example embodiment of computer apparatus 3120 that, either alone or in combination with one or more other computing apparatus, is operable to implement one or more of the computer systems or processors, units, and modules described in this specification. The computer apparatus 3120 includes a processing unit 3122, a system memory 3124, and a system bus 3126 that couples the processing unit 3122 to the various components of the computer apparatus 3120. The processing unit 3122 may include one or more data processors, each of which may be in the form of any one of various commercially available computer processors. The system memory 3124 includes one or more computer-readable media that typically are associated with a software application addressing space that defines the addresses that are available to software applications. The system memory 3124 may include a read only memory (ROM) that stores a basic input/output system (BIOS) that contains start-up routines for the computer apparatus 3120, and a random-access memory (RAM). The system bus 3126 may be a memory bus, a peripheral bus, or a local bus, and may be compatible with any of a variety of bus protocols, including PCI, VESA, Microchannel, ISA, and EISA. The computer apparatus 3020 also includes a persistent storage memory 3128 (e.g., a hard drive, a floppy drive, a CD ROM drive, magnetic tape drives, flash memory devices, and digital video disks) that is connected to the system bus 3126 and contains one or more computer-readable media disks that provide non-volatile or persistent storage for data, data structures and computer-executable instructions.

A user may interact (e.g., input commands or data) with the computer apparatus 3120 using one or more input devices 3130 (e.g. one or more keyboards, computer mice, microphones, cameras, joysticks, physical motion sensors, and touch pads). Information may be presented through a graphical user interface (GUI) that is presented to the user on a display monitor 3132, which is controlled by a display controller 3134. The computer apparatus 3120 also may include other input/output hardware (e.g., peripheral output devices, such as speakers and a printer). The computer apparatus 3120 connects to other network nodes through a network adapter 3136 (also referred to as a "network interface card" or NIC).

A number of program modules may be stored in the system memory 3124, including application programming interfaces 3138 (APIs), an operating system (OS) 3140 (e.g., the Windows® operating system available from Microsoft Corporation of Redmond, Wash. U.S.A.), software applications 3141 including one or more software applications programming the computer apparatus 3120 to perform one or more of the steps, tasks, operations, or processes of the positioning and/or tracking systems described herein, drivers 3142 (e.g., a GUI driver), network transport protocols 3144, and data 3146 (e.g., input data, output data, program data, a registry, and configuration settings).

The foregoing description of the embodiments of the disclosure have been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A method for multi-phase monitoring, comprising:
   receiving a first set of data associated with a monitoring agent during a first phase of an itinerary for monitoring an asset;
   determining the first phase of the itinerary is complete;
   receiving a second set of data relating to a second phase of the itinerary, the second set of data defining a phase requirement for implementing the second phase;
   determining an agent capability of the monitoring agent;
   comparing the agent capability to the phase requirement; and
   performing an action based on whether the phase requirement is capable of being met by the monitoring agent.

2. The method of claim 1, the phase requirement including an energy-level threshold; the agent capability including an energy-level of the monitoring agent at the end of the first phase; wherein the performing an action based on whether the phase requirement includes determining whether the energy-level is above or below the energy level threshold.

3. The method of claim 2, further comprising:
   determining, based on comparing the energy level to the energy-level threshold, the monitoring agent is incapable of completing the second phase, wherein performing the action comprises transmitting one or more of a recharge indication, refurbish indication, and transport indication.

4. The method of claim 1, further comprising responsive to the monitoring agent
   determining a first phase of transport is complete, activating, by the monitoring agent, an hibernation mode.

5. The method of claim 4, further comprising responsive to the monitoring agent detecting an external stimulus based on sensor data from a sensor of the monitoring agent, exiting, by the monitoring agent, the hibernation mode and activating another mode.

6. The method of claim 1, the action including transmitting a transport indication including a notification to ship the monitoring agent to a specified address, the specified address is accessible based on utilizing an identifier located on a surface of the monitoring agent.

7. The method of claim 1, wherein the first set of data includes location data collected by a tracking sensor of the monitoring agent, wherein determining the first phase of transport is complete comprises detecting using the location data that the monitoring agent has traversed a geofenced perimeter.

8. The method of claim 1, further comprising:
   responsive to determining the first phase is complete, initiating, a hibernation mode, wherein the hibernation mode includes at least one of reducing a frequency of outgoing communications of the monitoring agent; reducing an amount of sensor data the monitoring agent collects, processes, or transmits; reducing the frequency at which the monitoring agent collects sensor data; and turning off one or more long-range communications capabilities of the monitoring agent.

9. The method of claim 1, wherein the phase requirement for implementing the second phase includes at least one sensor of the monitoring agent required to collect sensor data during the second phase of the itinerary, communication requirements during the second phase of transport, a current battery-level indication of the monitoring agent, wherein comparing the agent capability to the phase requirement includes:
   determining, based on the second set of data, a set of tasks, required of the monitoring agent during the second phase;
   determining an amount of energy level required to complete each task of the set of tasks based in part on historical data of at least one other monitoring agent completing at least one task of the set of tasks; and
   aggregating the energy required to complete each task of the set of tasks.

10. The method of claim 1, the phase requirement including an energy-level threshold is based on historical data collected from other monitoring agents previously completing the second phase of the itinerary, the method further comprising:
    training a machine learning model based on the collected historical data from the other monitoring agents and using the machine learning model to determine the energy level threshold.

11. The method of claim 1, wherein the monitoring agent is communicatively coupled to a server of a wireless tracking system, the method further comprising:
updating, by the monitoring agent, a tracking file stored within a database of the server, with a current status of the monitoring agent that includes one of recycling, refurbishing, recharging, recharged, and deployed to the second phase of transport.

12. A wireless tracking system, comprising at least one monitoring agent, each monitoring agent adhered to a respective asset and comprising at least one sensor, the at least one monitoring agent having a processor, a memory communicatively coupled with the processor, the memory storing machine-readable instructions that, when executed by the processor, cause the processor to:
receive a first set of data associated with a monitoring agent during a first phase of an itinerary for monitoring an asset;
determine the first phase of the itinerary is complete;
receive a second set of data relating to a second phase of the itinerary, the second set of data defining a phase requirement for implementing the second phase;
determine an agent capability of the monitoring agent;
compare the agent capability to the phase requirement; and
perform an action based on whether the phase requirement is capable of being met by the monitoring agent.

13. The wireless tracking system of claim 12, the phase requirement including an energy-level threshold; the agent capability including an energy-level of the monitoring agent at the end of the first phase; wherein the performing an action based on whether the phase requirement includes determining whether the energy-level is above or below the energy level threshold.

14. The wireless tracking system of claim 12, the memory storing further machine-readable instructions that, when executed by the processor, cause the processor to:
responsive to determining the first phase is complete, initiating, a hibernation mode, wherein the hibernation mode includes at least one of reducing a frequency of outgoing communications of the monitoring agent; reducing an amount of sensor data the monitoring agent collects, processes, or transmits; reducing the frequency at which the monitoring agent collects sensor data; and turning off one or more long-range communications capabilities of the monitoring agent.

15. The wireless tracking system of claim 12, the action including transmitting a transport indication including a notification to ship the monitoring agent to a specified address, the specified address being accessible based on utilizing an identifier located on a surface of the monitoring agent.

16. A monitoring agent distribution device, comprising:
receiving a plurality of battery-level indications, each battery-level indication defining battery life of a respective monitoring agent of a plurality of monitoring agents;
receiving an application itinerary for monitoring an asset;
identifying a subset of the plurality of monitoring agents, based on the battery-level indications, capable of performing the application itinerary; and
generating the subset of the plurality of monitoring agents.

17. The monitoring agent distribution device of claim 16, wherein the device is communicatively coupled to a client application running on a client device, the device further comprising:
transmitting a push notification to the client application that the identified subset of the plurality of monitoring devices capable of performing the application itinerary has been identified; and
receiving, from the client application, a selection of at least one monitoring agent of the identified subset of the plurality of monitoring agents for use in performing the application itinerary.

18. The monitoring agent distribution device of claim 16, wherein the device comprises:
a housing for storing the plurality of monitoring agents, the housing defines a slot for accepting monitoring agents;
a sorter for sorting the plurality of monitoring agents according to respective battery-level indications of the plurality of monitoring agents; and
a dispenser for dispensing the identified subset of the plurality of monitoring agents.

19. The monitoring agent distribution device of claim 16, further comprising:
a display for presenting, via a graphical user interface, a current inventory of the plurality of monitoring agents and their respective plurality of battery-level indications.

20. The monitoring agent distribution device of claim 16, wherein the identified subset of the plurality of monitoring agents are within a threshold of a determined requisite energy level for performing the application itinerary, wherein the application itinerary is a multi-phase application itinerary, the method further comprising:
receiving, from each of the plurality of monitoring agents, previous battery-level indications relating to battery-level indications during individual phases of previous multi-phase applications;
training a machine learning model based on the received previous battery-level indications;
utilizing the machine learning model to determine the requisite battery level to complete each phase of the multi-phase application itinerary; and
comparing the requisite battery level to complete each phase of the multi-phase application itinerary to the plurality of monitoring agents respective battery-level indication.

21. The monitoring agent distribution device of claim 16, wherein the application itinerary is one of a single-phase application itinerary and multi-phase application itinerary.

* * * * *